US008117242B1

(12) United States Patent
Zilka

(10) Patent No.: US 8,117,242 B1
(45) Date of Patent: *Feb. 14, 2012

(54) SYSTEM, METHOD, AND COMPUTER PROGRAM PRODUCT FOR PERFORMING A SEARCH IN CONJUNCTION WITH USE OF AN ONLINE APPLICATION

(75) Inventor: Kevin J. Zilka, San Jose, CA (US)

(73) Assignee: Boadin Technology, LLC, Newark, DE (US)

( * ) Notice: Subject to any disclaimer, the term of this patent is extended or adjusted under 35 U.S.C. 154(b) by 452 days.

This patent is subject to a terminal disclaimer.

(21) Appl. No.: 12/340,538

(22) Filed: Dec. 19, 2008

Related U.S. Application Data

(60) Provisional application No. 61/022,262, filed on Jan. 18, 2008.

(51) Int. Cl.
*G06F 17/30* (2006.01)
(52) U.S. Cl. ........ 707/822; 707/827
(58) Field of Classification Search ........ 707/727, 707/728, 729, 730, 731, 792, 741, 610, 715, 707/716, 714, 783, 756, 769, 168, 803, 705, 707/822, 827
See application file for complete search history.

(56) References Cited

U.S. PATENT DOCUMENTS

| | | | | |
|---|---|---|---|---|
| 5,404,443 A | 4/1995 | Hirata | | 725/75 |
| 5,644,737 A | 7/1997 | Tuniman et al. | | 715/810 |
| 5,895,464 A | 4/1999 | Bhandari et al. | | 704/9 |
| 6,038,441 A | 3/2000 | Slaven et al. | | 455/413 |
| 6,065,051 A | 5/2000 | Steele et al. | | 709/219 |
| 6,073,143 A | 6/2000 | Nishikawa et al. | | 715/207 |
| 6,199,157 B1 | 3/2001 | Dov et al. | | 713/1 |
| 6,253,325 B1 | 6/2001 | Steele et al. | | 713/201 |
| 6,314,458 B1 | 11/2001 | Steele et al. | | 709/219 |
| 6,349,257 B1 | 2/2002 | Liu et al. | | 701/200 |
| 6,393,468 B1 | 5/2002 | McGee | | 709/218 |
| 6,397,086 B1 | 5/2002 | Chen | | 455/569 |
| 6,405,367 B1 | 6/2002 | Bryant et al. | | 717/115 |
| 6,421,651 B1 | 7/2002 | Tedesco et al. | | 705/8 |
| 6,430,537 B1 | 8/2002 | Tedesco et al. | | 705/8 |
| 6,472,771 B1 | 10/2002 | Frese et al. | | 307/10.1 |
| 6,542,812 B1 | 4/2003 | Obradovich et al. | | 701/207 |
| 6,633,311 B1 | 10/2003 | Douvikas et al. | | 345/731 |
| 6,650,948 B1 | 11/2003 | Atkinson et al. | | 700/66 |
| 6,691,158 B1 | 2/2004 | Douvikas et al. | | 709/219 |
| 6,697,730 B2 | 2/2004 | Dickerson | | 701/200 |
| 6,711,474 B1 | 3/2004 | Treyz et al. | | 701/1 |
| 6,782,240 B1 | 8/2004 | Tabe | | 455/66.1 |

(Continued)

OTHER PUBLICATIONS

Office Action from U.S. Appl. No. 12/340,601 which was mailed on Sep. 15, 2011.

(Continued)

*Primary Examiner* — Tony Mahmoudi
*Assistant Examiner* — Fariborz Khoshnoodi
(74) *Attorney, Agent, or Firm* — The Caldwell Firm, LLC; Patrick E. Caldwell, Esq.

(57) ABSTRACT

A system, method, and computer program product are provided for performing a search in conjunction with use of an online application. In operation, a document editing interface is displayed for editing a document. Additionally, at least one term of the document is identified. Further, a search interface is displayed. Still yet, a search is performed utilizing the search interface, based on the at least one term.

117 Claims, 38 Drawing Sheets

U.S. PATENT DOCUMENTS

| | | | |
|---|---|---|---|
| 6,829,532 B2 | 12/2004 | Obradovich et al. | 701/207 |
| 6,871,067 B2 | 3/2005 | Clark et al. | 455/428 |
| 6,885,874 B2 | 4/2005 | Grube et al. | 455/520 |
| 6,889,213 B1 | 5/2005 | Douvikas et al. | 705/67 |
| 6,934,697 B1 | 8/2005 | Warren | 707/1 |
| 6,952,730 B1 | 10/2005 | Najork et al. | 709/225 |
| 6,983,203 B1 | 1/2006 | Wako | 701/208 |
| 7,010,751 B2 | 3/2006 | Shneiderman | 715/764 |
| 7,017,109 B1 | 3/2006 | Douvikas et al. | 715/501.1 |
| 7,024,451 B2 | 4/2006 | Jorgenson | 709/203 |
| 7,031,724 B2 | 4/2006 | Ross et al. | 455/456.1 |
| 7,069,308 B2 | 6/2006 | Abrams | 709/218 |
| 7,117,254 B2 | 10/2006 | Lunt et al. | 709/218 |
| 7,133,687 B1 | 11/2006 | El-Fishawy et al. | 455/466 |
| 7,158,878 B2 | 1/2007 | Rasmussen et al. | 701/208 |
| 7,188,080 B1 | 3/2007 | Walker et al. | 705/26 |
| 7,188,153 B2 | 3/2007 | Lunt et al. | 709/218 |
| 7,197,531 B2 | 3/2007 | Anderson | 709/203 |
| 7,203,721 B1 | 4/2007 | Ben-Efraim et al. | 709/203 |
| 7,209,929 B2 | 4/2007 | Dominguez, Jr. et al. | 707/103 |
| 7,231,428 B2 | 6/2007 | Teague | 709/206 |
| 7,233,997 B1 | 6/2007 | Leveridge et al. | 709/229 |
| 7,340,419 B2 | 3/2008 | Walker et al. | 705/27 |
| 7,373,338 B2 | 5/2008 | Thompson et al. | 707/3 |
| 7,392,132 B2 | 6/2008 | Matsuo | 701/207 |
| 7,428,454 B2 | 9/2008 | Shikano et al. | 701/36 |
| 7,451,161 B2 | 11/2008 | Zhu et al. | 707/104.1 |
| 7,478,078 B2 | 1/2009 | Lunt et al. | 707/1 |
| 7,516,191 B2 | 4/2009 | Brouk et al. | 709/217 |
| 7,526,440 B2 | 4/2009 | Walker et al. | 705/26 |
| 7,529,728 B2 | 5/2009 | Weissman et al. | 707/2 |
| 7,590,685 B2 | 9/2009 | Palmeri et al. | 709/203 |
| 7,590,701 B2 | 9/2009 | Panec et al. | 709/207 |
| 7,606,687 B2 | 10/2009 | Galbreath et al. | 703/3 |
| 7,634,505 B2 | 12/2009 | Chasman et al. | |
| 7,646,296 B2 | 1/2010 | Ohki | 340/539.13 |
| 7,669,123 B2 | 2/2010 | Zuckerberg et al. | 715/273 |
| 7,680,882 B2 | 3/2010 | Tiu, Jr. et al. | 709/203 |
| 7,685,200 B2 | 3/2010 | Gunawardena et al. | 707/748 |
| 7,689,711 B2 | 3/2010 | Brouk et al. | 709/203 |
| 7,706,967 B2 | 4/2010 | Knockeart et al. | 701/119 |
| 7,721,328 B2 | 5/2010 | Boulos et al. | 726/6 |
| 7,725,492 B2 | 5/2010 | Sittig et al. | 707/784 |
| 7,725,605 B2 | 5/2010 | Palmeri et al. | 709/246 |
| 7,730,478 B2 | 6/2010 | Weissman | 717/171 |
| 7,734,608 B2 | 6/2010 | Fell et al. | 707/705 |
| 7,739,351 B2 | 6/2010 | Shkvarchuk et al. | 709/217 |
| 7,761,871 B2 | 7/2010 | Edwards et al. | 707/176 |
| 7,765,243 B2 | 7/2010 | Kedem | 707/822 |
| 7,769,142 B2 | 8/2010 | Selbie et al. | 379/68 |
| 7,774,366 B2 | 8/2010 | Fisher et al. | 707/784 |
| 7,779,039 B2 | 8/2010 | Weissman et al. | 707/793 |
| 7,788,260 B2 | 8/2010 | Lunt et al. | 707/727 |
| 7,788,399 B2 | 8/2010 | Brouk et al. | 709/238 |
| 7,797,256 B2 | 9/2010 | Zuckerberg et al. | 705/319 |
| 7,802,007 B2 | 9/2010 | Reese | 709/232 |
| 7,809,805 B2 | 10/2010 | Stremel et al. | 709/219 |
| 7,814,052 B2 | 10/2010 | Bezar et al. | 707/610 |
| 7,818,194 B2 | 10/2010 | Yoshida et al. | 705/7 |
| 7,818,298 B2 | 10/2010 | Barker et al. | 707/638 |
| 7,818,677 B2 | 10/2010 | Ruthfield et al. | 715/749 |
| 7,826,945 B2 | 11/2010 | Zhang et al. | 701/36 |
| 7,827,138 B2 | 11/2010 | Salmon et al. | 707/610 |
| 7,827,208 B2 | 11/2010 | Bosworth et al. | 707/802 |
| 7,827,265 B2 | 11/2010 | Cheever et al. | 709/223 |
| 7,831,455 B2 | 11/2010 | Yoshida et al. | 705/7 |
| 7,835,950 B2 | 11/2010 | Walker et al. | 705/27 |
| 7,836,019 B2 | 11/2010 | Barker et al. | 707/638 |
| 7,840,413 B2 | 11/2010 | Yoshida et al. | 705/1 |
| 7,840,501 B1 * | 11/2010 | Sallam | 706/10 |
| 7,847,686 B1 | 12/2010 | Atkins et al. | 340/539.13 |
| D30,302 S | 1/2011 | Ambriz | D23/249 |
| 7,865,282 B2 | 1/2011 | Murlidar et al. | 701/36 |
| 7,865,303 B2 | 1/2011 | Weiss et al. | 701/209 |
| 7,869,941 B2 | 1/2011 | Coughlin et al. | 701/204 |
| 7,880,602 B2 | 2/2011 | Kasamatsu | 340/461 |
| 7,890,501 B2 | 2/2011 | Lunt et al. | 707/722 |
| 7,904,882 B2 | 3/2011 | Hinks | 717/120 |
| 7,912,628 B2 | 3/2011 | Chapman et al. | 701/117 |
| 7,912,629 B2 | 3/2011 | Sutter et al. | 701/118 |
| 7,912,758 B2 | 3/2011 | Walker et al. | 705/26 |
| 7,921,013 B1 | 4/2011 | Ostermann et al. | 704/260 |
| 7,933,810 B2 | 4/2011 | Morgenstern | 705/26.1 |
| 7,933,889 B2 | 4/2011 | Smetters et al. | 707/708 |
| 7,945,653 B2 | 5/2011 | Zuckerberg et al. | 709/223 |
| 7,949,529 B2 | 5/2011 | Weider et al. | 704/270 |
| 7,953,775 B2 | 5/2011 | Dasdan | 707/830 |
| 7,970,657 B2 | 6/2011 | Morgenstern | 705/26.1 |
| 7,986,974 B2 | 7/2011 | Arun | 455/563 |
| 8,010,458 B2 | 8/2011 | Galbreath et al. | 15/320 |
| 2001/0029455 A1 | 10/2001 | Chin et al. | 704/277 |
| 2001/0034771 A1 | 10/2001 | Hutsch et al. | 709/217 |
| 2002/0095425 A1 | 7/2002 | Abu-Husein | 707/100 |
| 2002/0122063 A1 | 9/2002 | Weinberg et al. | 715/764 |
| 2002/0143818 A1 * | 10/2002 | Roberts et al. | 707/513 |
| 2002/0152020 A1 | 10/2002 | Seibel | 701/208 |
| 2002/0174010 A1 | 11/2002 | Rice, III | 705/14.67 |
| 2002/0174427 A1 | 11/2002 | Kohno et al. | 725/30 |
| 2002/0177928 A1 | 11/2002 | Moriguchi et al. | 701/1 |
| 2002/0198635 A1 | 12/2002 | Obradovich et al. | 701/1 |
| 2003/0084404 A1 | 5/2003 | Dweck et al. | 715/513 |
| 2003/0085920 A1 | 5/2003 | Belknap et al. | 345/740 |
| 2003/0126136 A1 | 7/2003 | Omoigui | 707/999.01 |
| 2003/0210159 A1 | 11/2003 | Arunkumar | 340/988 |
| 2004/0095260 A1 | 5/2004 | Shintani | 340/994 |
| 2004/0097272 A1 | 5/2004 | Schuffert | 455/569.1 |
| 2004/0158607 A1 | 8/2004 | Coppinger et al. | 709/206 |
| 2004/0158746 A1 | 8/2004 | Hu et al. | 726/8 |
| 2004/0189694 A1 | 9/2004 | Kurtz et al. | 715/738 |
| 2004/0192339 A1 | 9/2004 | Wilson et al. | 455/456.1 |
| 2004/0199494 A1 | 10/2004 | Bhatt | 707/3 |
| 2004/0210909 A1 | 10/2004 | Dominguez et al. | 719/316 |
| 2004/0235530 A1 | 11/2004 | Arun | 455/563 |
| 2005/0005242 A1 | 1/2005 | Hoyle | 715/745 |
| 2005/0065909 A1 * | 3/2005 | Musgrove et al. | 707/2 |
| 2005/0065925 A1 | 3/2005 | Weissman et al. | 707/4 |
| 2005/0075128 A1 | 4/2005 | Diedrich et al. | 455/552.1 |
| 2005/0080772 A1 | 4/2005 | Bem | 707/3 |
| 2005/0143134 A1 | 6/2005 | Harwood et al. | 455/563 |
| 2005/0179540 A1 | 8/2005 | Rubenstein | 340/539.18 |
| 2005/0223022 A1 | 10/2005 | Weissman et al. | 707/102 |
| 2005/0238047 A1 | 10/2005 | Holland et al. | 370/465 |
| 2005/0240608 A1 | 10/2005 | Jones et al. | 707/999.1 |
| 2005/0266879 A1 | 12/2005 | Spaur et al. | 455/556.2 |
| 2005/0266884 A1 | 12/2005 | Marriott et al. | 455/558 |
| 2005/0267940 A1 | 12/2005 | Galbreath et al. | 709/206 |
| 2005/0278083 A1 | 12/2005 | Shikano et al. | 701/1 |
| 2005/0278179 A1 | 12/2005 | Overend et al. | 704/270.1 |
| 2005/0278443 A1 | 12/2005 | Winner et al. | 709/224 |
| 2005/0283478 A1 | 12/2005 | Choi et al. | 707/9 |
| 2006/0021009 A1 | 1/2006 | Lunt | 726/4 |
| 2006/0053376 A1 | 3/2006 | Ng et al. | 715/742 |
| 2006/0061458 A1 | 3/2006 | Simon et al. | 340/426.35 |
| 2006/0085735 A1 | 4/2006 | Shimizu | 715/201 |
| 2006/0095860 A1 | 5/2006 | Wada et al. | 715/771 |
| 2006/0111893 A1 * | 5/2006 | Florian et al. | 704/8 |
| 2006/0128301 A1 | 6/2006 | Dorfstatter et al. | 455/3.04 |
| 2006/0155429 A1 | 7/2006 | Boone et al. | 701/1 |
| 2006/0167861 A1 | 7/2006 | Arrouye et al. | 707/999 |
| 2006/0184516 A1 * | 8/2006 | Ellis | 707/3 |
| 2006/0195483 A1 | 8/2006 | Heider et al. | 707/104.1 |
| 2006/0195605 A1 | 8/2006 | Sundarrajan et al. | 709/232 |
| 2006/0206834 A1 | 9/2006 | Fisher et al. | 715/777 |
| 2006/0218630 A1 | 9/2006 | Pearson et al. | 726/8 |
| 2006/0223592 A1 | 10/2006 | Kouno | 455/569.1 |
| 2006/0239546 A1 | 10/2006 | Tedesco et al. | 382/159 |
| 2006/0242591 A1 | 10/2006 | Van Dok et al. | 715/762 |
| 2006/0265458 A1 | 11/2006 | Aldrich et al. | 709/206 |
| 2006/0282328 A1 | 12/2006 | Gerace et al. | 705/14.66 |
| 2007/0022021 A1 | 1/2007 | Walker et al. | 705/26 |
| 2007/0032225 A1 | 2/2007 | Konicek et al. | 455/417 |
| 2007/0043503 A1 | 2/2007 | Oesterling et al. | 701/211 |
| 2007/0054704 A1 | 3/2007 | Satoh | 455/569.1 |
| 2007/0061335 A1 | 3/2007 | Ramer et al. | 707/999.01 |
| 2007/0078950 A1 | 4/2007 | Hopkins et al. | 709/217 |
| 2007/0088741 A1 | 4/2007 | Brooks et al. | 707/103 R |
| 2007/0124276 A1 | 5/2007 | Weissman et al. | 707/2 |

| Publication | Date | Inventor | Class |
|---|---|---|---|
| 2007/0130130 A1 | 6/2007 | Chan et al. | 707/3 |
| 2007/0130137 A1 | 6/2007 | Oliver et al. | 707/5 |
| 2007/0150444 A1 | 6/2007 | Chesnais et al. | 707/3 |
| 2007/0179800 A1 | 8/2007 | Oesterling | 701/2 |
| 2007/0185843 A1 | 8/2007 | Jones et al. | 707/999 |
| 2007/0192299 A1 | 8/2007 | Zuckerberg et al. | 707/3 |
| 2007/0220008 A1 | 9/2007 | Mizhar et al. | 1/1 |
| 2007/0223436 A1 | 9/2007 | Lenardi et al. | 370/338 |
| 2007/0233378 A1 | 10/2007 | Tanaka et al. | 701/211 |
| 2007/0255807 A1 | 11/2007 | Hayashi et al. | 709/219 |
| 2007/0288510 A1 | 12/2007 | Dominguez, Jr. et al. | 707/103 R |
| 2008/0010243 A1 | 1/2008 | Weissman et al. | 707/2 |
| 2008/0026793 A1 | 1/2008 | Teegan et al. | 455/557 |
| 2008/0027643 A1 | 1/2008 | Basir et al. | 701/213 |
| 2008/0032721 A1 | 2/2008 | MacDonald et al. | 455/466 |
| 2008/0033714 A1* | 2/2008 | Gupta | 704/9 |
| 2008/0036586 A1 | 2/2008 | Ohki | 340/539.13 |
| 2008/0040474 A1 | 2/2008 | Zuckerbert et al. | 709/224 |
| 2008/0040475 A1 | 2/2008 | Bosworth et al. | 709/224 |
| 2008/0046845 A1 | 2/2008 | Chandra | 715/856 |
| 2008/0046976 A1 | 2/2008 | Zuckerberg | 726/4 |
| 2008/0052373 A1 | 2/2008 | Pousti | 709/217 |
| 2008/0059447 A1 | 3/2008 | Winner et al. | 707/999.01 |
| 2008/0065604 A1 | 3/2008 | Tiu et al. | 707/3 |
| 2008/0065701 A1 | 3/2008 | Lindstrom et al. | 707/201 |
| 2008/0077310 A1 | 3/2008 | Murlidar et al. | 701/117 |
| 2008/0077566 A1 | 3/2008 | Fell et al. | 707/4 |
| 2008/0080689 A1 | 4/2008 | Casalaina et al. | |
| 2008/0082504 A1 | 4/2008 | Jasik et al. | 707/3 |
| 2008/0082540 A1 | 4/2008 | Weissman et al. | 707/9 |
| 2008/0082555 A1 | 4/2008 | Salmon et al. | 707/100 |
| 2008/0082572 A1 | 4/2008 | Ballard et al. | 707/102 |
| 2008/0082586 A1 | 4/2008 | Jasik et al. | 707/200 |
| 2008/0082986 A1 | 4/2008 | Cheenath et al. | 719/313 |
| 2008/0086358 A1 | 4/2008 | Doshi et al. | 705/10 |
| 2008/0086447 A1 | 4/2008 | Weissman et al. | 707/2 |
| 2008/0086455 A1 | 4/2008 | Meisels et al. | 707/3 |
| 2008/0086479 A1 | 4/2008 | Fry et al. | 707/10 |
| 2008/0086482 A1 | 4/2008 | Weissman | 707/10 |
| 2008/0086514 A1 | 4/2008 | Weissman et al. | 707/200 |
| 2008/0086735 A1 | 4/2008 | Cheenath et al. | 719/313 |
| 2008/0109426 A1 | 5/2008 | Constantinides | 707/5 |
| 2008/0120539 A1 | 5/2008 | Stephens, Jr. | 715/256 |
| 2008/0126333 A1 | 5/2008 | Bezar et al. | 707/5 |
| 2008/0133122 A1 | 6/2008 | Mashitani et al. | 701/200 |
| 2008/0133685 A1 | 6/2008 | Boss et al. | 709/206 |
| 2008/0133754 A1 | 6/2008 | Smyth et al. | 709/226 |
| 2008/0147671 A1 | 6/2008 | Simon et al. | 707/10 |
| 2008/0147753 A1 | 6/2008 | Chasman et al. | 707/203 |
| 2008/0162544 A1 | 7/2008 | Weissman et al. | 707/103 R |
| 2008/0167937 A1 | 7/2008 | Coughlin et al. | 705/9 |
| 2008/0177460 A1 | 7/2008 | Blackwood et al. | 701/118 |
| 2008/0183687 A1 | 7/2008 | Law | 707/4 |
| 2008/0184157 A1 | 7/2008 | Selig | 715/781 |
| 2008/0189292 A1 | 8/2008 | Stremel et al. | 707/10 |
| 2008/0189380 A1 | 8/2008 | Bosworth et al. | 709/207 |
| 2008/0189395 A1 | 8/2008 | Stremel et al. | 709/219 |
| 2008/0189768 A1 | 8/2008 | Callahan et al. | 726/4 |
| 2008/0201701 A1 | 8/2008 | Hofhansl et al. | 717/168 |
| 2008/0209503 A1 | 8/2008 | Hess et al. | 726/1 |
| 2008/0214148 A1 | 9/2008 | Ramer et al. | 455/414.1 |
| 2008/0222191 A1 | 9/2008 | Yoshida et al. | 707/102 |
| 2008/0228924 A1 | 9/2008 | Herberger et al. | 709/227 |
| 2008/0256002 A1 | 10/2008 | Yoshida et al. | 705/500 |
| 2008/0263152 A1 | 10/2008 | Daniels et al. | 709/203 |
| 2008/0270354 A1 | 10/2008 | Weissman | 707/2 |
| 2008/0270516 A1 | 10/2008 | Ragnet et al. | 709/202 |
| 2008/0270987 A1 | 10/2008 | Weissman | 717/124 |
| 2008/0275884 A1 | 11/2008 | Yoshida et al. | 707/10 |
| 2008/0281610 A1 | 11/2008 | Yoshida et al. | 705/1 |
| 2008/0288511 A1 | 11/2008 | Jasik et al. | 707/100 |
| 2008/0301144 A1 | 12/2008 | Boss et al. | 707/10 |
| 2008/0305742 A1 | 12/2008 | Basir | 455/41.2 |
| 2008/0313714 A1 | 12/2008 | Fetterman et al. | 726/4 |
| 2008/0319652 A1 | 12/2008 | Moshfeghi | 701/208 |
| 2008/0319653 A1 | 12/2008 | Moshfeghi | 701/208 |
| 2009/0005070 A1 | 1/2009 | Forstall et al. | 455/456.1 |
| 2009/0013011 A1 | 1/2009 | Barker et al. | 707/203 |
| 2009/0013413 A1 | 1/2009 | Vera et al. | 726/30 |
| 2009/0024548 A1 | 1/2009 | Zhu et al. | 706/21 |
| 2009/0024609 A1 | 1/2009 | Barker et al. | 707/5 |
| 2009/0024673 A1 | 1/2009 | Barker et al. | 707/203 |
| 2009/0029744 A1 | 1/2009 | Boersma | 455/569.1 |
| 2009/0030906 A1 | 1/2009 | Doshi et al. | 707/9 |
| 2009/0031301 A1 | 1/2009 | D'Angelo et al. | 717/178 |
| 2009/0037277 A1 | 2/2009 | Zuckerberg et al. | 705/14 |
| 2009/0037828 A1 | 2/2009 | Waite et al. | 715/760 |
| 2009/0044146 A1 | 2/2009 | Patel et al. | 715/808 |
| 2009/0048922 A1 | 2/2009 | Morgenstern et al. | 705/14 |
| 2009/0049014 A1 | 2/2009 | Steinberg | 707/3 |
| 2009/0049036 A1 | 2/2009 | Juan et al. | 707/5 |
| 2009/0049053 A1 | 2/2009 | Barker et al. | 707/10 |
| 2009/0049065 A1 | 2/2009 | Weissman | 707/100 |
| 2009/0049070 A1 | 2/2009 | Steinberg | 707/101 |
| 2009/0049101 A1 | 2/2009 | Weissman | |
| 2009/0049102 A1 | 2/2009 | Weissman | |
| 2009/0049127 A1 | 2/2009 | Juan et al. | 709/204 |
| 2009/0049288 A1 | 2/2009 | Weissman | 712/245 |
| 2009/0049413 A1 | 2/2009 | Lehtovirta et al. | 715/855 |
| 2009/0049525 A1 | 2/2009 | D'Angelo et al. | 726/4 |
| 2009/0063178 A1 | 3/2009 | Pousti et al. | 705/1 |
| 2009/0063249 A1 | 3/2009 | Tomlin et al. | 705/10 |
| 2009/0070219 A1 | 3/2009 | D'Angelo et al. | 705/14 |
| 2009/0070334 A1 | 3/2009 | Callahan et al. | 707/9 |
| 2009/0070412 A1 | 3/2009 | D'Angelo et al. | 709/203 |
| 2009/0083058 A1 | 3/2009 | Beringer et al. | 705/1 |
| 2009/0094554 A1 | 4/2009 | Karstens | 715/810 |
| 2009/0100342 A1 | 4/2009 | Jakobson | 715/733 |
| 2009/0112394 A1 | 4/2009 | Lepejian et al. | 701/30 |
| 2009/0119167 A1 | 5/2009 | Kendall et al. | 705/14 |
| 2009/0132646 A1 | 5/2009 | Yang et al. | 709/203 |
| 2009/0135089 A1 | 5/2009 | Konishi et al. | 345/1.3 |
| 2009/0138168 A1 | 5/2009 | Kores et al. | 701/117 |
| 2009/0144341 A1 | 6/2009 | Hauck et al. | 707/999.2 |
| 2009/0144392 A1 | 6/2009 | Wang et al. | 709/217 |
| 2009/0144451 A1 | 6/2009 | Cabezas et al. | 709/248 |
| 2009/0158161 A1 | 6/2009 | Gibbs et al. | 715/733 |
| 2009/0160732 A1 | 6/2009 | Kimura | 345/1.1 |
| 2009/0164110 A1 | 6/2009 | Basir | 701/117 |
| 2009/0164915 A1 | 6/2009 | Gasn et al. | 715/753 |
| 2009/0172559 A1 | 7/2009 | Waldman et al. | 715/744 |
| 2009/0182589 A1 | 7/2009 | Kendall et al. | 705/5 |
| 2009/0189373 A1 | 7/2009 | Schramm et al. | 280/731 |
| 2009/0198487 A1 | 8/2009 | Wong et al. | 704/4 |
| 2009/0228342 A1 | 9/2009 | Walker et al. | 705/10 |
| 2009/0228780 A1 | 9/2009 | McGeehan | 715/234 |
| 2009/0259699 A1 | 10/2009 | Chasman et al. | 707/203 |
| 2009/0276395 A1 | 11/2009 | Weissman et al. | 707/2 |
| 2009/0276405 A1 | 11/2009 | Weissman et al. | 707/3 |
| 2009/0298474 A1 | 12/2009 | George | 455/412.2 |
| 2010/0049534 A1 | 2/2010 | Whitnah et al. | 705/1 |
| 2010/0049852 A1 | 2/2010 | Whitnah et al. | 709/226 |
| 2010/0070323 A1 | 3/2010 | Polcari et al. | 705/8 |
| 2010/0070480 A1 | 3/2010 | Ahuja et al. | 707/703 |
| 2010/0070528 A1 | 3/2010 | Collins et al. | 707/776 |
| 2010/0075655 A1 | 3/2010 | Howarter et al. | 455/420 |
| 2010/0076946 A1 | 3/2010 | Barker et al. | 707/705 |
| 2010/0077468 A1 | 3/2010 | Pragides et al. | 726/7 |
| 2010/0082431 A1 | 4/2010 | Ramer et al. | 705/14.52 |
| 2010/0088316 A1 | 4/2010 | Robinson et al. | 707/737 |
| 2010/0088636 A1 | 4/2010 | Yerkes et al. | 715/809 |
| 2010/0100367 A1 | 4/2010 | Hopkins | 703/13 |
| 2010/0114912 A1 | 5/2010 | Hofhansl et al. | 707/749 |
| 2010/0118025 A1 | 5/2010 | Smith et al. | 345/418 |
| 2010/0120366 A1 | 5/2010 | DeBiasio et al. | 455/41.3 |
| 2010/0132049 A1 | 5/2010 | Vernal et al. | 726/2 |
| 2010/0162375 A1 | 6/2010 | Tiu, Jr. et al. | 726/7 |
| 2010/0164957 A1 | 7/2010 | Lindsay et al. | 345/440 |
| 2010/0169327 A1 | 7/2010 | Lindsay et al. | 707/750 |
| 2010/0180032 A1 | 7/2010 | Lunt | 709/225 |
| 2010/0185580 A1 | 7/2010 | Zhu et al. | 706/52 |
| 2010/0185593 A1 | 7/2010 | Wong et al. | 707/684 |
| 2010/0191719 A1 | 7/2010 | Weissman et al. | 707/716 |
| 2010/0192067 A1 | 7/2010 | Casalaina | 715/742 |
| 2010/0192204 A1 | 7/2010 | Boulos et al. | 726/4 |
| 2010/0198498 A1 | 8/2010 | Jansen | 701/201 |
| 2010/0198581 A1 | 8/2010 | Ellis | 704/4 |
| 2010/0205165 A1 | 8/2010 | Fell et al. | 707/705 |

| | | | | | |
|---|---|---|---|---|---|
| 2010/0205216 A1 | 8/2010 | Durdik et al. ............... 707/783 | 2011/0196855 A1 | 8/2011 | Wable et al. ............... 707/711 |
| 2010/0205227 A1 | 8/2010 | Weissman et al. ........... 707/803 | 2011/0230169 A1 | 9/2011 | Ohki ........................ 455/412.1 |
| 2010/0205243 A1 | 8/2010 | Brady ........................ 709/203 | 2011/0244888 A1 | 10/2011 | Ohki ........................ 455/456.2 |
| 2010/0205595 A1 | 8/2010 | Weissman ................... 717/171 | | | |
| 2010/0211619 A1 | 8/2010 | Weissman et al. ........... 707/812 | | | |
| 2010/0211996 A1 | 8/2010 | McGeehan et al. ............ 726/4 | | | |
| 2010/0211997 A1 | 8/2010 | McGeehan et al. ............ 726/4 | | | |
| 2010/0217645 A1 | 8/2010 | Jin et al. ..................... 705/9 | | | |
| 2010/0217758 A1 | 8/2010 | Weissman et al. ........... 707/713 | | | |
| 2010/0223100 A1 | 9/2010 | Lee et al. .................... 705/10 | | | |
| 2010/0223254 A1 | 9/2010 | Weissman et al. ........... 707/16 | | | |
| 2010/0223255 A1 | 9/2010 | Weissman et al. ........... 707/16 | | | |
| 2010/0223284 A1 | 9/2010 | Brooks et al. ............... 707/769 | | | |
| 2010/0223301 A1 | 9/2010 | Shkvarchuk et al. ......... 707/803 | | | |
| 2010/0223467 A1 | 9/2010 | Dismore et al. ............. 713/168 | | | |
| 2010/0229223 A1 | 9/2010 | Shepard et al. ................ 726/5 | | | |
| 2010/0235322 A1 | 9/2010 | Kuruganti et al. ........... 707/610 | | | |
| 2010/0235445 A1 | 9/2010 | Palmeri et al. .............. 709/204 | | | |
| 2010/0235495 A1 | 9/2010 | Petersen et al. .............. 709/224 | | | |
| 2010/0235837 A1 | 9/2010 | Weissman et al. ............ 718/1 | | | |
| 2010/0250497 A1 | 9/2010 | Redlich et al. .............. 707/661 | | | |
| 2010/0250565 A1 | 9/2010 | Tobin et al. ................. 707/756 | | | |
| 2010/0257023 A1 | 10/2010 | Kendall et al. ................ 705/10 | | | |
| 2010/0257351 A1 | 10/2010 | O'Connor et al. ........... 713/150 | | | |
| 2010/0257459 A1 | 10/2010 | Galbreath et al. ............ 715/753 | | | |
| 2010/0262362 A1 | 10/2010 | Naito et al. .................. 701/204 | | | |
| 2010/0268740 A1 | 10/2010 | Barker et al. ................ 707/783 | | | |
| 2010/0274779 A1 | 10/2010 | Weissman et al. ........... 707/714 | | | |
| 2010/0281014 A1 | 11/2010 | Weissman et al. ........... 707/715 | | | |
| 2010/0281015 A1 | 11/2010 | Weissman et al. ........... 707/716 | | | |
| 2010/0281016 A1 | 11/2010 | Weissman et al. ........... 707/716 | | | |
| 2010/0281039 A1 | 11/2010 | Dayon ........................ 707/754 | | | |
| 2010/0281515 A1 | 11/2010 | Lerner et al. .................. 726/1 | | | |
| 2010/0287503 A1 | 11/2010 | Dayon ........................ 715/810 | | | |
| 2010/0299608 A1 | 11/2010 | Fisher et al. ................. 715/738 | | | |
| 2010/0299663 A1 | 11/2010 | Weissman et al. ........... 717/170 | | | |
| 2010/0299664 A1 | 11/2010 | Taylor et al. ................ 717/173 | | | |
| 2010/0306043 A1 | 12/2010 | Lindsay et al. ............ 705/14.41 | | | |
| 2010/0306536 A1 | 12/2010 | Brouk et al. ................. 713/168 | | | |
| 2010/0318571 A1 | 12/2010 | Pearlman et al. ............. 707/784 | | | |
| 2010/0332447 A1 | 12/2010 | Bezar et al. .................. 707/610 | | | |
| 2011/0004668 A1 | 1/2011 | Salmon et al. ............... 709/208 | | | |
| 2011/0004692 A1 | 1/2011 | Occhino et al. .............. 709/228 | | | |
| 2011/0004831 A1 | 1/2011 | Steinberg et al. ............. 715/753 | | | |
| 2011/0016169 A1 | 1/2011 | Cahill et al. ................. 709/203 | | | |
| 2011/0016381 A1 | 1/2011 | Cahill et al. ................. 715/234 | | | |
| 2011/0016382 A1 | 1/2011 | Cahill et al. ................. 715/234 | | | |
| 2011/0018342 A1 | 1/2011 | Park et al. ..................... 307/23 | | | |
| 2011/0022657 A1 | 1/2011 | Zhu et al. .................... 709/204 | | | |
| 2011/0023017 A1 | 1/2011 | Calvin ........................ 717/120 | | | |
| 2011/0023101 A1 | 1/2011 | Vernal et al. .................. 726/7 | | | |
| 2011/0023129 A1 | 1/2011 | Vernal et al. ................. 726/28 | | | |
| 2011/0029879 A1 | 2/2011 | Calvin ........................ 715/733 | | | |
| 2011/0044354 A1 | 2/2011 | Wei .............................. 370/468 | | | |
| 2011/0055314 A1 | 3/2011 | Rosenstein et al. .......... 709/203 | | | |
| 2011/0055332 A1 | 3/2011 | Stein ........................... 709/206 | | | |
| 2011/0055683 A1 | 3/2011 | Jiang ........................... 715/234 | | | |
| 2011/0060842 A1 | 3/2011 | Reese .......................... 709/232 | | | |
| 2011/0083101 A1 | 4/2011 | Sharon et al. ................ 715/800 | | | |
| 2011/0087526 A1 | 4/2011 | Morgenstern et al. ....... 705/14.1 | | | |
| 2011/0106630 A1 | 5/2011 | Hegeman et al. .......... 705/14.71 | | | |
| 2011/0125599 A1 | 5/2011 | Morin et al. ................. 705/26.1 | | | |
| 2011/0128699 A1 | 6/2011 | Heydari et al. .......... 361/679.48 | | | |
| 2011/0137902 A1 | 6/2011 | Wable et al. ................. 707/737 | | | |
| 2011/0137932 A1 | 6/2011 | Wable .......................... 707/769 | | | |
| 2011/0145287 A1 | 6/2011 | Jiang et al. ................... 707/780 | | | |
| 2011/0145321 A1 | 6/2011 | Jiang ........................... 709/203 | | | |
| 2011/0153377 A1 | 6/2011 | Novikov et al. .............. 705/71.1 | | | |
| 2011/0153412 A1 | 6/2011 | Novikov et al. ........... 705/14.42 | | | |
| 2011/0153416 A1 | 6/2011 | Walker et al. .............. 705/14.49 | | | |
| 2011/0153421 A1 | 6/2011 | Novikov et al. ........... 705/14.52 | | | |
| 2011/0154223 A1 | 6/2011 | Whitnah et al. .............. 715/753 | | | |
| 2011/0154842 A1 | 6/2011 | Heydari et al. ............... 62/259.2 | | | |
| 2011/0156480 A1 | 6/2011 | Park ............................. 307/23 | | | |
| 2011/0161602 A1 | 6/2011 | Adams et al. ................ 711/148 | | | |
| 2011/0161980 A1 | 6/2011 | English et al. ............... 718/105 | | | |
| 2011/0161987 A1 | 6/2011 | Huang et al. ................. 719/318 | | | |
| 2011/0179347 A1 | 7/2011 | Proctor et al. ................ 715/234 | | | |

OTHER PUBLICATIONS

Office Action from U.S. Appl. No. 12/340,607 which was mailed on Sep. 15, 2011.
U.S. Appl. No. 12/340,527, filed Dec. 19, 2008.
U.S. Appl. No. 12/340,531, filed Dec. 19, 2008.
U.S. Appl. No. 12/340,532, filed Dec. 19, 2008.
U.S. Appl. No. 12/340,533, filed Dec. 19, 2008.
U.S. Appl. No. 12/340,534, filed Dec. 19, 2008.
U.S. Appl. No. 12/340,537, filed Dec. 19, 2008.
U.S. Appl. No. 12/340,539, filed Dec. 19, 2008.
U.S. Appl. No. 12/340,550, filed Dec. 19, 2008.
U.S. Appl. No. 12/340,554, filed Dec. 19, 2008.
U.S. Appl. No. 12/340,561, filed Dec. 19, 2008.
U.S. Appl. No. 12/340,575, filed Dec. 19, 2008.
U.S. Appl. No. 12/340,576, filed Dec. 19, 2008.
U.S. Appl. No. 12/340,582, filed Dec. 19, 2008.
U.S. Appl. No. 12/340,584, filed Dec. 19, 2008.
U.S. Appl. No. 12/340,585, filed Dec. 19, 2008.
U.S. Appl. No. 12/340,590, filed Dec. 19, 2008.
U.S. Appl. No. 12/340,592, filed Dec. 19, 2008.
U.S. Appl. No. 12/340,593, filed Dec. 19, 2008.
U.S. Appl. No. 12/340,597, filed Dec. 19, 2008.
U.S. Appl. No. 12/340,598, filed Dec. 19, 2008.
U.S. Appl. No. 12/340,599, filed Dec. 19, 2008.
U.S. Appl. No. 12/340,601, filed Dec. 19, 2008.
U.S. Appl. No. 12/340,602, filed Dec. 19, 2008.
U.S. Appl. No. 12/340,605, filed Dec. 19, 2008.
U.S. Appl. No. 12/340,607, filed Dec. 19, 2008.
U.S. Appl. No. 12/340,615, filed Dec. 19, 2008.
U.S. Appl. No. 12/340,617, filed Dec. 19, 2008.
Arrington, Michael, "Google Docs & Spreadsheets Launches" Oct. 10, 2006 Tech Crunch.
Matsuo et al., "Keyword Extraction From a Single Document Using Word Co-Occurrence Statistical Information," (c) 2003, Intl. Journal on Artificial Intelligence Tools, vol. 13, No. 1, pp. 157-169.
Office Action from U.S. Appl. No. 12/340,527 which was mailed on May 5, 2011.
Office Action from U.S. Appl. No. 12/340,531 which was mailed on Apr. 6, 2011.
Office Action from U.S. Appl. No. 12/340,532 which was mailed on Dec. 29, 2010.
Office Action from U.S. Appl. No. 12/340,532 which was mailed on May 2, 2011.
Office Action from U.S. Appl. No. 12/340,533 which was mailed on Mar. 2, 2011.
Office Action from U.S. Appl. No. 12/340,534 which was mailed on Dec. 30, 2010.
Office Action from U.S. Appl. No. 12/340,534 which was mailed on Jun. 28, 2011.
Office Action from U.S. Appl. No. 12/340,537 which was mailed on Feb. 2, 2011.
Office Action from U.S. Appl. No. 12/340,537 which was mailed on Jul. 7, 2011.
Office Action from U.S. Appl. No. 12/340,539 which was mailed on Jul. 26, 2011.
Office Action from U.S. Appl. No. 12/340,554 which was mailed on Jul. 28, 2011.
Office Action from U.S. Appl. No. 12/340,561 which was mailed on Aug. 5, 2011.
Office Action from U.S. Appl. No. 12/340,576 which was mailed on Apr. 20, 2011.
Office Action from U.S. Appl. No. 12/340,582 which was mailed on Dec. 9, 2010.
Office Action from U.S. Appl. No. 12/340,582 which was mailed on May 27, 2011.
Office Action from U.S. Appl. No. 12/340,584 which was mailed on Apr. 20, 2011.

Office Action from U.S. Appl. No. 12/340,585 which was mailed on Apr. 20, 2011.
Office Action from U.S. Appl. No. 12/340,590 which was mailed on Apr. 21, 2011.
Office Action from U.S. Appl. No. 12/340,592 which was mailed on Jun. 29, 2011.
Office Action from U.S. Appl. No. 12/340,593 which was mailed on Jun. 30, 2011.
Office Action from U.S. Appl. No. 12/340,598 which was mailed on Aug. 24, 2011.
Office Action from U.S. Appl. No. 12/340,599 which was mailed on Jul. 18, 2011.
Office Action from U.S. Appl. No. 12/340,601 which was mailed on Mar. 31, 2011.
Office Action from U.S. Appl. No. 12/340,602 which was mailed on Feb. 4, 2011.
Office Action from U.S. Appl. No. 12/340,602 which was mailed on Aug. 20, 2010.
Office Action from U.S. Appl. No. 12/340,602 which was mailed on Aug. 5, 2011.
Office Action from U.S. Appl. No. 12/340,605 which was mailed on Aug. 26, 2011.
Office Action from U.S. Appl. No. 12/340,607 which was mailed on Mar. 31, 2011.
Office Action from U.S. Appl. No. 12/340,617 which was mailed on Jun. 24, 2011.
Office Action from U.S. Appl. No. 12/340,550 which was mailed on Sep. 28, 2011.
Office Action from U.S. Appl. No. 12/340,615 which was mailed on Sep. 28, 2011.
Notice of Allowance from U.S. Appl. No. 12/340,584 which was mailed on Sep. 29, 2011.
Notice of Allowance from U.S. Appl. No. 12/340,585 which was mailed on Sep. 29, 2011.
U.S. Appl. No. 13/287,083 filed on Nov. 1, 2011.
U.S. Appl. No. 13/287,089 filed on Nov. 1, 2011.
Notice of Allowance from U.S. Appl. No. 12/340,576 which was mailed on Oct. 21, 2011.
Notice of Allowance from U.S. Appl. No. 12/340,576 which was mailed on Sep. 30, 2011.
Notice of Allowance from U.S. Appl. No. 12/340,584 which was mailed on Oct. 18, 2011.
Notice of Allowance from U.S. Appl. No. 12/340,585 which was mailed on Oct. 19, 2011.
Notice of Allowance from U.S. Appl. No. 12/340,590 which was mailed on Oct. 17, 2011.
Office Action from U.S. Appl. No. 12/340,533 which was mailed on Oct. 19, 2011.
Office Action from U.S. Appl. No. 12/340,582 which was mailed on Oct. 19, 2011.
Notice of Allowance from U.S. Appl. No. 12/340,539 which was mailed on Nov. 9, 2011.
Notice of Allowance from U.S. Appl. No. 12/340,539 which was mailed on Nov. 28, 2011.
Office Action from U.S. Appl. No. 12/340,527 which was mailed on Nov. 9, 2011.
Office Action from U.S. Appl. No. 12/340,531 which was mailed on Nov. 22, 2011.
Office Action from U.S. Appl. No. 12/340,593 which was mailed on Nov. 17, 2011.
Office Action from U.S. Appl. No. 12/340,599 which was mailed on Nov. 15, 2011.
Office Action from U.S. Appl. No. 12/340,617 which was mailed on Nov. 17, 2011.
Office Action from U.S. Appl. No. 12/340,592 which was mailed on Dec. 13, 2011.
BMW AG, "2005 645Ci Owner's Manual," Sep. 2004.

* cited by examiner

1300

NETWORK BROWSER PLUGIN(S)

APP_1
- NAME
- LOGIN INFO
- URL
- PREFERENCES

APP_2
- NAME
- LOGIN INFO
- URL
- PREFERENCES

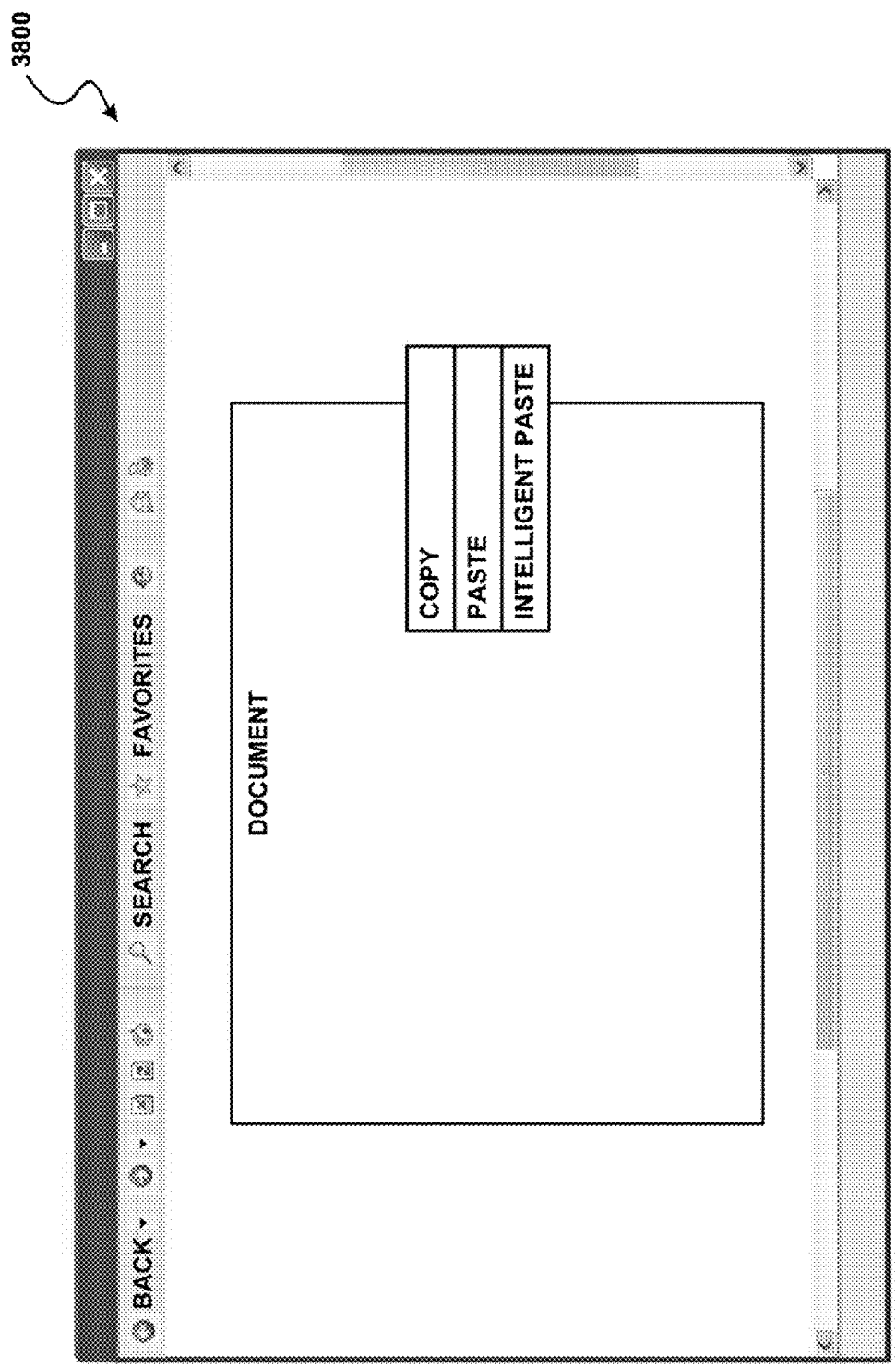

US 8,117,242 B1

SYSTEM, METHOD, AND COMPUTER PROGRAM PRODUCT FOR PERFORMING A SEARCH IN CONJUNCTION WITH USE OF AN ONLINE APPLICATION

RELATED APPLICATIONS

The present application claims priority from U.S. Provisional Application No. 61/022,262, filed Jan. 18, 2008, which is incorporated herein by reference in its entirety for all purposes.

BACKGROUND AND FIELD OF THE INVENTION

The present invention relates to software applications, and more particularly to online applications.

SUMMARY

A system, method, and computer program product are provided for performing a search in conjunction with use of an online application. In operation, a document editing interface is displayed for editing a document. Additionally, at least one term of the document is identified. Further, a search interface is displayed. Still yet, a search is performed utilizing the search interface, based on the at least one term.

BRIEF DESCRIPTION OF THE DRAWINGS

FIG. 13 shows a network browser plugin for accommodating different online applications, in accordance with one embodiment.

FIG. 38 shows an interface for intelligent cutting and pasting, in accordance with one embodiment.

DETAILED DESCRIPTION

Figure 1:
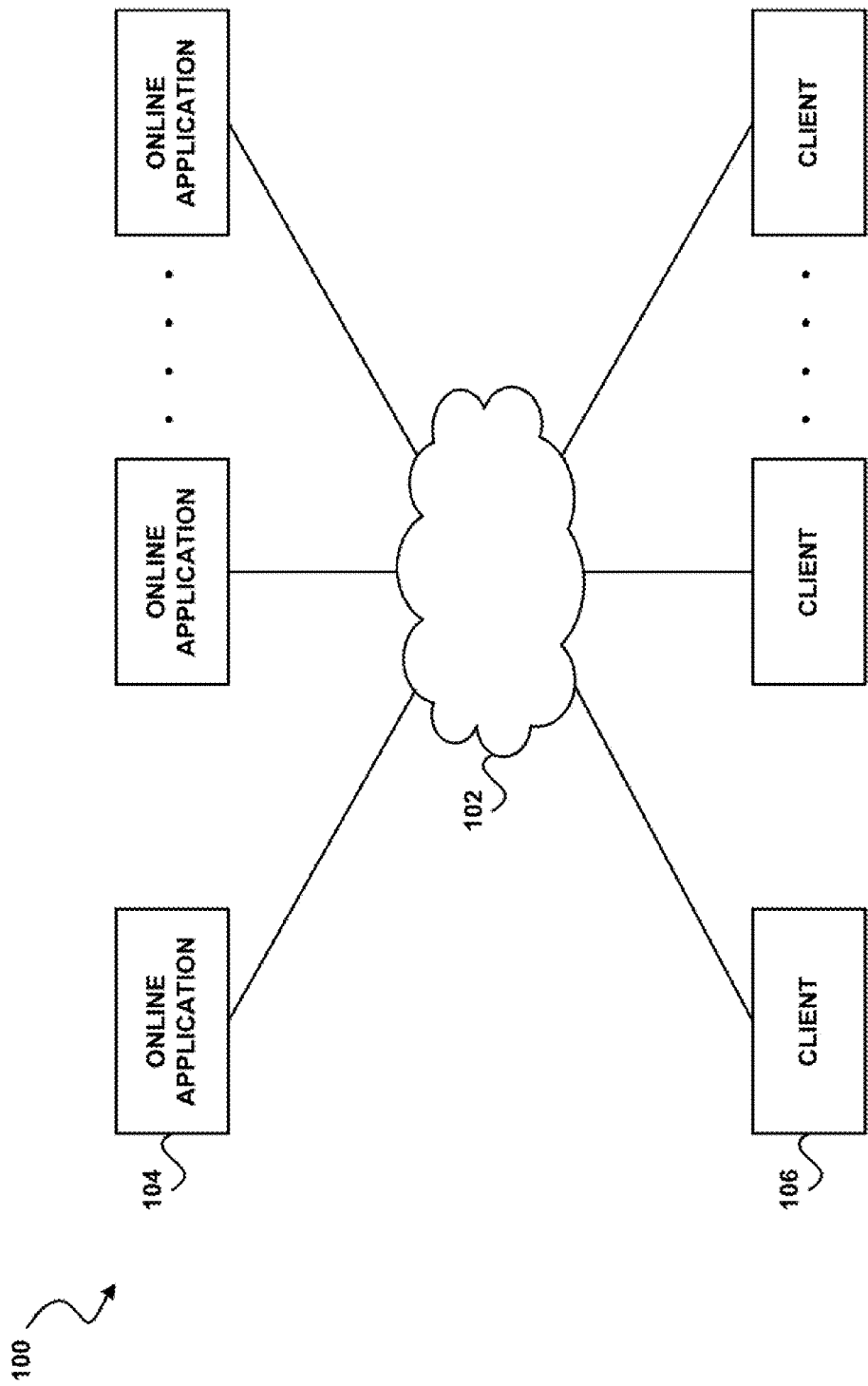
FIG. 1 shows a system for accessing one or more online applications, in accordance with one embodiment.

FIG. 1 shows a system 100 for accessing one or more online applications, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104, including one or more online software applications, which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway is optionally coupled therebetween.

Figure 2:
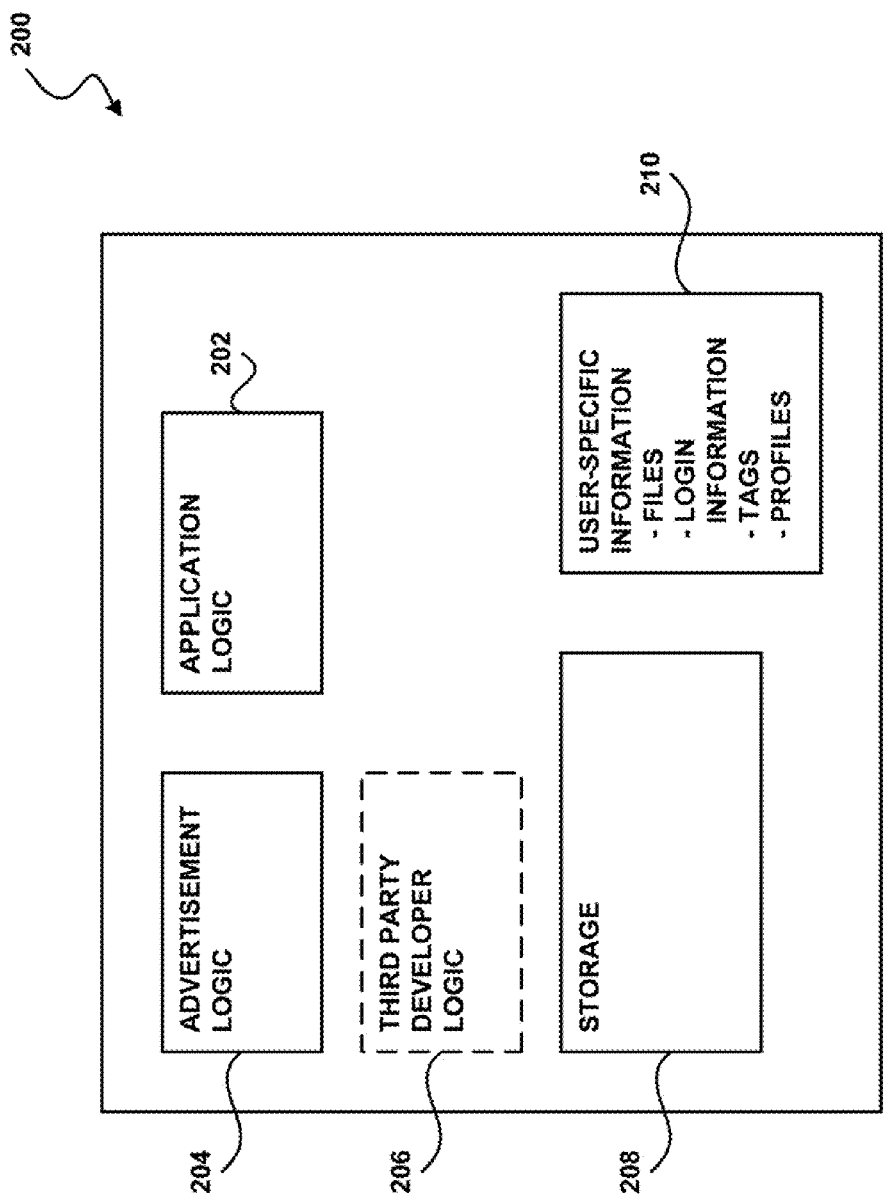
FIG. 2 shows a representative environment that may be associated with the servers and/or clients of FIG. 1, in accordance with one embodiment.

FIG. 2 shows a representative environment 200 that may be associated with the servers 104 and/or clients 106 of FIG. 1, in accordance with one embodiment. As shown, the environment 200 may include software application logic 202, advertisement logic 204, and third party developer logic 206. Furthermore, storage 208 may also be provided such that documents may be stored. In some cases, these documents may include documents associated with online applications. Additionally, other storage may be provided for various other data such as user specific information 210.

Various embodiments set forth herein may be implemented utilizing hardware, software, or any desired combination thereof. For that matter, any type of logic may be utilized which is capable of implementing the various functionality set forth herein.

Figure 3:
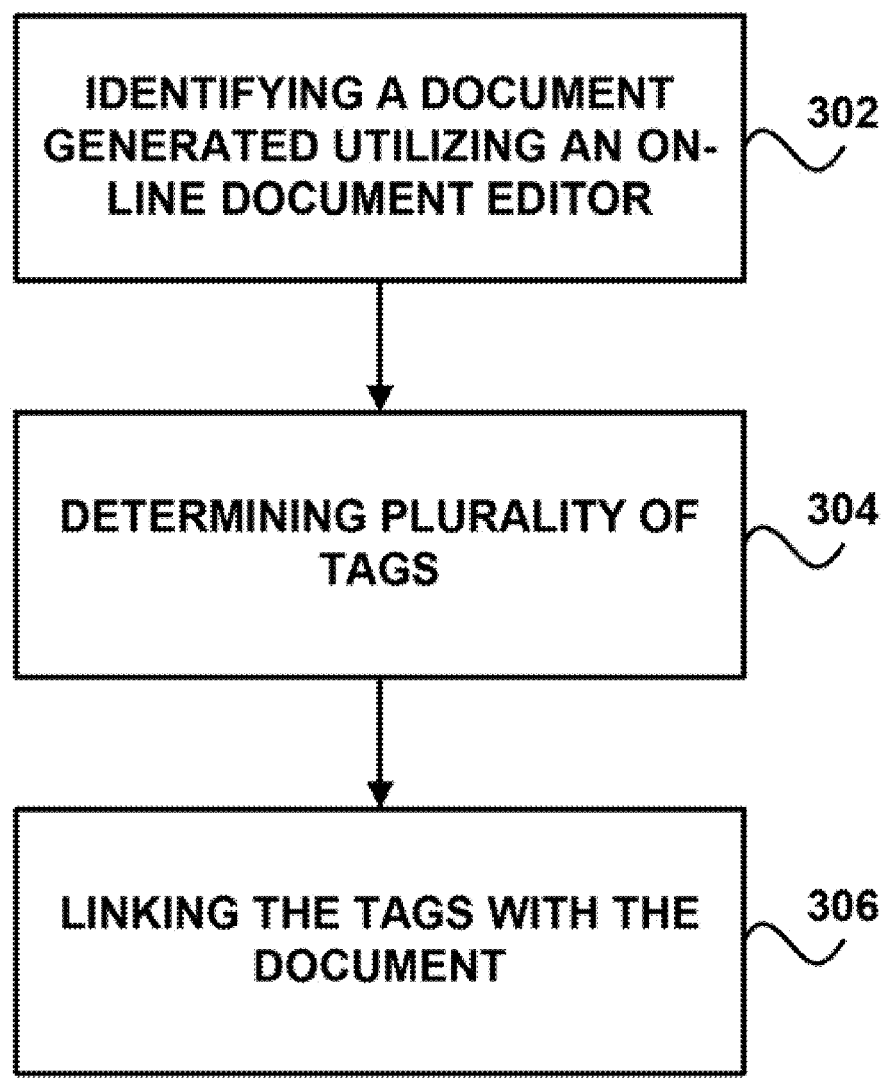
FIG. 3 shows a method for linking a plurality of tags with a document, in accordance with one embodiment.

FIG. 3 shows a method 300 for linking a plurality of tags with a document, in accordance with one embodiment. As an option, the present method 300 may be implemented in the context of the functionality and architecture of FIGS. 1-2. Of course, however, the method 300 may be carried out in any desired environment. It should also be noted that the aforementioned definitions may apply during the present description.

As shown, a document generated utilizing an online document editor is identified. See operation 302. In the context of the present description, an online document editor refers to any online editor used to generate or modify documents. For example, in various embodiments, the online document editor may include, but is not limited to, WebOffice Document Manager, Zoho Writer, Google Docs, and/or any other document editor that meets the above definition.

Further, the document generated may include any document capable of being generated with an editor. For example, in various embodiments, the document may include a may include, but is not limited to, a text document, any word processor document (e.g. a Microsoft Word document, Microsoft Works document, etc.), a spreadsheet document (e.g. a .xls document, etc.), a presentation document (e.g. a .ppt document, etc.), a portable document format (PDF) file, a picture, a drawing, and/or any other document that meets the above definition.

Additionally, a plurality of tags are determined. See operation 304. In the context of the present description, a tag refers to any keyword, term, or phrase associated with or assigned to a piece of information (e.g. a picture, a geographic map, a blog entry, a video clip, or any document, etc.).

Furthermore, the tags are linked with the document. See operation 306. As an option, the tag may be utilized to describe the document and enable keyword-based classification and searches of information associated with such document.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
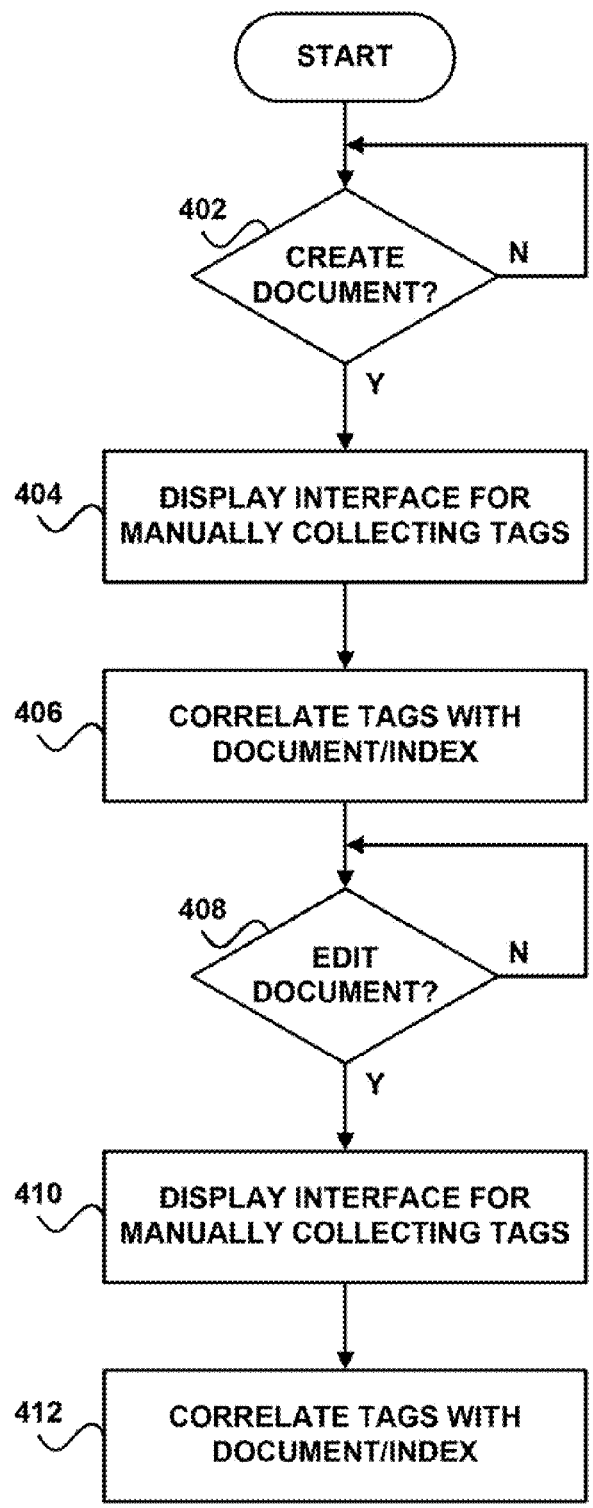
FIG. 4 shows a method for linking a plurality of tags with a document, in accordance with another embodiment.

FIG. 4 shows a method 400 for linking a plurality of tags with a document, in accordance with another embodiment. As an option, the present method 400 may be implemented in the context of the functionality and architecture of FIGS. 1-3. Of course, however, the method 400 may be carried out in any desired environment. It should also be noted that the aforementioned definitions may apply during the present description.

As shown, it is determined whether online documents have been created. See operation 402. If one or more documents have been created, an interface is displayed for manually collecting tags. See operation 404. As an option, the interface may be displayed upon saving the document. As another option, the interface may be displayed by selecting a tag creation icon or option in a menu or a toolbar.

Furthermore, the interface may include various functionality for manually collecting the tags. For example, the interface may include text edit boxes for manually inserting tags. The interface may also include a drop-down menu or other list of potential tags.

Additionally, the interface may provide suggested tags. For example, the list or drop-down menu may include a list of suggested tags. As another option, upon invocation of the interface, suggested tags may be highlighted in the created document. In this case, the interface may include text from the selected document illustrating the highlighted words or phrases to potentially be used as tags. Further, the document itself may include the highlighted words or phrases. In this case, a user may have the option to select the highlighted words or phrases (e.g. by clicking or scrolling over) utilizing a mouse.

In one embodiment, the tags may be manually selected from the document without by selecting any of the text in the document, not necessarily recommended tags. Further, the interface may provide a list of words in the created document with an associated number indicating the frequency of use in the document. These words may be ordered in a list from most to least use, for example. Additionally, the list may only include a certain number of the most used words in the document.

As another option, the tags may be recommended based on previously existing tags. For example, if a plurality of existing tags include a specific word or term, but other tags associated with those particular tags are dissimilar, a tag may be recommended that exploits this dissimilarity. As a specific example, if two existing documents have a tag that includes "apple" and another tag that includes "computer," but the newly created document has multiple occurrences of the term "apple" and few occurrences of the term "computer" in the document, another keyword may be recommended based on the number of times found in the document (e.g. "fruit") to distinguish the documents.

Once the tags have been collected, the tags are correlated with a document/index. See operation 406. In this way, the tags may be indexed. For example, the tags may then be associated or linked with/to the document and an index location such that the tag may be utilized to access the indexed location of the document. In this case, an index may refer to any location of a data structure. Furthermore, the index may refer to any location in a database. In this way, the tags may be utilized for searching the documents.

Once the tags are correlated with a document/index, it is determined whether the document is to be edited. See operation 408. For example, the document may be selected to be edited by the user. If the document is to be edited, the interface is displayed for manually collecting tags. See operation 410. As an option, the interface may be displayed when the edited document is to be saved (e.g. when the user selects a save document option or icon, etc.).

Once the tags have been collected, the tags are correlated with the document/index. See operation 412. It should be noted, that suggested tags may again be optionally displayed using the interface. Furthermore, the user may have the option to utilize previously generated tags instead of generating new or additional tags.

Figure 5:
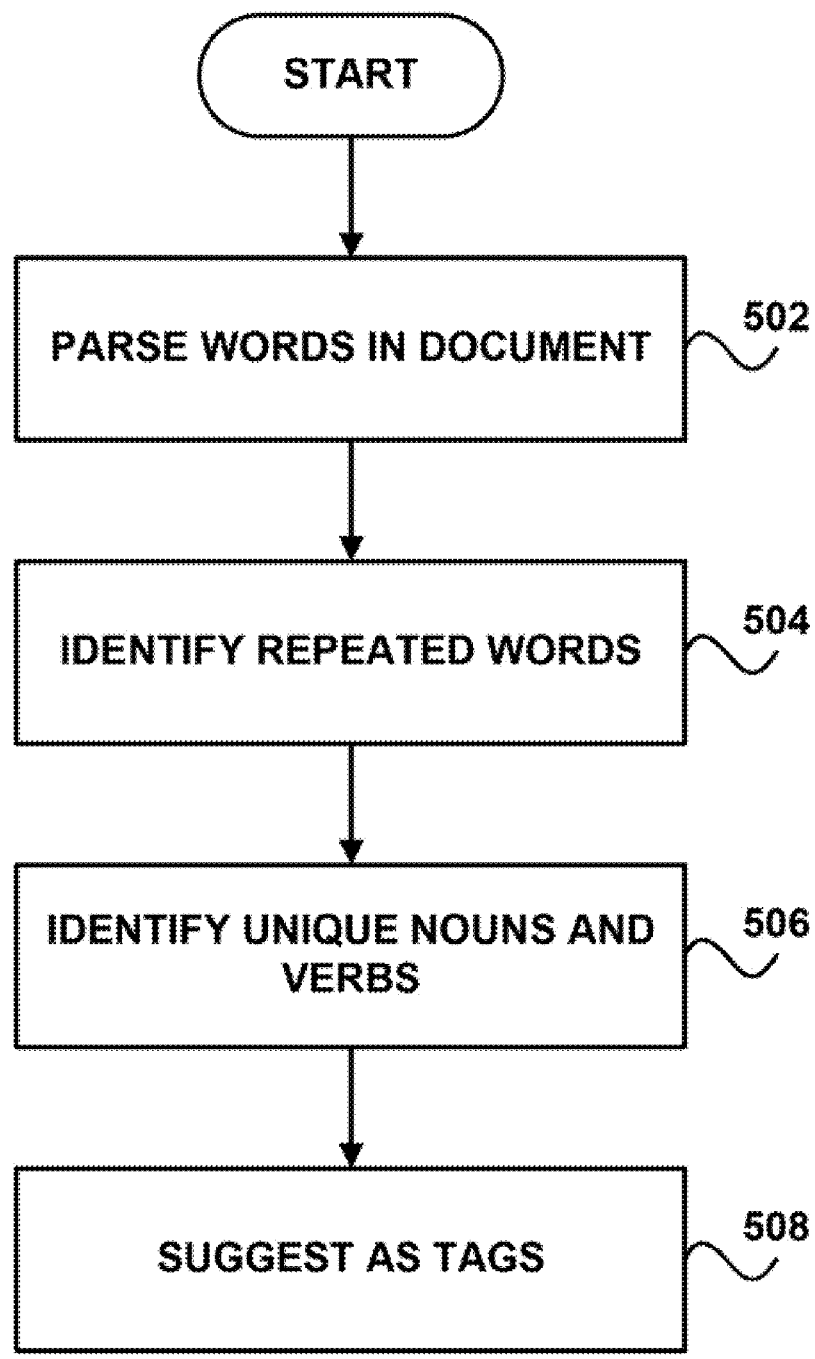
FIG. 5 shows a method for suggesting tags or automatically selecting tags, in accordance with another embodiment.

In addition to manual selection, in another embodiment, the tags may also be automatically selected. FIG. 5 shows a method 500 for suggesting tags or automatically selecting tags, in accordance with another embodiment. As an option, the present method 500 may be implemented in the context of the functionality and architecture of FIGS. 1-4. Of course, however, the method 500 may be carried out in any desired environment. It should also be noted that the aforementioned definitions may apply during the present description.

As shown, words in a document are parsed. See operation 502. In the context of the present description, parsing refers to transforming text into a word or data structure. For example, in various embodiments, parsing may include, but is not limited to, extracting words from text, extracting phrases from text, extracting symbols from text, lexical functional grammar parsing, head-driven phrase structure grammar parsing, shallow parsing, dependency grammar parsing, etc.

Once the words in the document have been parsed, repeated words are identified. See operation 504. In one embodiment, identifying the repeated words may include implementing a statistical analysis on the repeated words to determine a frequency of use and/or a relevance analysis (i.e. the likelihood the word is relevant in the context used). As an option, the identification of repeated words may include only identifying nouns and/or verbs that are repeated.

Furthermore, unique nouns and or verbs may also be identified. See operation 506. In this case, the unique nouns or verbs may be identified from the list of repeated words and/or non-repeated words in the document. In one embodiment, the unique nouns or verbs may refer to any noun or verb that is not statistically likely to appear in a document (e.g. less than 60% likely, 50% likely, 40% likely, etc.). Additionally, the unique nouns or verbs may be determined based on the frequency of use in the document.

As shown further, tags may be suggested based on the identification. See operation 508. In this way, nouns, verbs, and/or repeated words may be determined to be tags.

In various embodiments, the tags may be suggested as a list, dialog box, input text box, highlighted text, etc. Furthermore, the tags may be automatically selected and applied. For example, an interface may provide a user an option to have tags automatically selected. In this case, tags that would otherwise be suggested may be utilized as tags automatically. Thus, the tags may be determined automatically by parsing words in the document.

Figure 6:
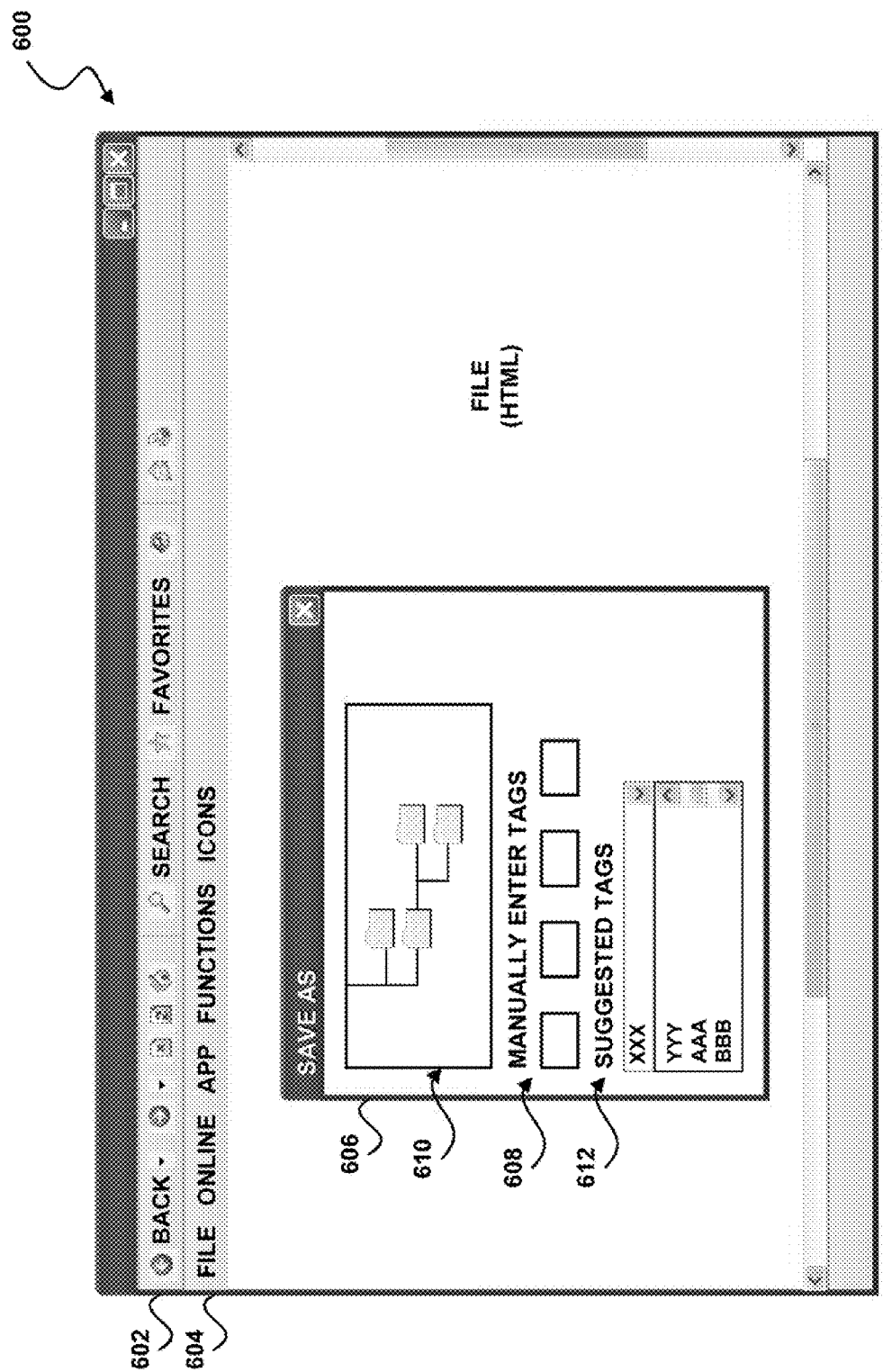
FIG. 6 shows an interface for linking a plurality of tags with a document, in accordance with one embodiment.

FIG. 6 shows an interface 600 for linking a plurality of tags with a document, in accordance with one embodiment. As an option, the interface 600 may be implemented in the context of the details of FIGS. 1-5. Of course, however, the interface 600 may be implemented in any desired environment. It should also be noted that the aforementioned definitions may apply during the present description.

As shown, the interface 600 may include a navigator bar 602 (e.g. an explorer bar) including back, forward, stop, reload, etc. functionally for navigating online. Further, a toolbar 604 may be provided including various functionality for accessing/managing documents. For example, the toolbar 604 may include a file option to access functionality associated with a document (e.g. save, save as, send, properties, etc.). Furthermore, the toolbar 604 may include options for switching between online applications (e.g. word processors, spread sheet generation tools, PDF generators, etc.). Still yet, the toolbar may include various other functions such as view options, format options, tool options, table options, window options, help options, and various icons associated with various functionality.

Additionally, the interface 600 includes a window for viewing documents. In operation, a user may generate a document or a plurality of documents using the interface 600. Tags may then be determined manually or automatically, correlating to the document.

As an option, the tags may be manually entered upon saving the document. For example, upon save the document a user interface 606 may be displayed, allowing a user to manually enter a tag or a plurality or tags into a text box 608. In one embodiment, the interface 606 may include a folder directory 610. Furthermore, the interface 606 may include a list of suggested tags 612. Once the tags have been selected (manually and/or automatically), the tags are indexed.

Thus, the tags may be utilized for searching the documents. As an option, the interface 600 may allow the user to search a plurality of documents using the tags. In this way, the user may examine tags relating to information being sought, and the tag may be used to find appropriate documents.

It should be noted that the interface 600 may represent any network browser. Thus, by using the interface 600 multiple online applications may be accessed utilizing the tags. Furthermore, in various embodiments, the documents may be created using many different online applications. As an option, these online applications may employ functionality of various other online applications.

Figure 7:
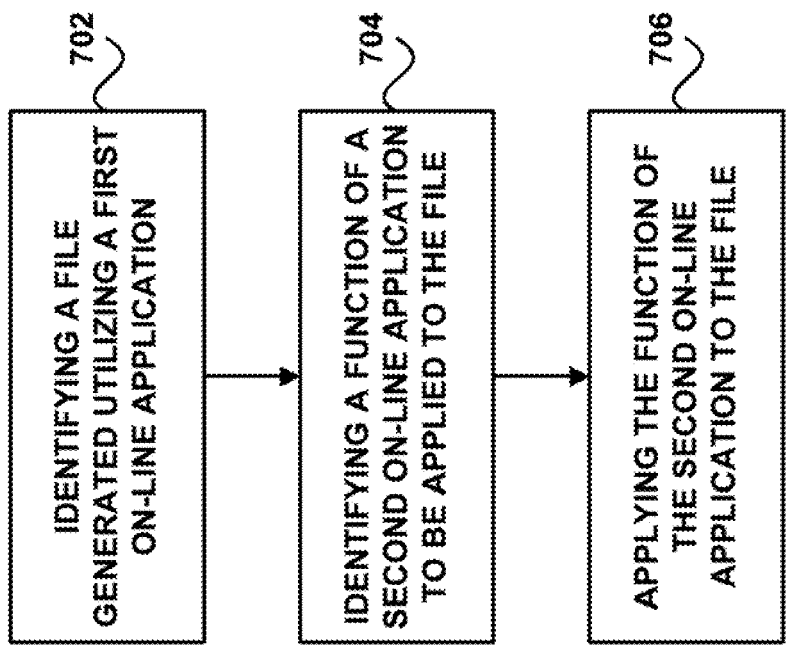
FIG. 7 shows a method for applying a function of an online application to a file generated by a second online application, in accordance with one embodiment.

FIG. 7 shows a method 700 for applying a function of an online application to a file generated by a second online application, in accordance with one embodiment. As an option, the present method 700 may be implemented in the context of the functionality and architecture of FIGS. 1-6. Of course, however, the method 700 may be carried out in any desired environment. It should also be noted that the aforementioned definitions may apply during the present description.

As shown, a file generated utilizing a first online application is identified. See operation 702. In the context of the present description, an online application refers to any software application that is utilized over a network. For example, in various embodiments, the online applications may include, but are not limited to, online word processors, online spread sheet generators, online presentation tools and generators, online project management software, online accounting software, and/or any other online applications that meet the above definition.

Additionally, a function of a second online application to be applied to the file is identified. See operation 704. In the context of the present description, a function refers to function associated with an application. For example, in various embodiments, the function may include, but is not limited to, a format conversion, a commenting function, a publishing function, a spell check function, a track changes function, a text formatting function, an object modifying function, a drawing function, a table function, a macro function, and/or any other function that meets the above definition.

Further, the function of the second online application is applied to the file. See operation 706. The function may be applied in a variety of ways. For example, the function of the second online application may be applied to the file utilizing code stored at a server hosting the first online application. As another example, the function of the second online application may be applied to the file utilizing code stored at a server hosting the second online application. In this case, the function may be applied by passing a URL associated with the file to second online application.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 8:
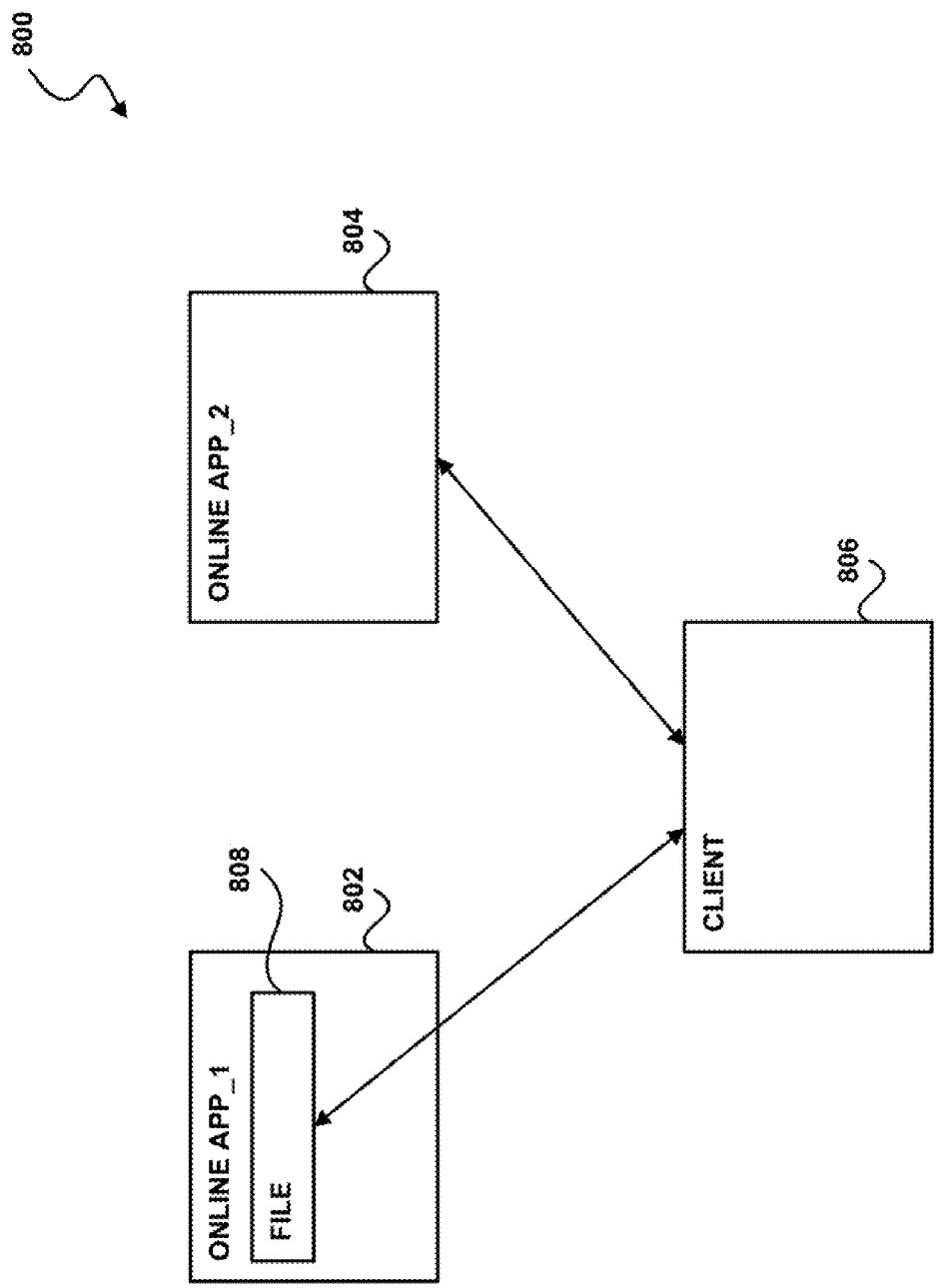
FIG. 8 shows a system for applying a function of an online application to a file generated by a second online application, in accordance with one embodiment.

FIG. 8 shows a system 800 for applying a function of an online application to a file generated by a second online application, in accordance with one embodiment. As an option, the system 800 may be implemented in the context of the functionality and architecture of FIGS. 1-7. Of course, however, the system 800 may be implemented in any desired environment. It should also be noted that the aforementioned definitions may apply during the present description.

As shown, a server including a first online application 802, a server including a second online application 804, and a client 806 are provided. In operation, a file 808 generated utilizing the first online application 802 is identified. Additionally, a function of the second online application 804 is identified to be applied to the file 808. Further, the function of the second online application 806 is applied to the file 808.

In one case, the function of the second online application 806 may be unavailable utilizing the first online application. In this way, functionality of multiple applications may be shared between applications.

As shown further, the client 806 has access to both the first and second online applications 802 and 804. For example, the first online application 802 and the second online application 804 may be accessible via a network browser. In this way, the function of the second online application 804 may be selected utilizing the network browser.

For example, the function of the second online application 804 may be selected utilizing a toolbar of the network browser. In this case, the toolbar may include a plugin. In the context of the present description, a plugin refers to any computer program that interacts with a host application (e.g. the network browser, etc.). In one embodiment, the plugin may provide a function using an icon and/or dedicated text.

Although not illustrated, in one embodiment, the first the second online application 802 and 804 may be included on one server. In another embodiment, the server including the first online application 802 and the server including the second online application 804 may be in communication. In this way, applying the function of the second application 804 to the file 808 may not necessarily involve communicating data via the client 806, as shown in FIG. 8.

Figure 9:
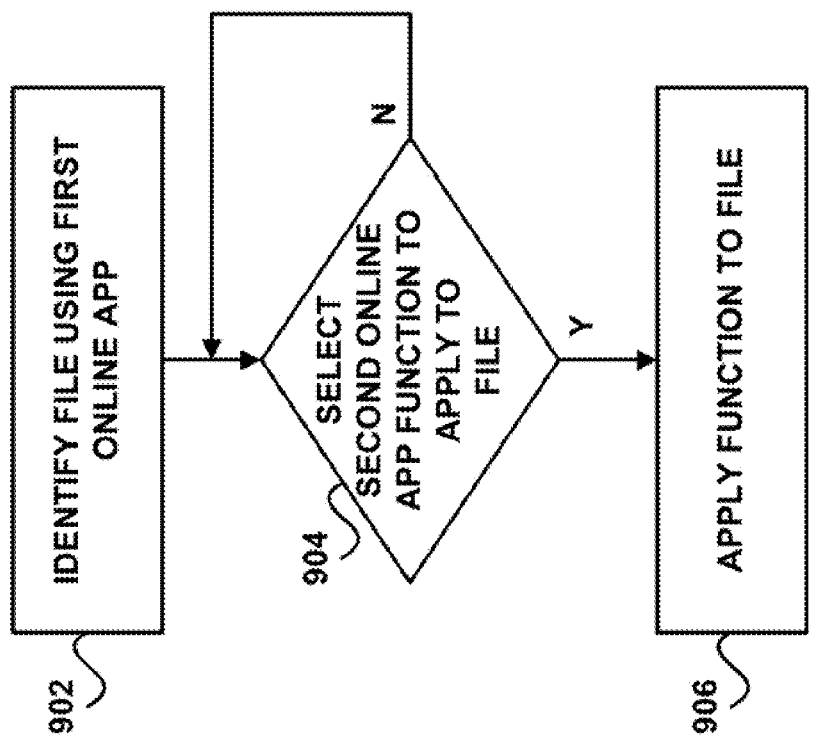
FIG. 9 shows a method for applying a function of an online application to a file generated by a second online application, in accordance with one embodiment.

FIG. 9 shows a method 900 for applying a function of an online application to a file generated by a second online application, in accordance with one embodiment. As an option, the present method 900 may be implemented in the context of the functionality and architecture of FIGS. 1-8. Of course, however, the method 900 may be carried out in any desired environment. It should also be noted that the aforementioned definitions may apply during the present description.

As shown, a file is identified using a first online application. See operation 902. As an option, identifying the file may include selecting the file via a user interface. As another option, the file may be selected from a network browser. In this case, the network browser may include a drop-down list of potential files. In one embodiment, the network browser may include a bookmark to the file.

Once the file is selected using the first online application, it is determined whether a function from a second online application function is selected to be applied to the file. See operation 904. As an option, the function may be selected using a toolbar including functionality of both the first and second application. In one case, this toolbar may be displayed upon accessing two or more applications. For example, upon accessing a first online application, a toolbar including functionality of the first application may be displayed. Then, after accessing a second online application, the toolbar may be updated to include functionality of the second online application.

In another embodiment, a toolbar may be displayed including functionality of all available online applications. In this case, the available functionality may include only online application functions available to a user or compatible with the opened file and/or application.

If it is determined that a function from the second online application is selected to be applied to the file, the function is applied to the file. See operation 906. The function may be applied to the file in many ways. For example, in one embodiment, code including the function may be transferred to the server including the first application such that the first application may apply the function to the file.

In another embodiment, the file may be transferred to the server including the second online application and the function may be applied to the file. In still another embodiment, the server including the file and the first online application may include a list of various functions and associated code, capable of being applied to the file. In this case, such functionality may or may not be included as part of the first application. As an option, all capable functionality of the first online application and/or the second online application may be available via a network browser.

Figure 10:
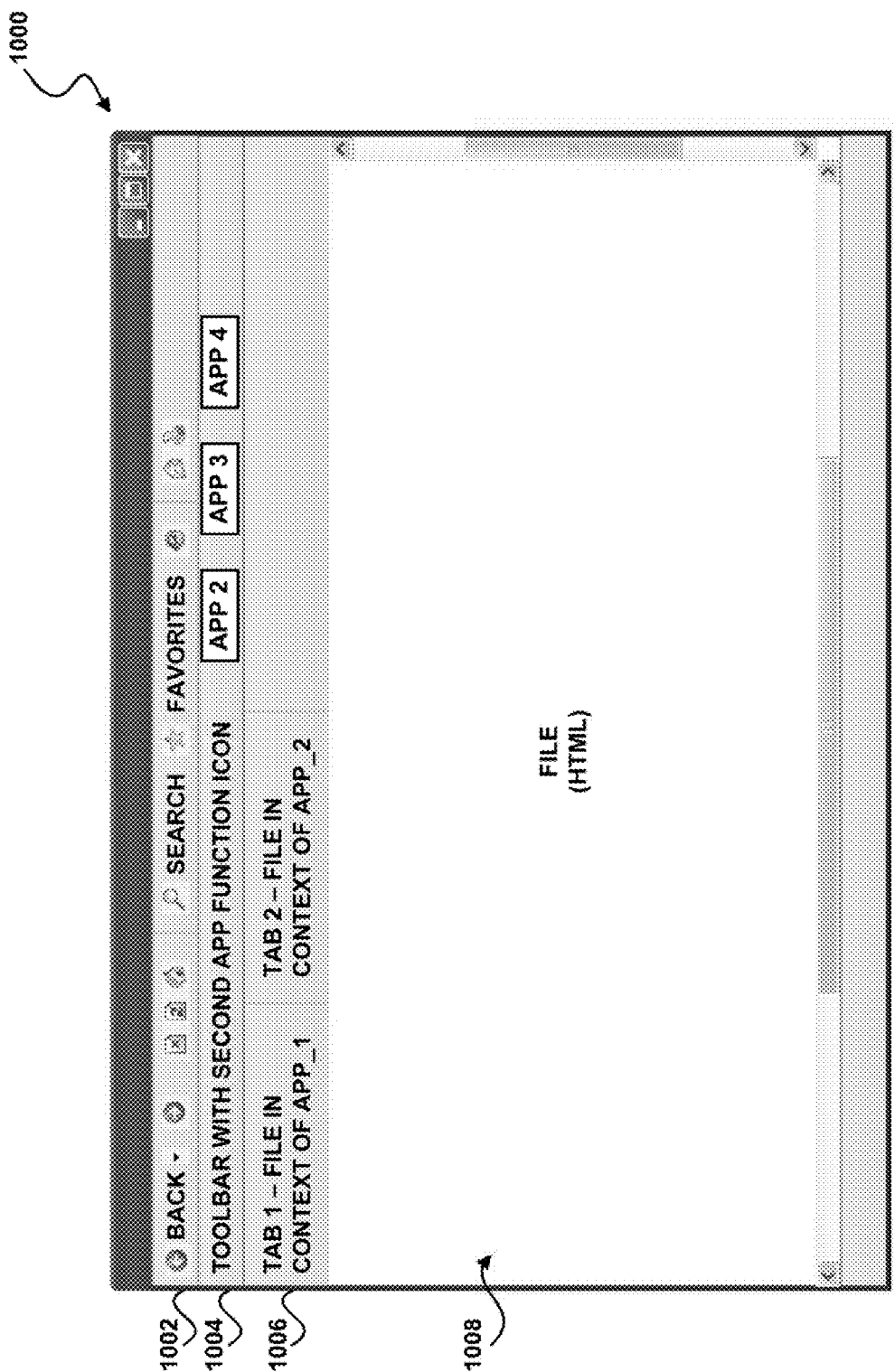
FIG. 10 shows a network browser for applying a function of an online application to a file generated by a second online application, in accordance with one embodiment.

FIG. 10 shows a network browser 1000 for applying a function of an online application to a file generated by a second online application, in accordance with one embodiment. As an option, the network browser 1000 may be implemented in the context of the details of FIGS. 1-9. Of course, however, the network browser 1000 may be implemented in any desired environment. It should also be noted that the aforementioned definitions may apply during the present description.

As shown, the network browser 1000 may include a navigator bar 1002 (e.g. an explorer bar) including back, forward, stop, reload, etc. functionally for navigating a network. Further, a toolbar 1004 may be provided including various functionality for accessing/managing files and/or applications. For example, the toolbar 1004 may include functions of a plurality of applications.

In one embodiment, the toolbar 1004 may only include functions of open applications. In another embodiment, the toolbar 1004 may only include functions that may be applied to an open file or application in use. In still another embodiment, the toolbar may include all functions available to a user.

As an option, the functions available to a user may include only functions associated with applications to which the user has usage rights.

In addition to various application functions, in other embodiments, the toolbar 1004 may include a file option to access functionality associated with a file (e.g. save, save as, send, properties, etc.). Furthermore, the toolbar 1004 may include options for switching between online applications (e.g. word processors, spread sheet generation tools, PDF generators, etc.). Still yet, the toolbar may include various other functions such as view options, format options, tool options, table options, window options, help options, and various icons associated with various functionality.

Additionally, the network browser 1000 or the toolbar 1004 may include a tab bar 1006 for easy toggling between applications and files. As an option, the tab bar 1006 may allow the same file to be viewed in the context of a first online application and a second online application. In this way, a file opened by the first online application under a first tab may be viewed in the context of a second online application under a second tab, allowing a function of the second online application to be applied to the file when viewed under the second tab and/or the first tab.

Furthermore, results of applying the function may be displayed in a separate window. For example, after applying the function to the file, the results may be displayed under a tab separate from the first and/or second online application, or a separate window 1007 of the network browser 1000 or a separate network browser (not shown).

It should be noted that, the toolbar 1004 may display functions of an individual online application, or a plurality of different applications. In some cases, the different online applications may be applications located on separate servers.

Figure 11:
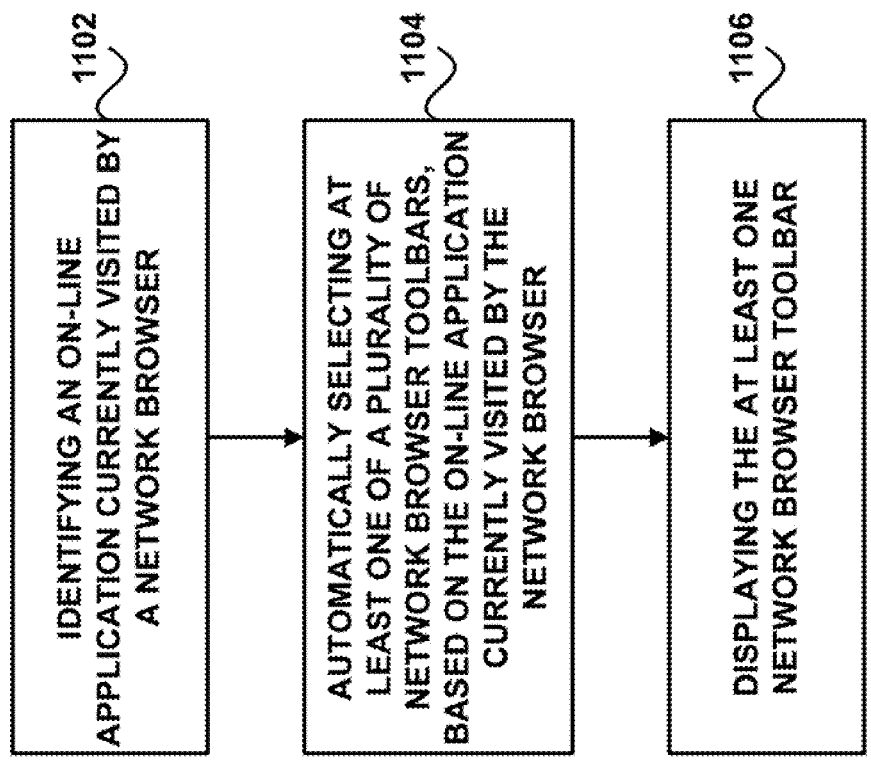
FIG. 11 shows a method for accommodating different online applications, in accordance with one embodiment.

FIG. 11 shows a method 1100 for accommodating different online applications, in accordance with one embodiment. As an option, the present method 1100 may be implemented in the context of the functionality and architecture of FIGS. 1-10. Of course, however, the method 1100 may be carried out in any desired environment. It should also be noted that the aforementioned definitions may apply during the present description.

As shown, an online application currently visited by a network browser is identified. See operation 1102. Additionally, at least one of a plurality of network browser toolbars is automatically selected based on the online application currently visited by the network browser. See operation 1104. Furthermore, the at least one network browser toolbar is displayed. See operation 1106.

In the context of the present description, a network browser toolbar refers to any row, column, or block of buttons, icons, or linked words that, when clicked, activate certain functions of an application. For example, in various embodiments, the toolbar may include save functions, spell check functions, text formatting functions, file formatting functions, search functions, drawing functions, and/or any other functions associated with an application.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 12:
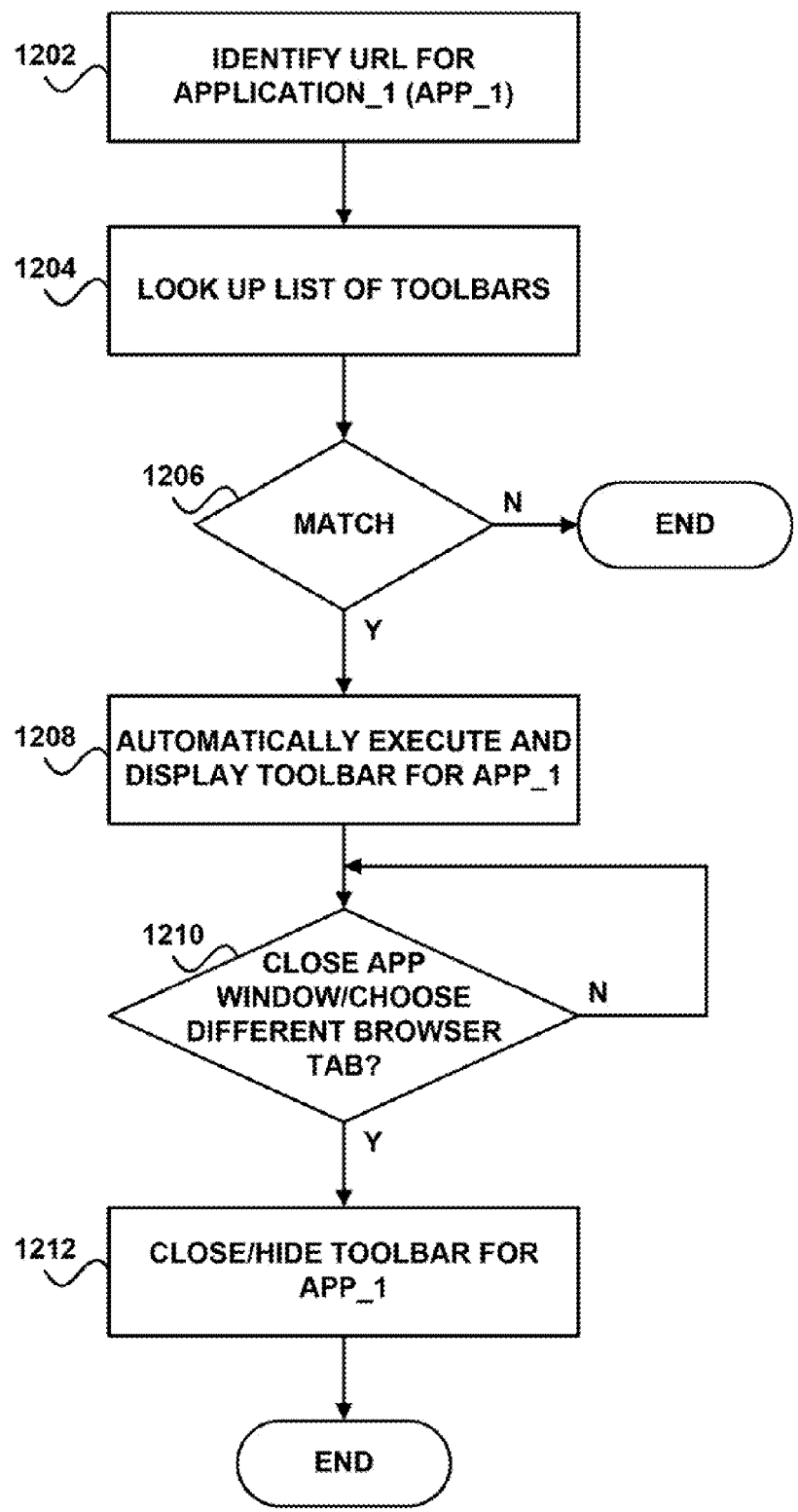
FIG. 12 shows a method for accommodating different online applications, in accordance with one embodiment.

FIG. 12 shows a method 1200 for accommodating different online applications, in accordance with one embodiment. As an option, the present method 1200 may be implemented in the context of the functionality and architecture of FIGS. 1-11. Of course, however, the method 1200 may be carried out in any desired environment. It should also be noted that the aforementioned definitions may apply during the present description.

As shown, a URL is identified for a first online application. See operation 1202. In this case, the URL may be identified upon accessing the first application and/or by opening a file associated with the first application. For example, a user may access the first online application using a network browser. In this way, the online application may be identified by monitoring URLs entered into the network browser.

Further, a list of toolbars is examined to find a toolbar associated with the URL or the first application are examined. See operation 1204. For example, a list including a plurality of toolbars associated with various online applications may be stored in a database. Using the identified URL and/or other information about the first online application, the list of toolbars may be examined to determine whether an appropriate toolbar is present for the first online application.

Once the URL has been identified, it is determined whether there is an appropriate toolbar present. See operation 1206. In one embodiment, the URLs entered in the network browser may be compared against a list of predetermined URLs associated with online applications for which an associated toolbar is stored on a client on which the network browser is installed.

If there is appropriate toolbar present, a toolbar is automatically executed and displayed for the first online application. See operation 1208. Thus, upon a match being identified based on the comparison of the URLs, a corresponding one of the toolbars is executed without user intervention.

It is then determined whether a window associated with the first online application is closed or a different tab on the network browser is selected. See operation 1212. If the window is closed or another network browser tab is selected, the toolbar corresponding to the first application is closed or hidden. See operation 1212. Thus, the network browser toolbar may be removed from an interface of the network browser upon identification of a window in which an associated online application being closed.

In one embodiment, multiple tabs on a network browser may be open simultaneously, where more than one tab corresponds to the first application. In this case, the toolbar may remain displayed for all tabs or windows associated with the first application. Furthermore, in the case that a second application is being utilized in one of the tabs or windows, and the second tab utilizes the same or similar toolbar functionality as the first application, the toolbar may also remain displayed for the second application.

FIG. 13 shows a network browser plugin 1300 for accommodating different online applications, in accordance with one embodiment. As an option, the network browser plugin 1300 may be implemented in the context of the details of FIGS. 1-12. Of course, however, the network browser plugin 1300 may be implemented in any desired environment. It should also be noted that the aforementioned definitions may apply during the present description.

As shown, the network browser plugin 1300 may include various information for accessing a first application. For example, the network browser plugin 1300 may include a user name, user login information, an online application URL, user preferences, etc. In one embodiment, the network browser plugin 1300 may be stored on a client computer from which the URL of online applications are accessed.

For example, a user may subscribe or access an online application and be prompted to download the network browser plugin 1300 from the location of the online application to the computer or device of the user. The user may then be prompted to fill out all relevant information. In this way, the network browser plugin 1300 may be utilized to access one or more online applications without the need to enter login information every time the application is accessed. In one embodiment, the network browser plugin 1300 may include information associated with a plurality of online applications. In this case, the URL may be utilized as a lookup for all of the information utilized by the online application to allow the user access.

Figure 14:
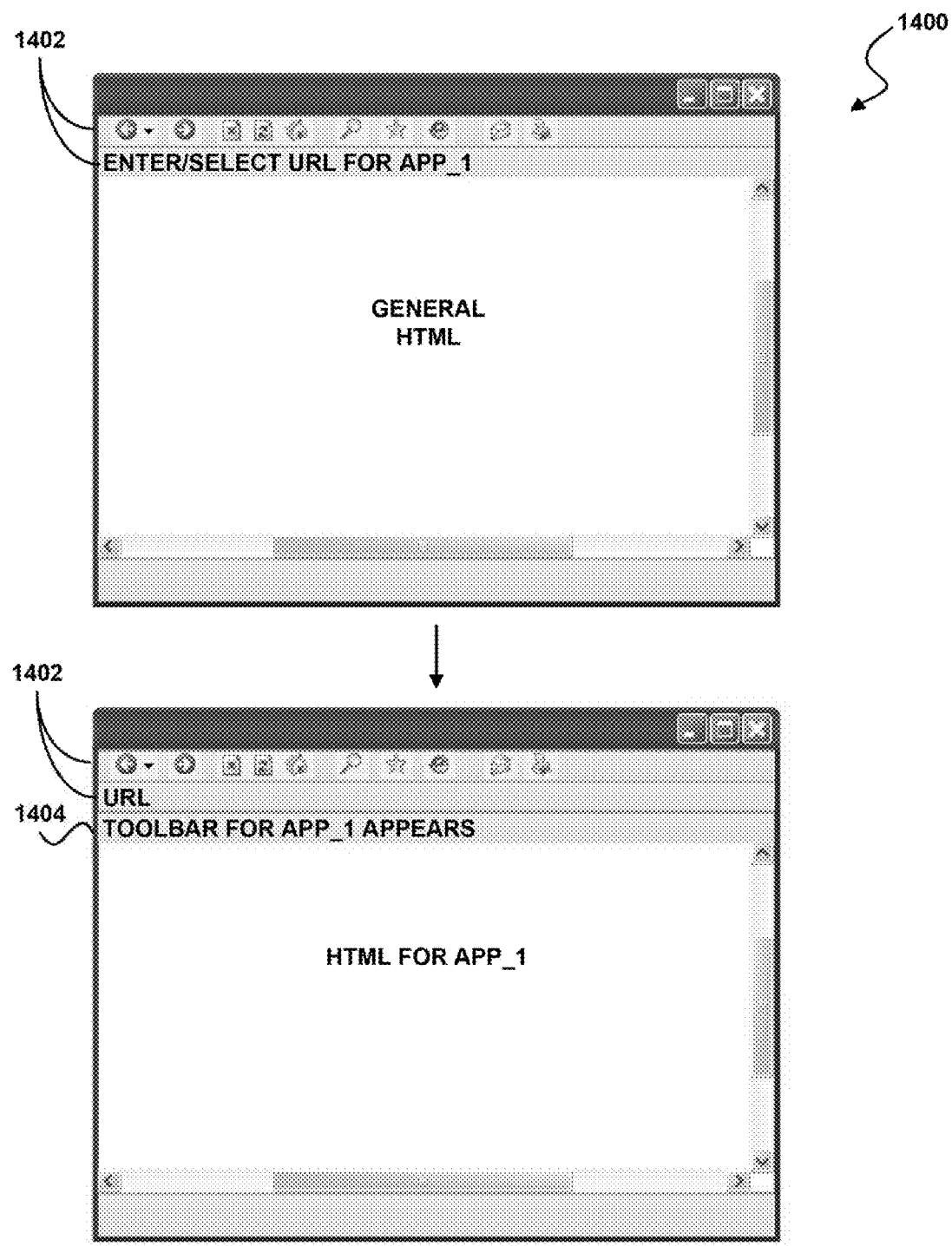
FIG. 14 shows a network browser for accommodating different online applications, in accordance with one embodiment.

FIG. 14 shows a network browser 1400 for accommodating different online applications, in accordance with one embodiment. As an option, the network browser 1400 may be implemented in the context of the details of FIGS. 1-13. Of course, however, the network browser 1400 may be implemented in any desired environment. It should also be noted that the aforementioned definitions may apply during the present description.

As shown, the network browser 1400 may include a navigator bar 1402 (e.g. an explorer bar) including back, forward, stop, reload, URL entry, etc. functionally for navigating a network. Further, a toolbar 1404 may be provided including various functionality for accessing/managing files and/or applications. For example, the toolbar 1404 may include functions for a first online application.

In addition to various functions of the first application, in other embodiments, the toolbar 1404 may include a file option to access functionality associated with a file (e.g. save, save as, send, properties, etc.). Furthermore, the toolbar 1404 may include options for switching between online applications (e.g. word processors, spreadsheet generation tools, PDF generators, etc.). Still yet, the toolbar may include various other functions such as view options, format options, tool options, table options, window options, help options, and various icons associated with various functionality.

Additionally, the network browser 1400 or the toolbar 1604 may include a tab bar for easy toggling between applications and files. As an option, the tab bar may allow the same file to be viewed in the context of a first online application and a second online application. In this way, a file opened by the first online application under a first tab may be viewed in the context of a second online application under a second tab, allowing a function of the second online application to be applied to the file when viewed under the second tab and/or the first tab.

In operation, an online application currently visited by the network browser 1400 may be identified using the URL. Additionally, at least one of a plurality of network browser toolbars may be selected based on the online application currently visited by the network browser. As an option, the toolbar 1404 may be capable of being manually selected utilizing a menu. In this case, the menu may include a plurality of toolbars associated with various URLs or online applications, where the toolbars may include different functionality.

For example, a first one of the toolbars may be adapted for applying a first set of functions to a file generated utilizing a first online application, and a second one of the toolbars is adapted for applying a second set of functions to a file generated utilizing a second online application. Once the toolbar 1404 is selected, the toolbar 1404 may be displayed utilizing the network browser 1400.

As an option, log-in information utilized for the online applications may be stored on a computer on which the network browser 1400 is installed. In this way, the login information may be utilized to log-in to the online application currently visited by the network browser 1400. Thus, the user may enter the URL of the online application into the network browser 1400 and access the application without entering login information every time.

In one embodiment, the user may use bookmarks to access the online applications. In another embodiment, the user may click on a tag to access the online application. In still another embodiment, the user may access the online application by clicking an icon on a desktop. Additionally, the user may access the online application by clicking on an item illustrated in a pictorial diagram of a file structure.

It should be noted that the toolbar 1404 may be displayed independently (i.e. only a single network browser toolbar is displayed at a time), or with multiple other toolbars (e.g. other online application toolbars, search engine toolbars, email toolbars, etc.). In one embodiment, the network browser toolbar 1404 may be conditionally displayed based on a number of network browser toolbars already displayed. For example, if two toolbars are already being displayed, the network browser toolbar 1404 may not be displayed.

In another embodiment, a position of the network browser toolbar 1404 may depend on a number of network browser toolbars already displayed. As an option, if multiple toolbars are already displayed, the network browser toolbar 1404 may be displayed in a position in the network browser 1400 away from the other toolbars being displayed. For example, if multiple toolbars are being displayed at the top of the network browser 1400 the network browser toolbar 1404 may be displayed at the bottom of the network browser 1400.

In still another embodiment, a size of the network browser toolbar 1404 may depend on a number of network browser toolbars already displayed. For example, if a plurality of toolbars are already displayed, the network browser toolbar 1404 may be reduced in size (e.g. font, area, etc.). As another option, icons or buttons normally displayed on the network browser toolbar 1404 may be omitted in the case that limited space is available due to other toolbars being present.

In yet another embodiment, an orientation of the network browser toolbar 1404 may depend on a number of network browser toolbars already displayed. For example, if one or more toolbars are being displayed in a horizontal orientation or row across the top-side of the network browser 1400, the network browser toolbar 1404 may be displayed in a vertical orientation, as a column along a side of the network browser 1400. As an option, the network browser toolbar may be oriented vertically if one or more browser toolbars are already displayed.

In some cases, the toolbar 1404 or another toolbar displayed on the network browser 1400 may include functions for attaching files associated with the online applications to emails or other messages. In one embodiment, these attachments may be stored in a central location associated with an online application from which the attachment was generated.

Figure 15:
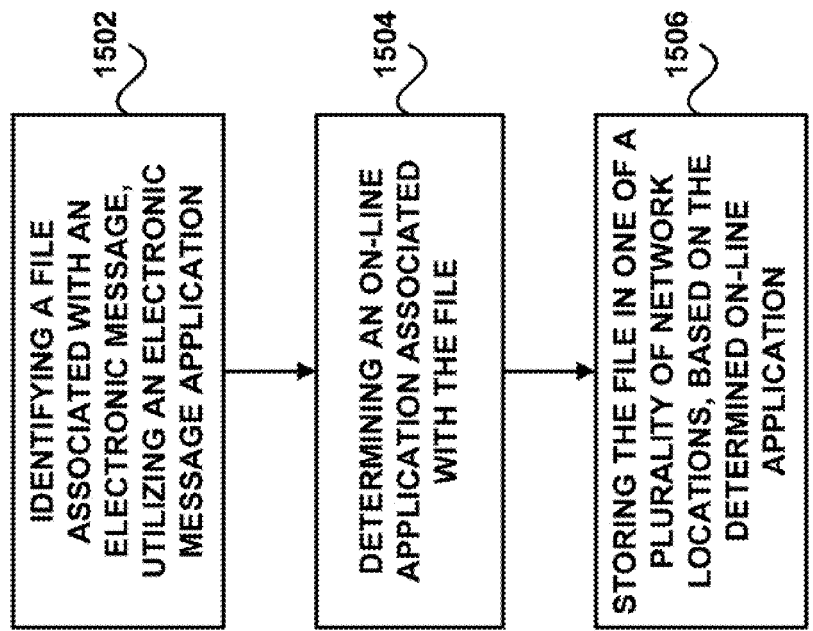
FIG. 15 shows a method for storing attachments of an electronic message in a central location associated with an online application from which the attachment was generated, in accordance with one embodiment.

FIG. 15 shows a method 1500 for storing attachments of an electronic message in a central location associated with an online application from which the attachment was generated, in accordance with one embodiment. As an option, the present method 1500 may be implemented in the context of the functionality and architecture of FIGS. 1-14. Of course, however, the method 1500 may be carried out in any desired environment. It should also be noted that the aforementioned definitions may apply during the present description.

As shown, a file associated with an electronic message is identified, utilizing an electronic message application. See operation 1502. In the context of the present description, an electronic message application refers to any application capable of identifying an electronic message. For example, in various embodiments, the electronic message application may include, but is not limited to, an email application (e.g. Microsoft Outlook, a web-based email application, etc.), a text messenger application, an instant messenger application, and/or any other electronic messenger application that meets the above definition. In various embodiments, the electronic message may include an email, a text message, an instant message, and any other electronic message.

Additionally as shown, an online application associated with the file is determined. See operation 1504. In this case, the online application may be an online application that generated the file, an online application that is capable of opening or viewing the file, an online application that is capable of modifying the file, etc.

Further, the file is stored in one of a plurality of network locations, based on the determined online application. See operation 1506. The network location may be any location capable of storing files. For example, in various embodiments, the network locations may include a server or a networked database. In this case, the network locations may be locations allocated to an individual user, a group of users, a company, etc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 16:
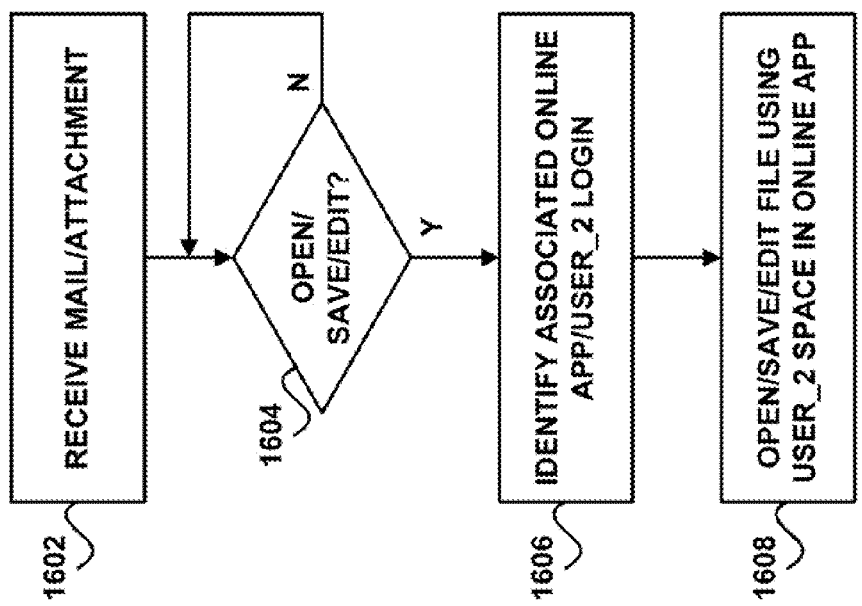
FIG. 16 shows a method for storing attachments of an electronic message in a central location associated with an online application from which the attachment was generated, in accordance with one embodiment.

FIG. 16 shows a method 1600 for storing attachments of an electronic message in a central location associated with an online application from which the attachment was generated, in accordance with one embodiment. As an option, the present method 1600 may be implemented in the context of the functionality and architecture of FIGS. 1-15. Of course, however, the method 1600 may be carried out in any desired environment. It should also be noted that the aforementioned definitions may apply during the present description.

As shown, an email from a first user, including an attachment, is received by a second user. See operation 1602. In this case, the attachment may include any file generated by any application. In one embodiment, the attachment may be virtual attachment. For example, the attachment may include a link corresponding to a file stored on a server.

Once the email is received, it is determined whether the attachment is to be opened, saved, and/or edited. See operation 1604. For example, the second user may select the attachment (e.g. using a mouse, etc.) and be given the option to open, save, edit, forward, etc. the attachment. This option may be presented in the form of a window, a drop-down menu, etc.

If it is determined that the attachment has been selected to be opened, saved, and/or edited, an online application associated with the attachment and corresponding user login information for the second user is identified. See operation 1606. The online application associated with the attachment may be determine in a variety of ways.

In one embodiment, the online application may be determined to be associated with the file, based on a header of the file. For example, a header of the file may indicate an application capable of opening, editing, or saving the file. As another option, the online application may be determined to be associated with the file, based on an extension of the file. For example, if the extension includes a ".txt" extension, it may be determined that an online text editor is associated with the file. In another case, a ".pdf" extension may indicate that a PDF viewer or editor is associated with the file.

In this way, the online application associated with the file may be determined automatically. In another embodiment, the online application associated with the file may be determined manually. For example, a user may have the option to select from a list of online applications.

In this case, the list may include all online applications capable of opening, editing, or saving the file. As an option, the list may include online applications for which the user has permission to use. As another option, the user may be given the option to have an appropriate application selected automatically.

In one embodiment, a network browser may be utilized to select the appropriate application. In this case, the network browser may be displayed upon selecting to open, save, or modify the file. As an option, the network browser may display a plurality of tabs corresponding to each online application capable of opening, editing, or saving the file.

In addition to determining an online application associated with the attachment, corresponding user login information is also determined. In one embodiment, the login information may be stored on a device on which the electronic message application is installed. In this case, the device may be any device capable of storing login information. For example, in various embodiments, the device may include a mobile device (e.g. a phone, PDA, laptop, etc.), a computer, or any other device that meets the above definition.

As an option, the login information may be included as a network browser plugin. In this case, the login information may be automatically accessed by the online application. In one embodiment, the log-in information may be utilized to login to the online application, in response to determining the online application is associated with the file. Thus, upon automatically or manually selecting the online application, the login information may be automatically obtained and utilized to access the application.

Once the online application has been determined and the login information of the second user identified, the file is open, saved, or edited (depending on the command), using space in the online application allocated to the second user. See operation 1608. For example, the file may be automatically transferred from a space at a network location associated with the first user to a space at a network location associated with the second user, such that the second user may access the file using the online application in a private or secure place, not accessible to the first user.

As another option, data included in the attachment may be used to reconstruct the file in a space on the network allocated to the second user. In this way, once the online application is determined, a program or function associated with the online application may use data in the attachment to regenerate the file. This data may be communicated either via a device of the second user or directly from the space allocated to the first user.

As still another option, the attachment may be saved directly from the device of the second user to the network space allocated to the second user. In these ways, the file (attachment) may be modified/accessed by the second user on a network location using an online application. In another embodiment, the file may be stored in a common network space such that both the first and the second user may access the file. In this way, a working document may be maintained between a plurality of users.

As an option, the network location may be associated with a URL corresponding to the online application. For example, a server may host an online application in addition to providing space for file storage or a workspace. As another option, the network location of the user space for file storage may be separate from a network location of the online application.

Figure 17:
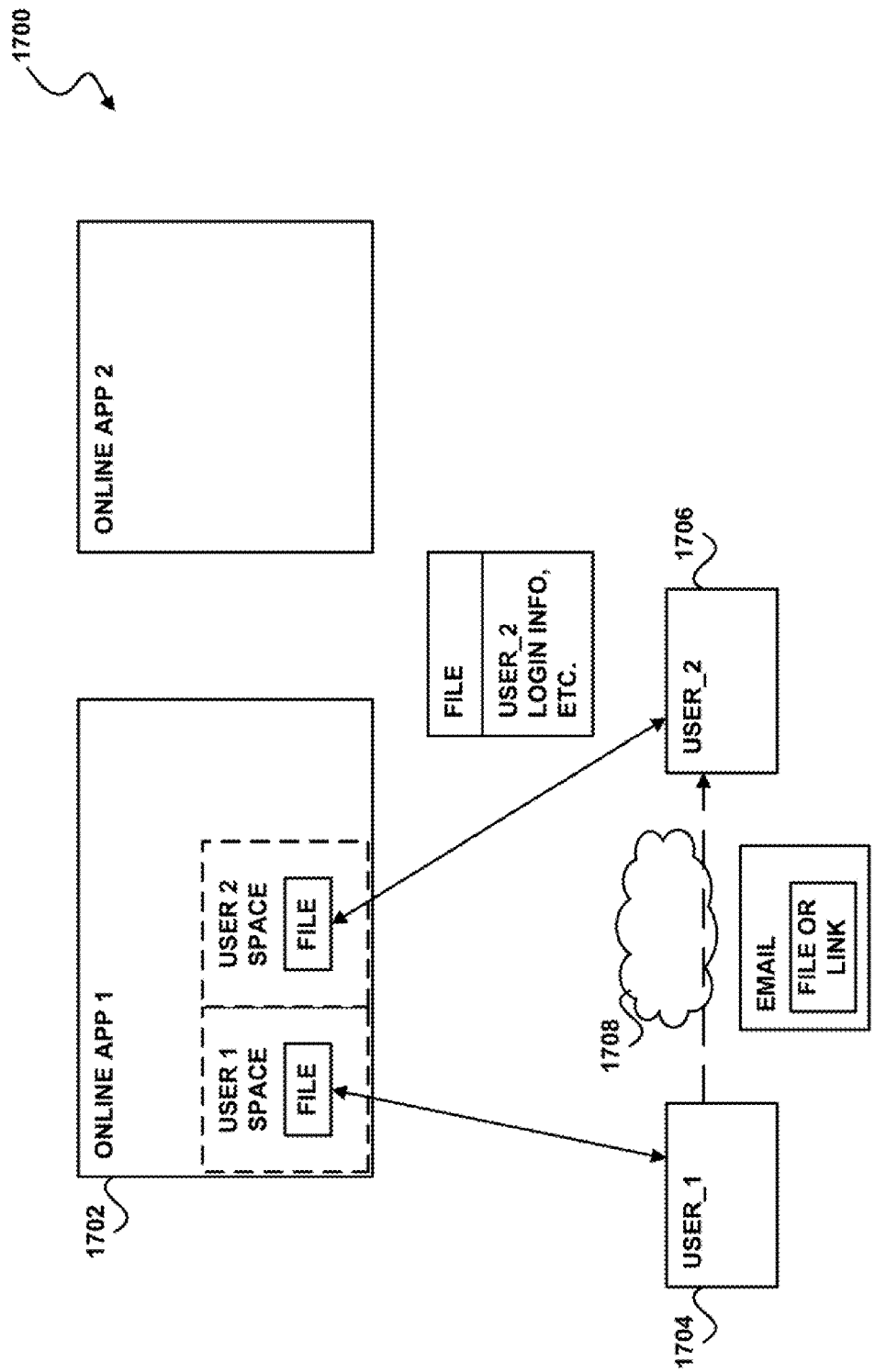
FIG. 17 shows a system for storing attachments of an electronic message in a central location associated with an online application from which the attachment was generated, in accordance with one embodiment.

FIG. 17 shows a system 1700 for storing attachments of an electronic message in a central location associated with an online application from which the attachment was generated, in accordance with one embodiment. As an option, the system 1700 may be implemented in the context of the details of FIGS. 1-16. Of course, however, the system 1700 may be implemented in any desired environment. It should also be noted that the aforementioned definitions may apply during the present description.

As shown, a plurality of online application are located one or more network locations 1702. As shown further, a device 1704 of a first user has access to at least one of the network locations 1702. Additionally, a device 1706 of a second user has access to at least one of the network locations 1702.

In use, the first user and/or the second user may each have access to allocated network space on a database or server at the network location 1702. The users may access online applications associated with the network locations, given the users have proper permission which may be obtained using appropriate login information. The users may access these online applications to create, modify, manage, and store files located at the network locations.

In one embodiment, the first and the second user may each have access to a separate network space such that files of the two users are isolated from other users. In another embodiment, a shared or common space may also be utilized. In still another embodiment, the file may be stored in a location only accessible to a recipient of the electronic message.

In one case, the first user may desire to send a file to the second user. As an option, the first user may configure an email and send the file as an attachment. As another option, the first user may send a link to the file in an email.

When the second user receives the email with the attachment, the second user may choose to open or save the attached file. When the user selects one of these options, an online application for facilitating such operations is determined. Additionally, the file is stored in one of the network locations 1702, based on the determined online application. For example, as shown the file generated by the first user using the first online application may be associated with the first online application by the device 1706 of the second user. Thus, the file may be saved in a network location associated with the first online application.

In one embodiment, the device 1706 of the second user may be used to determine the appropriate online application and the store the file. In this case, the device 1706 maybe any device capable of performing these functions (e.g. a stationary device, a mobile device, etc.). As an option, the file may be saved by selecting the electronic message and further selecting a save menu option.

In one embodiment, a request may be received to open the attached file. In this case, the online application associated with the file may be determined in response to the request. Once the online application is determined and user login information is verified, the file may be opened using the online application. In one embodiment, this may include opening the file utilizing a network browser window.

Figure 18:
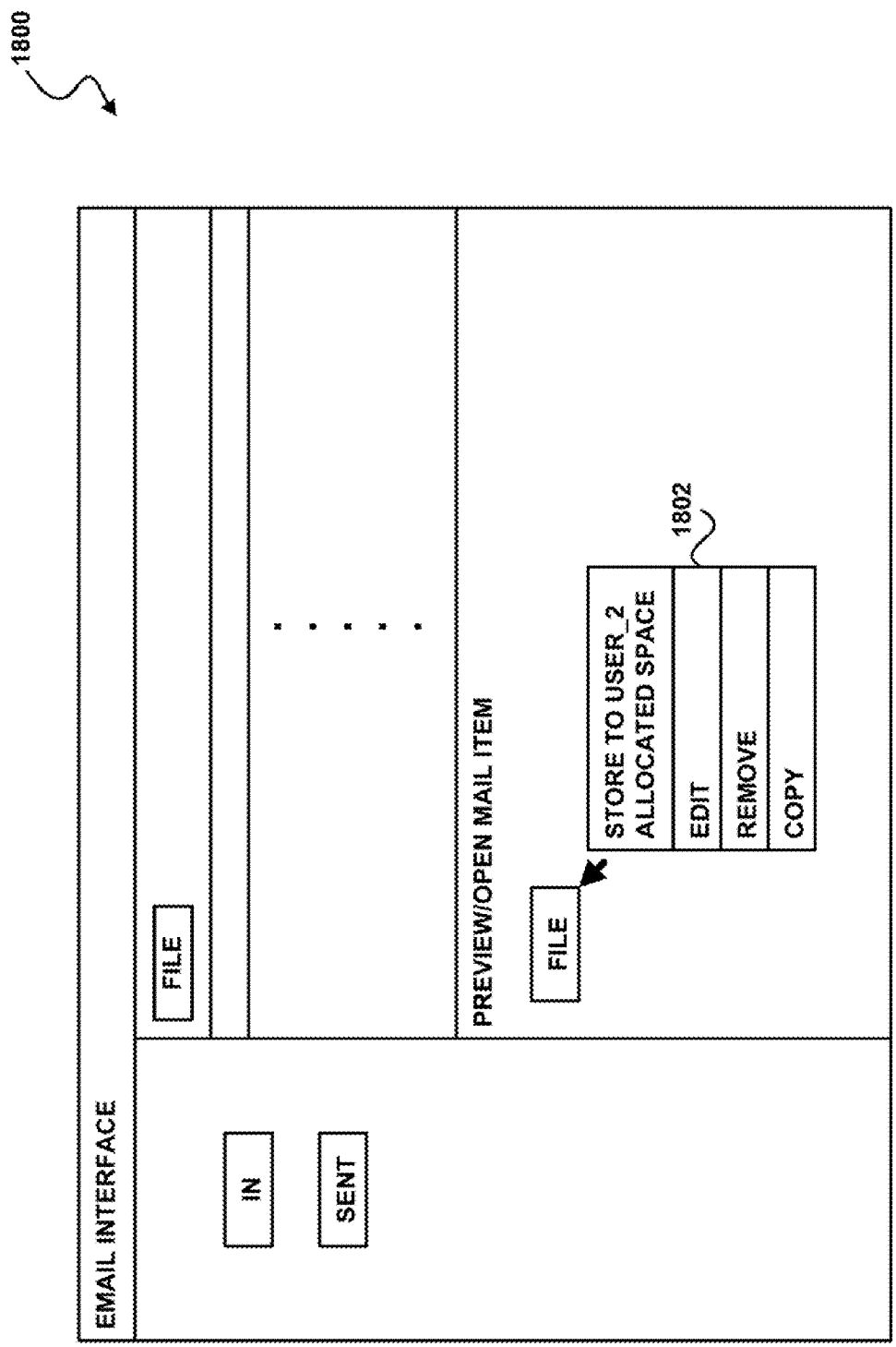
FIG. 18 shows an interface for an electronic message application for identifying a file associated with an electronic message, in accordance with one embodiment.

FIG. 18 shows an interface 1800 for an electronic message application for identifying a file associated with an electronic message, in accordance with one embodiment. As an option, the interface 1800 may be implemented in the context of the details of FIGS. 1-17. Of course, however, the interface 1800 may be implemented in any desired environment. It should also be noted that the aforementioned definitions may apply during the present description.

As shown, a menu 1802 may allow a user to select a plurality of options when a message has been received with an attachment including a file. In this case, the file may or may not have being generated using an online application. For example, the menu may include options to store the file to a network space allocated to the user, edit, remove, or copy the file. In one embodiment, the user may have the option to share the file.

Once the user makes a selection, the file may be stored on a network space which includes a plurality of other files. As an option, the user may have the ability to view all of these files using a single interface. This may allow the user to view a file structure or tags associated with all of the user's files stored on the network location.

Figure 19:
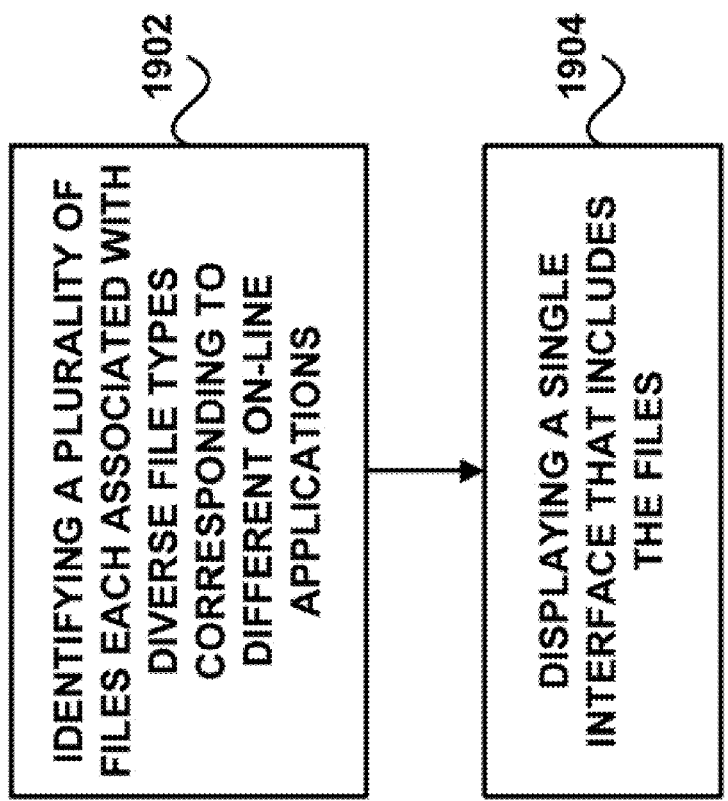
FIG. 19 shows a method for displaying a single interface that includes a plurality of files, in accordance with one embodiment.

FIG. 19 shows a method 1900 for displaying a single interface that includes a plurality of files, in accordance with one embodiment. As an option, the present method 1900 may be implemented in the context of the functionality and architecture of FIGS. 1-18. Of course, however, the method 1900 may be carried out in any desired environment. It should also be noted that the aforementioned definitions may apply during the present description.

As shown, a plurality of files are identified, each associated with diverse file types corresponding to different online applications. See operation 1902. In various embodiments, the file types may include, but are not limited to, a word processor file type, a text editor file type, a PDF file type, a drawing file type, a spreadsheet file type, a presentation file type, and/or any other file type corresponding to an online application.

Further, a single interface is displayed that includes the files. See operation 1904. As an option, the interface may be displayed using a network browser. As another option, the interface may be displayed on the device of a user. In this case, the device may include a mobile device (e.g. a phone, PDA, laptop, etc.), a computer, or any other device capable of displaying a network browser.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 20:
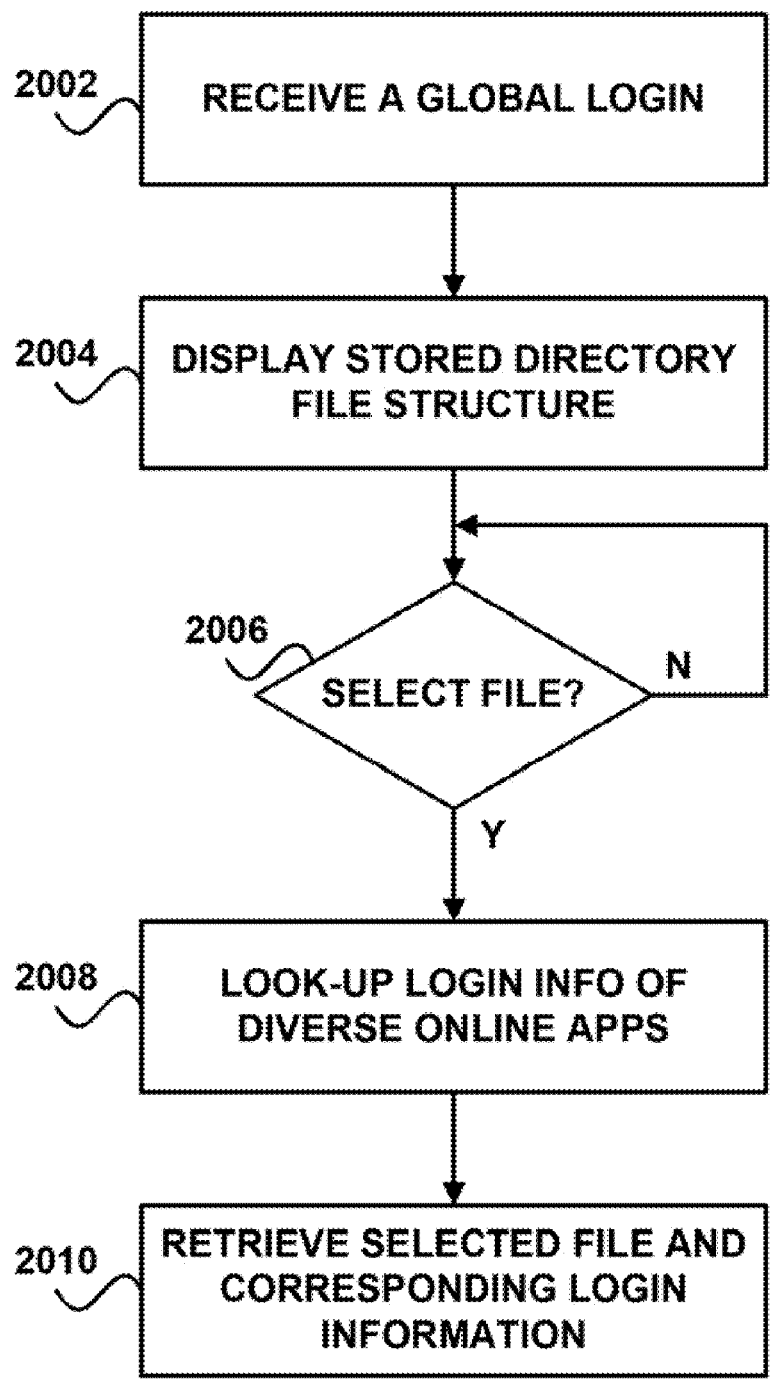
FIG. 20 shows a method for displaying a single interface that includes a plurality of files, in accordance with another embodiment.

FIG. 20 shows a method 2000 for displaying a single interface that includes a plurality of files, in accordance with another embodiment. As an option, the present method 2000 may be implemented in the context of the functionality and architecture of FIGS. 1-19. Of course, however, the method 2000 may be carried out in any desired environment. It should also be noted that the aforementioned definitions may apply during the present description.

As shown, a global login is received. See operation 2002. Once the global login is received, a file directory of stored files is displayed. See operation 2004. This file directory may be displayed in a variety of ways using a single interface.

For example, the interface may be displayed utilizing a network browser and or a network browser plug-in. In this case, identifiers associated with the files may be stored on a device on which the network browser is installed. In one embodiment, the file identifies may include tags, as described above.

In another embodiment, the identifiers associated with the files may be stored on a server. In this case, the server may be a server associated with the single interface. This server may also be associated with one or more online applications. The identifiers associated may be displayed in various ways. For example, the identifiers associated with the files may be displayed utilizing HTML. In another embodiment, the identifiers associated with the files may be displayed utilizing a JAVA script, icons, etc.

As an option, a network browser plugin may include the global login information. In this way, the global login information may be automatically obtained when accessing the single interface through a network browser associated with the network plugin. In this case, the network browser, plugin, and login information may be stored on a device of a user.

As an option, the log-in information may be capable of being entered when registering an associated one of the online applications in association with the network browser. For example, a user may access an online application for a first time using a network browser and enter registration information. As part of the registration process the user may enter login information which may saved on a device of the user. Thus, this information may be utilized each time the user accesses the interface online. As an option, the user may choose to enter login information each time the user accesses the single interface online (e.g. for security purposes, etc.)

Using the single interface, a user may view a plurality of files generated using various applications, with some of the applications being online applications. In some cases, each of the online applications may have different log-in information associated therewith. In these cases, the log-in information may be stored in and associated with a network browser or a network browser plugin. Furthermore, the log-in information may be utilized to access the interface, the files, and/or identifiers associated with the files.

With further reference to FIG. 20, once the files are displayed using the single online interface, it is determined whether a file is selected. See operation 2006. In this case, a file being selected may include selecting the file directly via a network browser displaying the single interface, of by selecting a tag associated with the file.

If a file is selected (e.g. to be accessed, saved, etc.), login information for an online application associated with that file is identified. See operation 2008. For example, user may select a file to open that is associated with an online word processor application. User login information would then be identified for the online application, either automatically (e.g. using information stored on the user device, etc.) or manually, by prompting the user to enter login information.

Once the login information has been determined, the selected file is retrieved using the corresponding login information. See operation 2010. In this case, the selected file may be retrieved from a network location of the online application associated with the file, a network location associated with the single online interface, a network location associated with a user space (e.g. individual, shared, work, etc.), and or any other network location associated with the file.

Figure 21:
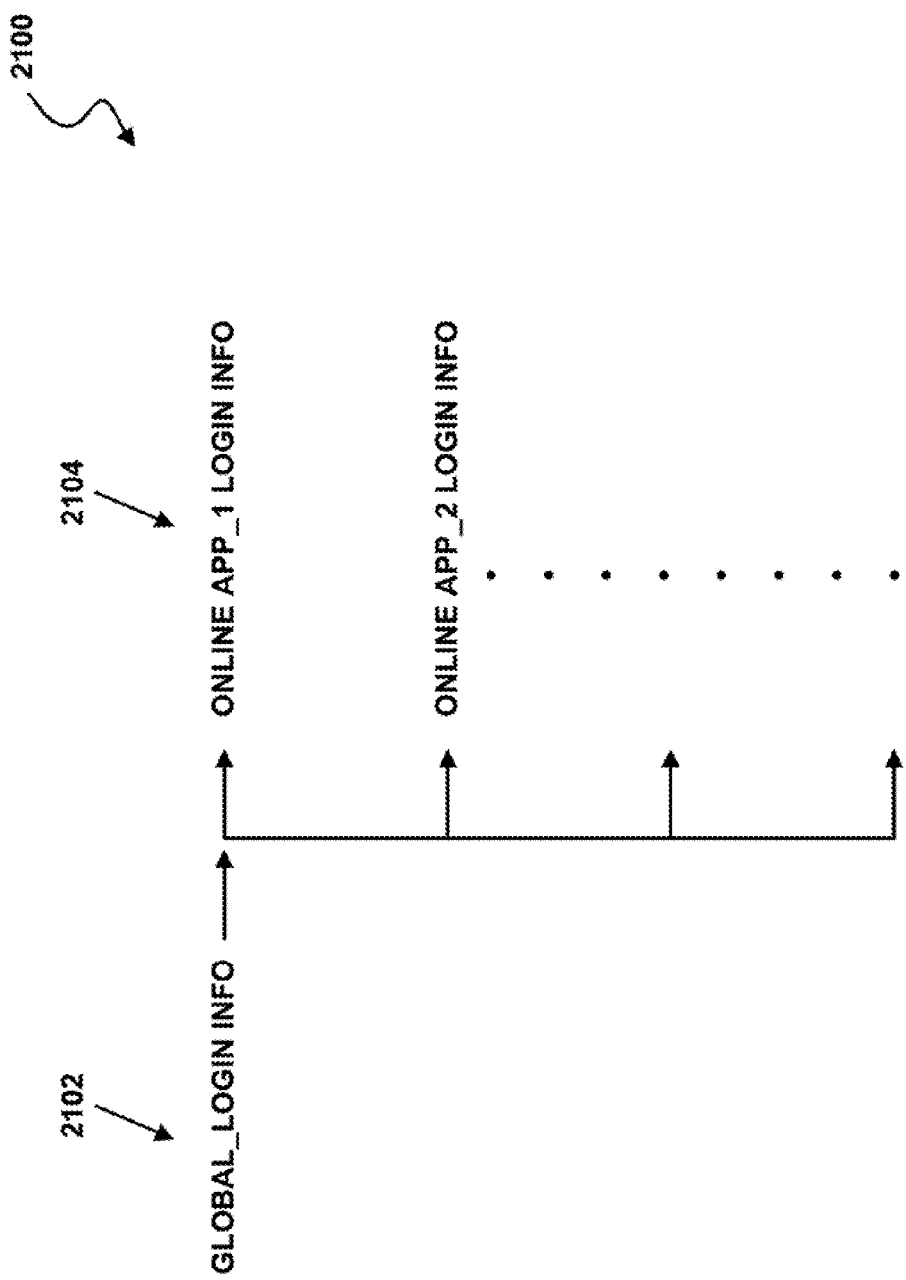
FIG. 21 shows a data structure of global login information for a single interface that includes a plurality of files associated with a plurality of different online applications, in accordance with one embodiment.

FIG. 21 shows a data structure 2100 of global login information for a single interface that includes a plurality of files associated with a plurality of different online applications, in accordance with one embodiment. As an option, the data structure 2100 may be implemented in the context of the functionality and architecture of FIGS. 1-20. Of course, however, the data structure 2100 may be implemented in any desired environment. It should also be noted that the aforementioned definitions may apply during the present description.

As shown, global login information 2102 may include login information for a plurality of different online applications 2104. In use, a user may access an interface for displaying a plurality of files each associated with diverse file types corresponding to different online applications. Upon accessing the interface, or files displayed using the interface, the user may be prompted for global login information. As another option, global login information may be obtained automatically from information a device of the user or a server associated with the single interface, etc.

In one embodiment, the global login information 2100 may include a user name and password for accessing the single interface. Once the global login information is obtained, online application login information may be accessed and obtained automatically to allow the user to access all files displayed in the interface and all corresponding online applications, without entering login information for each online application.

Thus, the user may use one global login to the single interface to access a plurality of online applications. It should be noted that the login information for the plurality of online applications may be different for some or all of the applications. However, the global login information may allow access to all online application login information.

This may be accomplished in a variety of ways. For example, the login information for the online applications may be stored on the device of the user, a server associated with the single interface, a network location associated with the users, etc. Upon entering the global login information, the login information for the online applications associated with the user may be retrieved. In various embodiments, this may be facilitated utilizing a network browser, a network browser plugin, a JAVA script, etc.

Figure 22:
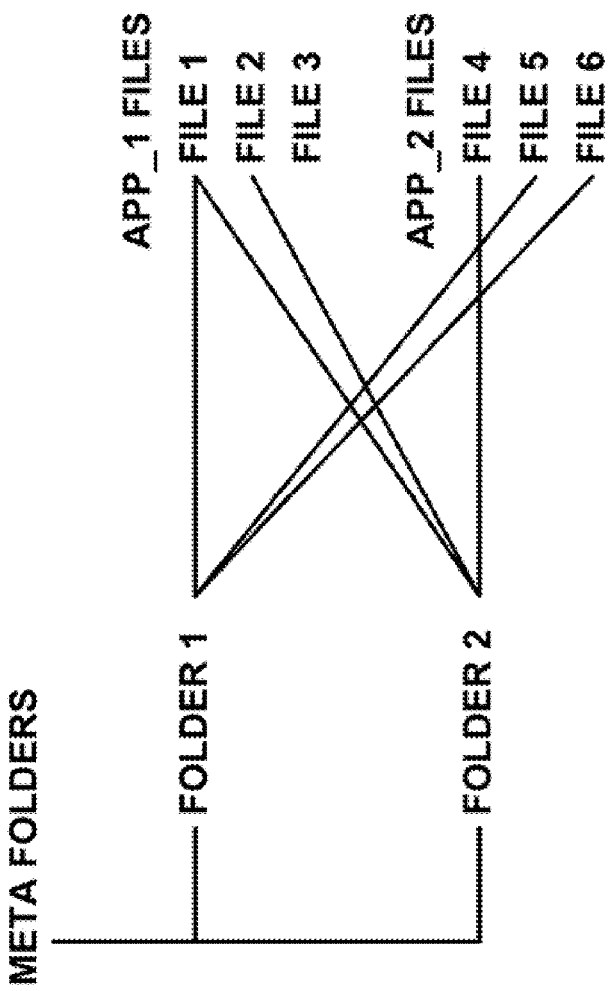
FIG. 22 shows a file structure shown in a single interface that includes a plurality of files associated with a plurality of different online applications, in accordance with one embodiment.

FIG. 22 shows a file structure 2200 shown in a single interface that includes a plurality of files associated with a plurality of different online applications, in accordance with one embodiment. As an option, the file structure 2200 may be implemented in the context of the functionality and architecture of FIGS. 1-21. Of course, however, the file structure 2200 may be implemented in any desired environment. It should also be noted that the aforementioned definitions may apply during the present description.

As shown, a single interface may include a plurality of folders for organizing a plurality of files associated with various online applications. Although, the single interface may display a standard file structure with directories, folders, sub folders, and files located, appearing to be located at a common network location, the folders, files, etc. may be located on a plurality of different servers and/or network locations.

For example, the files may be stored at different servers each associated with a different online application. However, the single interface may have the ability to show files and folders as appearing in a single folder or subset of folders. In other words, the network location of various files may be transparent to the user, where the single interface only shows groupings of files in folders/directories (e.g. using meta data, etc.).

In this way, a virtual desktop and file structure is presented to the user using the single interface. As an option, the files may also be stored on a device on which the interface is displayed. For example, a user may chose to save a copy of the files on a device such that the user may work locally with the file.

In this case, the files stored on the device and the files stored on the server may be synchronized. For example, the files on the device and the files stored on the server may be synchronized upon saving the file to the device. As another option, the files may be synchronized periodically, based on a established time (e.g. every 5, 10, 15 minutes, etc.). In this case, synchronizing the files stored on the device and the files stored on the server refers to maintaining common copies of the files stored on the device and the files stored on the server.

Figure 23:
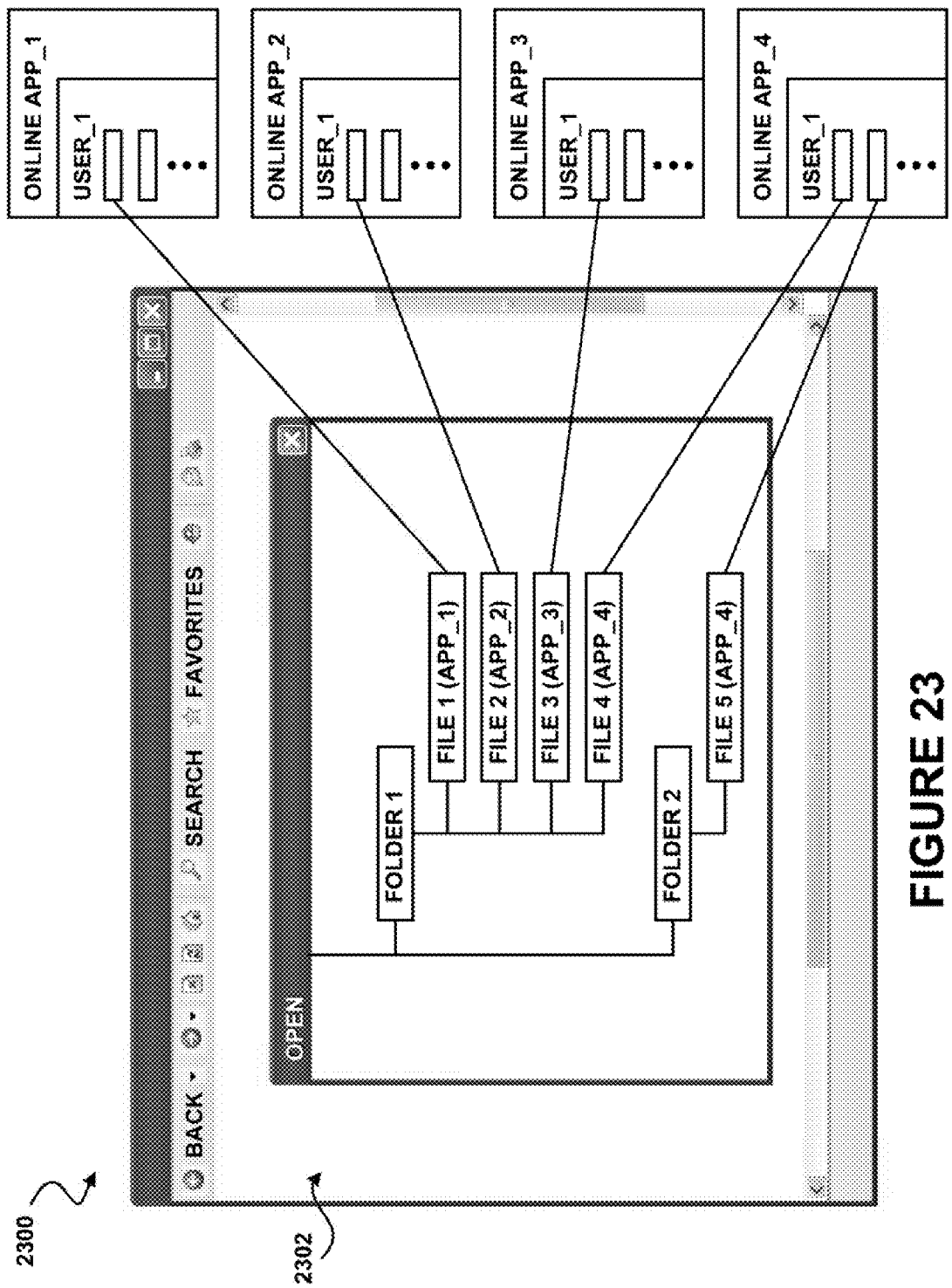
FIG. 23 shows a network browser for displaying a single interface that includes a plurality of files, in accordance with one embodiment.

FIG. 23 shows a network browser 2300 for displaying a single interface 2302 that includes a plurality of files, in accordance with one embodiment. As an option, the network browser 2300 may be implemented in the context of the details of FIGS. 1-22. Of course, however, the network browser 2300 may be implemented in any desired environment. It should also be noted that the aforementioned definitions may apply during the present description.

As shown, the single interface 2302 displays a plurality of files associated with different online applications. It should be noted that any folder displayed may include files associated with various online applications located at various network locations/servers. Furthermore, each of these online applications may require unique user login information. As noted above, one global login may be utilized to satisfy all login requirements, in accordance with one embodiment.

In addition to the illustrated functionality, the network browser 2300 and/or the interface 2302 may include functionality for searching for files/folders associated with the file structure illustrated in the interface 2300. In this way, a search may be conducted with respect to the files, utilizing the interface. In one embodiment, the files may be indexed to facilitate the search with respect to the files.

For example, in one embodiment, tags may be utilized to index the files. In another embodiment, the files may be indexed by modification time/date, alphabetically, by size, network location, file type, content type, and any other suitable criteria. As an option, the searching may include searching files associated with the interface on network locations and/or the device of the user.

Figure 24:
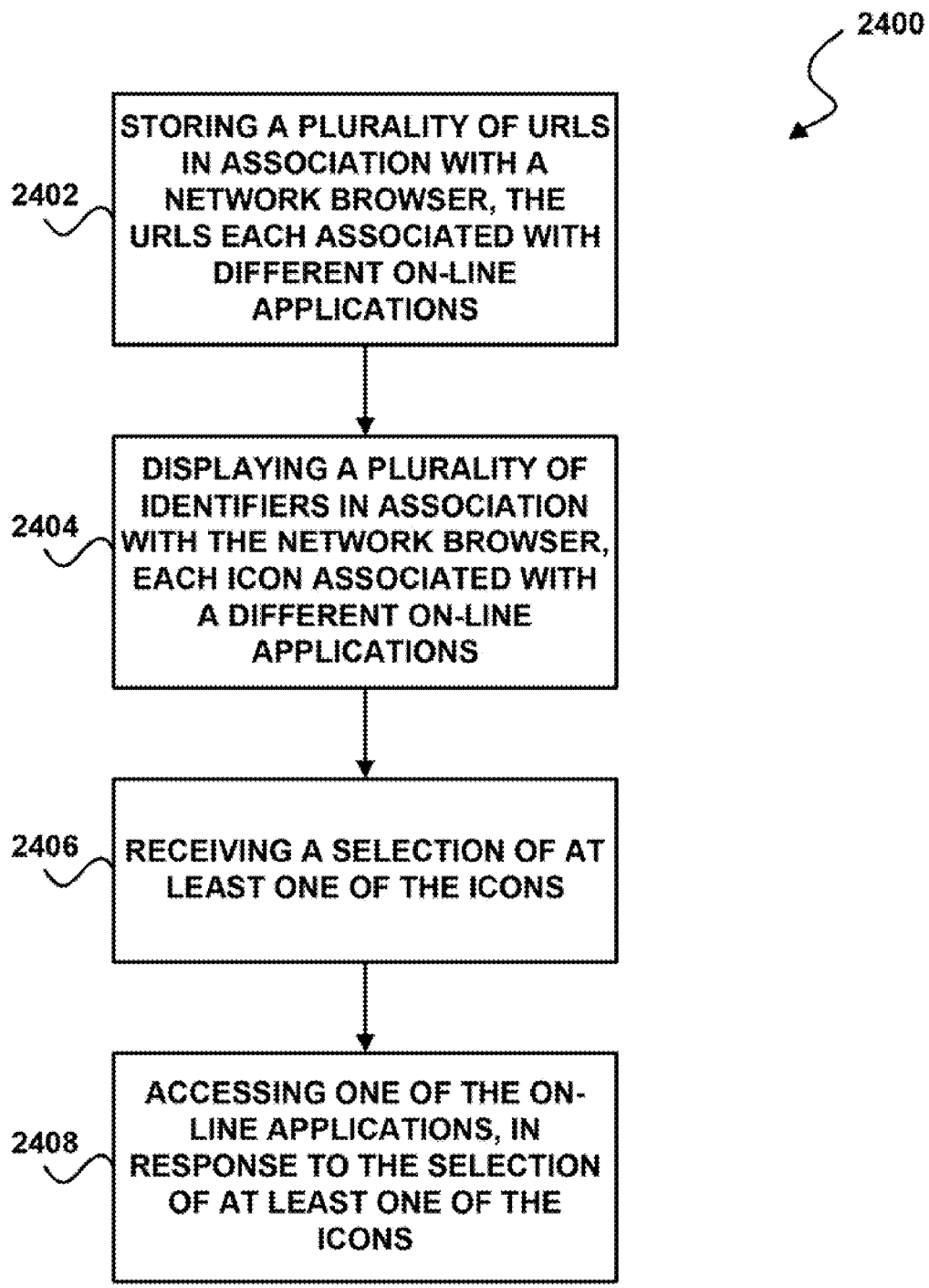
FIG. 24 shows a method for utilizing a network browser as a desktop, in accordance with one embodiment.

FIG. 24 shows a method 2400 for utilizing a network browser as a desktop, in accordance with one embodiment. As an option, the present method 2400 may be implemented in the context of the functionality and architecture of FIGS. 1-23. Of course, however, the method 2400 may be carried out in any desired environment. It should also be noted that the aforementioned definitions may apply during the present description.

As shown, a plurality of URLs in association with a network browser are stored, the URLs each associated with different online applications. See operation 2402. Additionally, a plurality of identifiers in association with the network browser are displayed, each identifier associated with a different online applications. See operation 2404.

In the context of the present description, an identifier refers to any character or number, series of characters or numbers, word, phrase, or object used for identification. For example, in various embodiments, the identifier may include, but is not limited to, icons, key words, pictures, links, and/or any other identifier that meets the above definition.

Further, a selection of at least one of the identifiers is displayed. See operation 2406. Still yet, one of the online applications is accessed, in response to the selection of at least one of the identifiers. See operation 2408.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 25:
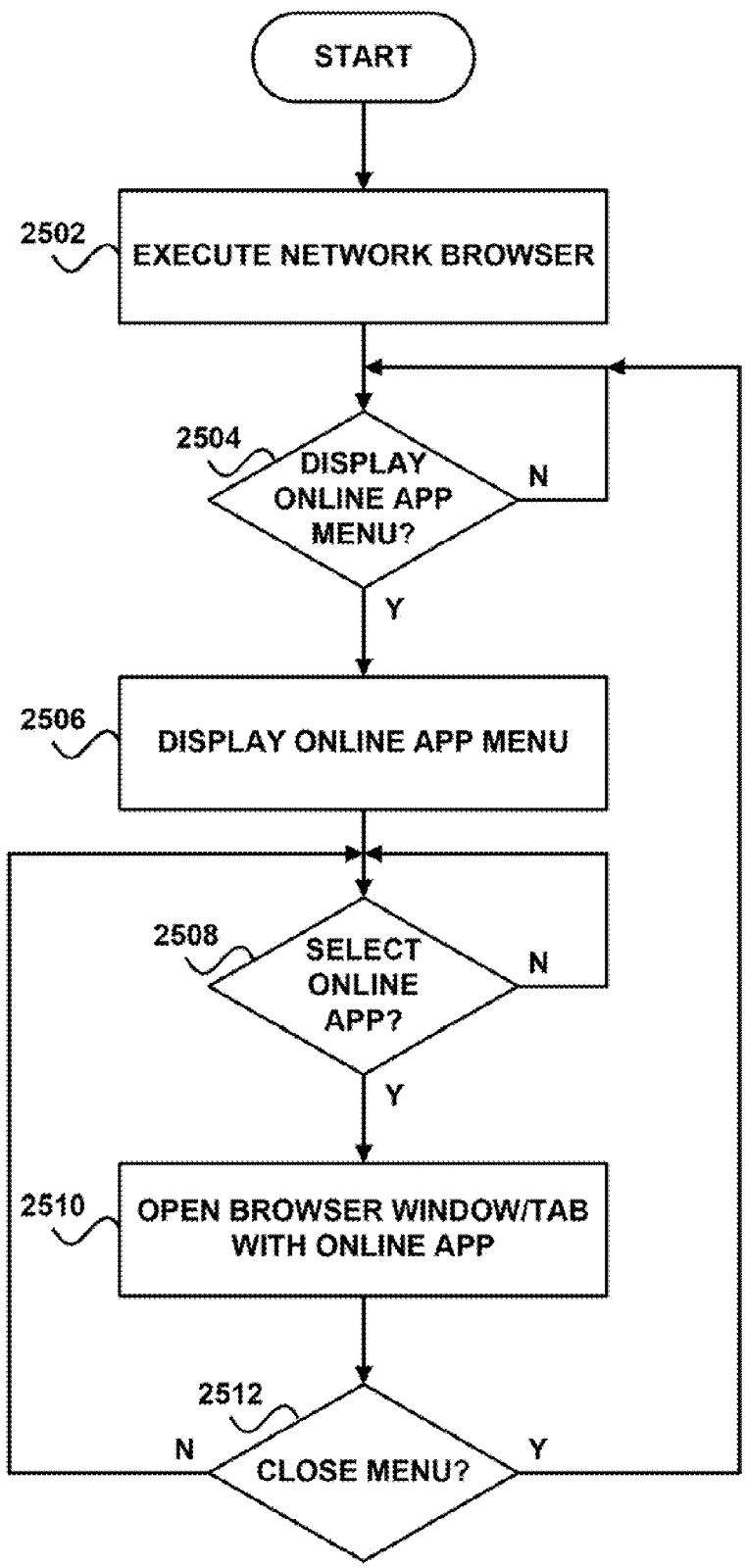
FIG. 25 shows a method for utilizing a network browser as a desktop, in accordance with another embodiment.

FIG. 25 shows a method 2500 for utilizing a network browser as a desktop, in accordance with another embodiment. As an option, the present method 2500 may be implemented in the context of the functionality and architecture of FIGS. 1-24. Of course, however, the method 2500 may be carried out in any desired environment. It should also be noted that the aforementioned definitions may apply during the present description.

As shown, a network browser is executed. See operation 2502. For example, the network browser may be opened by a user on a user device. Once the network browser is executed, it is determined whether an online application menu is to be displayed. See operation 2504. For example, in one embodiment, the user may select an option to display online applications. In another embodiment, the online application menu may be displayed automatically. In this case, an online application menu refers to a menu or list including available online applications.

If it is determined that the online application menu is to be displayed, the menu is displayed. See operation 2506. In various embodiments, the menu may be displayed as a list, window, toolbar, tabbed screens, group of identifiers, etc.

It is then determined whether an online application has been selected. See operation 2508. If an online application has been selected, a network browser window and/or browser window tab is opened with the online application. See operation 2510. In one embodiment, this may include accessing user login information for the online application. Additionally, upon displaying the network browser in operation 2502, a user may also be prompted for global login information, which allows access to the online application menu.

This global login information may also be utilized to automatically obtain login information for the online applications automatically such that one global login allows the user access to all available online applications without requiring the user to enter login information for each of the applications. This information may be stored on a device of the user, a server which includes the online application menu, and/or another network location. As shown further, it may also be determined whether the menu has been closed or remained open for the selection of other online applications. See operation 2512.

Figure 26:
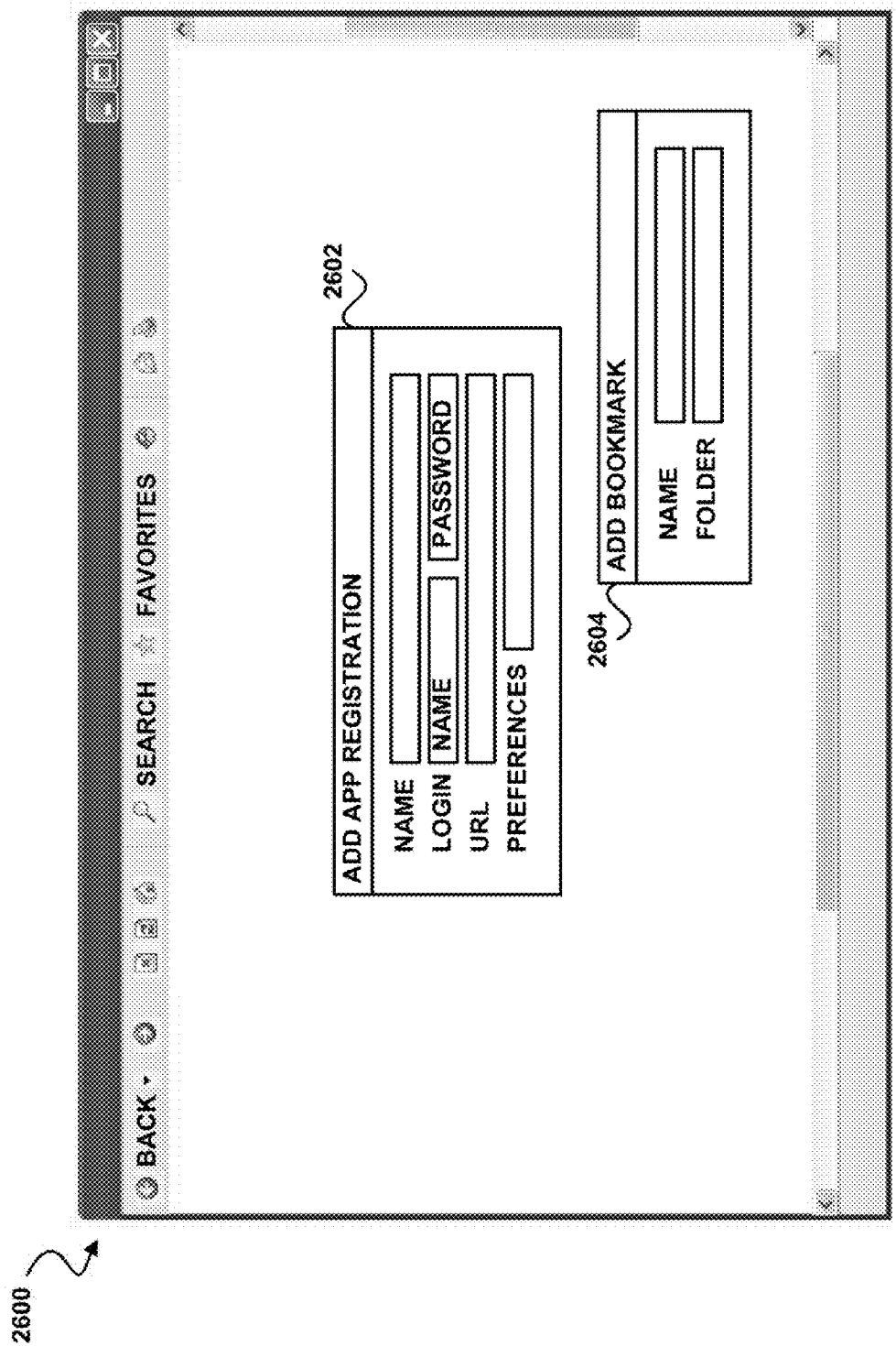
FIG. 26 shows a network browser for using as a desktop, in accordance with another embodiment.

FIG. 26 shows a network browser 2600 for using as a desktop, in accordance with another embodiment. As an option, the network browser 2600 may be implemented in the context of the functionality and architecture of FIGS. 1-25. Of course, however, network browser 2600 may be implemented in any desired environment. It should also be noted that the aforementioned definitions may apply during the present description.

As shown, upon executing the network browser 2600 to be used as a desktop, a user may be prompted to supply registration information 2602 for online applications that may be utilized in conjunction with the desktop environment. In this way, the user may configure and personalize an online desktop environment. Upon registration, entering the online application login information, and the URL associated with the online application, an identifier may be identified corresponding to the online application.

In one embodiment, the identifier may be selected by the user. In another embodiment, the identifier may automatically be selected (e.g. by the online application, a provider of the online desktop, etc.). Furthermore, in one case, the user may have the option to link or display an identifier associated with the online application. For example, the user may have the option to add a bookmark including a link to the online application. In another embodiment, the user may have the option to add the identifier to a desktop image. In this way, the user may be presented with a configurable online desktop including identifiers corresponding to various online applications, either shown on the desktop, or provided in a menu or list format.

Figure 27:
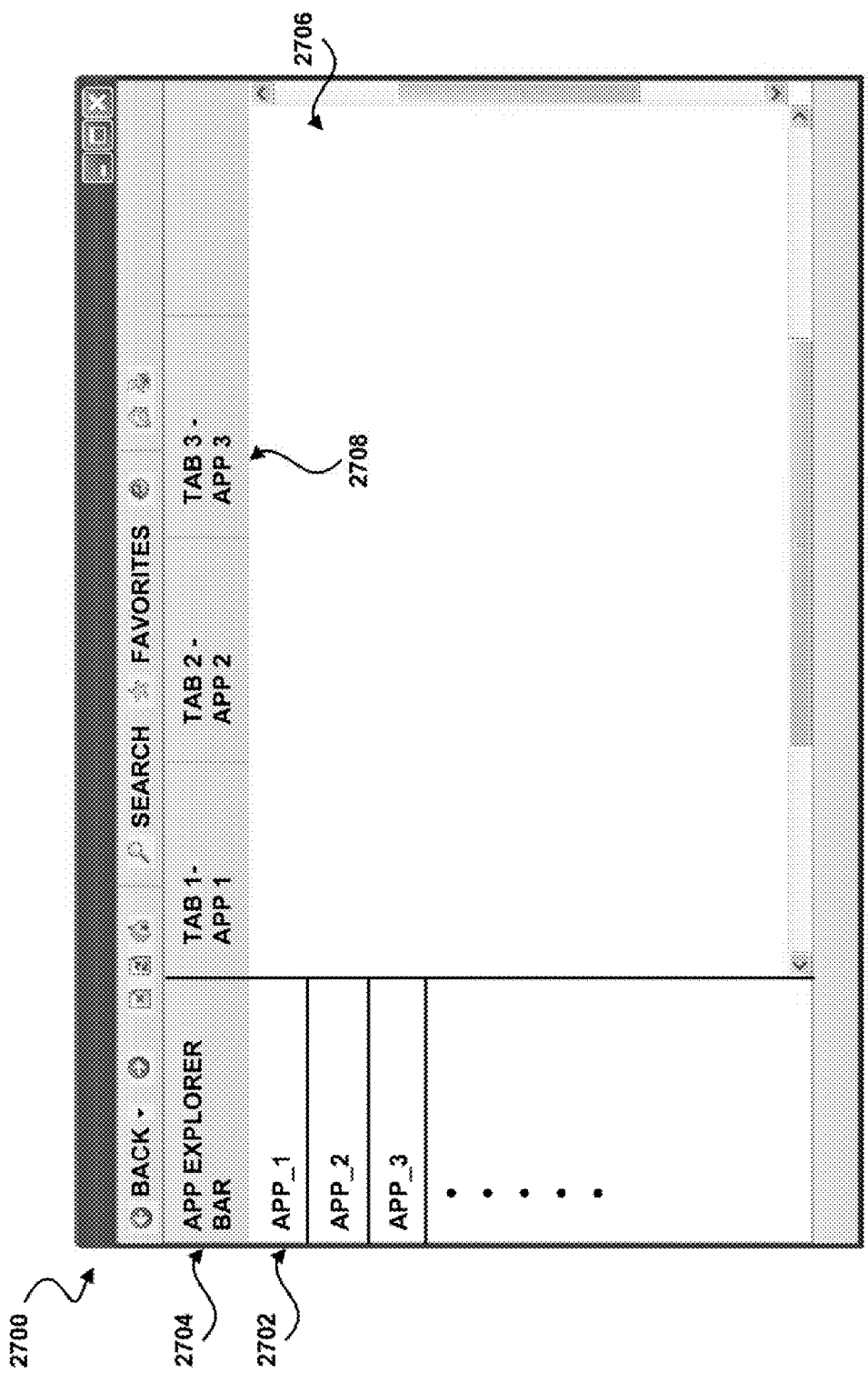
FIG. 27 shows a network browser for using as a desktop, in accordance with another embodiment.

FIG. 27 shows a network browser 2700 for using as a desktop, in accordance with another embodiment. As an option, the network browser 2700 may be implemented in the context of the functionality and architecture of FIGS. 1-26. Of course, however, network browser 2700 may be implemented in any desired environment. It should also be noted that the aforementioned definitions may apply during the present description.

In operation, a plurality of URLs in association with the network browser 2700 are stored, the URLs each associated with different online applications. In one embodiment, the URLs may include online application URLs. In this case, a plurality of bookmark URLs in association with the network browser may be stored, the bookmark URLs each associated with different web pages of interest.

Further, a plurality of identifiers 2702 in association with the network browser 2700 are displayed, each identifier associated with a different online applications. Using the identifiers 2702 one of the online applications may be accessed, in response to a selection of at least one of the identifiers 2702.

As shown, the identifiers 2702 may be displayed utilizing an explorer bar 2704 to a side of a network browser window 2706 in which HTML content is displayed. In another embodiment, the identifiers may be displayed utilizing a tool bar 2708 above the network browser window 2706 in which HTML content is displayed.

As an option, the identifiers 2702 may be accessible via at least one network browser menu. In this way, the identifiers 2702 may be accessible when the network browser menu is selected.

As noted above, accessing online applications and/or information associated with the online applications may include entering or obtaining user login information. In one embodiment, each of the URLs may have login information associated therewith. In this case, the log-in information may be stored in and/or associated with the network browser 2700 and/or a device displaying the network browser 2700.

In this way, the log-in information may be utilized to access the online application, in response to the selection of at least one of the identifiers 2702. As noted above, in one embodiment, the log-in information may be capable of being entered when registering an associated one of the online applications in association with the network browser.

As an option, the online applications may be opened in a separate new browser tab, in response to the selection of at least one of the identifiers 2702. For example, multiple tabs may appear across the top on the window 2706, each tab corresponding to a different online application. In another embodiment, the online applications may be opened in a separate new browser window, in response to the selection of at least one of the identifiers 2702. In this case, the new browser window may be included as a window within the network browser window 2706 or outside the network browser window 2706.

In one embodiment, the identifiers 2702 may be displayed as computer icons, where computer icons refer to any pictogram. As an option, the identifiers 2702 may be user configurable. For example, the appearance of the identifiers may be configurable. Additionally, a location of display of the identifies may be configurable. For example, a user may have the ability to move the identifiers to various locations in the window 2706.

Furthermore, the user may have the option to add/remove identifiers. Still yet, the configuration of the online desktop may be saved and stored on a user device and/or a network location. For example, an image on the configuration may be saved on a server hosting the online desktop. This may be accomplished by storing various data/metadata associated with the configuration.

In various embodiments, the network browser 2700 may include various other functionality. For example, in one embodiment, the network browser 2700 may display advertisements associated in conjunction with displaying online applications.

Figure 28:
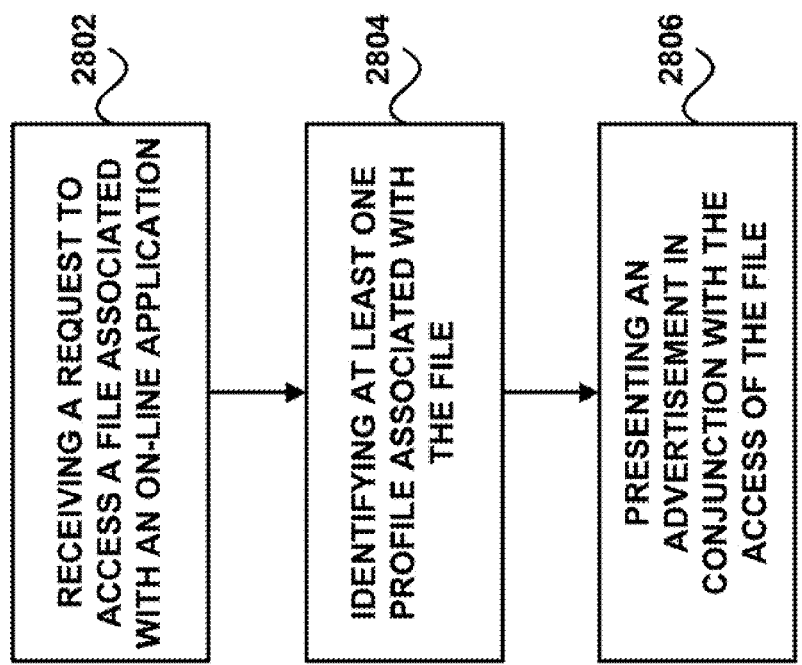
FIG. 28 shows a method of advertising in conjunction with online applications, in accordance with one embodiment.

FIG. 28 shows a method 2800 of advertising in conjunction with online applications, in accordance with one embodiment. As an option, the present method 2800 may be implemented in the context of the functionality and architecture of FIGS. 1-27. Of course, however, the method 2800 may be carried out in any desired environment. It should also be noted that the aforementioned definitions may apply during the present description.

As shown, a request to access a file associated with an online application is received. See operation 2802. Additionally, at least one profile associated with the file is identified. See operation 2804.

In the context of the present description, a profile refers to any information about an object. For example, in various embodiments, the profile may include, but is not limited to, a user profile of a user who initiated the request to access the file, a file profile associated with the file, a combination of a user and file profile, and/or any other profile that meets the above definition. In one case, the file profile may a function of a plurality of tags associated with the file. For example, tags associated with the file may include key words that may be attributed to a profile.

Further, an advertisement is presented in conjunction with the access of the file. See operation 2806. In the context of the present description, the term advertisement may refer to a survey, questionnaire, promotional content, product/service information, and/or anything that is designed to attract attention. In one embodiment, the advertisement may include a digital advertisement.

Further, the advertisement may be presented in a variety of ways. In various embodiments, the advertisement may be presented on a computer, television, PDA, mobile phone, and/or any other mobile or stationary device capable of presenting advertisements. In such embodiments, the advertisement may be presented using web pages, television programs, movies, on-demand programming, audible media, and/or any other media capable of presenting advertisements. Of course, the foregoing examples are set forth for illustrative purposes only and should not be construed as limiting in any manner.

Figure 29:
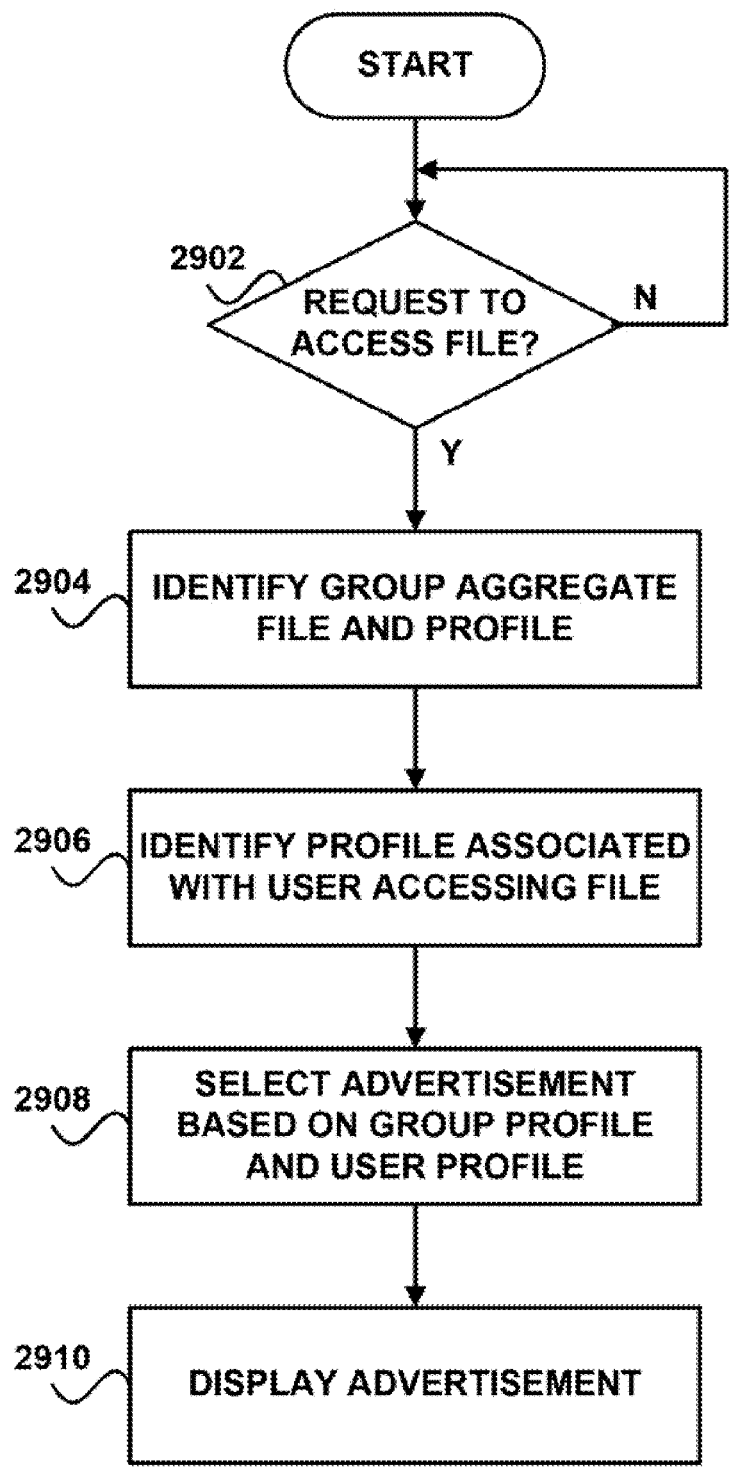
FIG. 29 shows a method of advertising in conjunction with online applications, in accordance with one embodiment.

FIG. 29 shows a method 2900 of advertising in conjunction with online applications, in accordance with one embodiment. As an option, the present method 2900 may be implemented in the context of the functionality and architecture of FIGS. 1-28. Of course, however, the method 2900 may be carried out in any desired environment. It should also be noted that the aforementioned definitions may apply during the present description.

As shown, it is determined whether a request to access a file is received. See operation 2902. If a request to access the file is received, a group profile is identified. See operation 2904. In this case, the group profile may include the profile of a user group associated with the file. For example, the file may be attributable to a group of engineers in a specific area of engineering. Thus, the group profile may be associated with the specific area of engineering.

In another case, the group profile may include a profile of a group of files associated with the user or the particular file being accessed. In this case, file tags, file types, and a number of files may contribute to the group profile.

Once a group profile is identified, a profile of a user accessing the file is identified. See operation 2906. For example, a profile of the user may have been determined when the user registered for an online application associated with the file. In this case, the user may have inputted preference information or the information may have been determined automatically based on user selections during the registration. Furthermore, the user may have inputted preference information or had preference information derived automatically after registration. Such preference information may have been derived based on internet browsing of the user, searches completed by the user, files generated by the user, file tags selected by the user, etc.

Once the profiles are identified, an advertisement is selected, based on the profiles, and then displayed. See operations 2908 and 2910. For example, the advertisement may be displayed in a window associated with a network browser corresponding to an online application. In another embodiment, the advertisement may be sent to a mobile device of the user. In still another embodiment, the advertisement information may be provided to an advertisement agency such that the agency may facilitate the advertising (e.g. via a network browser, on demand television, etc.). In this way, directed advertising may be implemented in conjunction with utilizing online applications.

Figure 30:
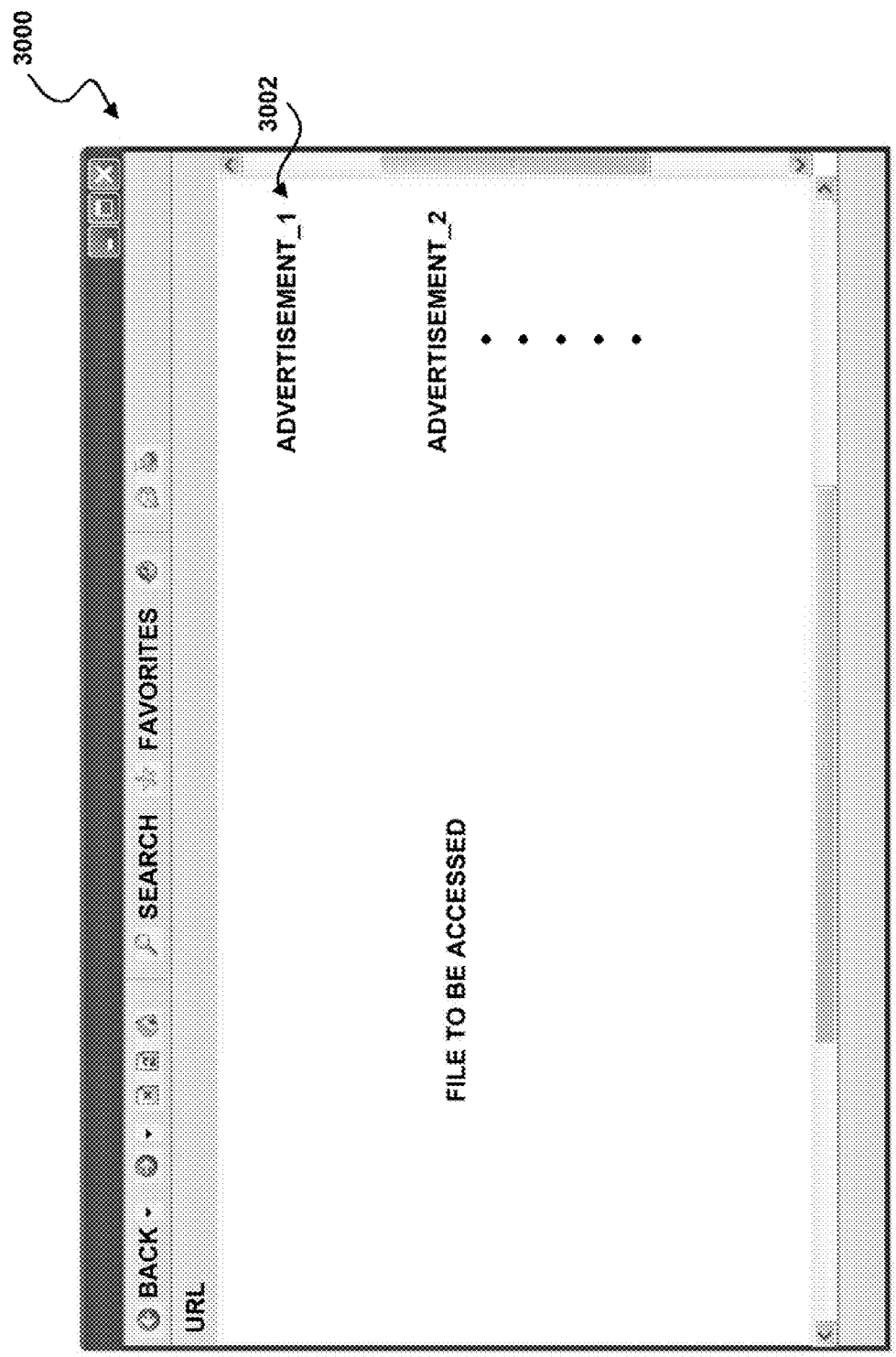
FIG. 30 shows a network browser for viewing advertisements in conjunction with files associated with online applications, in accordance with one embodiment.

FIG. 30 shows a network browser 3000 for viewing advertisements in conjunction with files associated with online applications, in accordance with one embodiment. As an option, the network browser 3000 may be implemented in the context of the functionality and architecture of FIGS. 1-29. Of course, however, the method 3000 may be carried out in any desired environment. It should also be noted that the aforementioned definitions may apply during the present description.

In operation, a request to access a file associated with an online application may be received by the network browser 3000. Additionally, at least one profile associated with the file may be identified. As mentioned above, in one embodiment, the profile may include a file profile associated with the file, where the file profile is a function of a plurality of tags associated with the file.

In this case, the tags may be manually entered or automatically determined. For example, the tags may be determined automatically by parsing words in the document. In another case, the tags may be manually entered using an interface including a folder directory. In one embodiment, the tags may be determined for a plurality of the files. the profile includes a group profile of a group of users who store a plurality of files to a network location.

As an option, the profile may include profile of a group of users who store a plurality of files to a network location. In this case, the profile may include a combination of a user profile and a group profile. In one case, the group profile may be a function of a plurality of tags associated with each of a plurality of the files.

Once the profile has been determined, an advertisement 3002 may be presented in conjunction the file, using the network browser 3000. In this case the advertisement may correspond to the profile (e.g. of the user, group, file, aggregate of multiple profiles, etc.). In addition to potentially displaying the advertisement, the network browser 3000 may display various other items. For example, in one embodiment, the network browser 3000 may include a search interface for performing a search in addition to a window illustrating search results.

Figure 31:
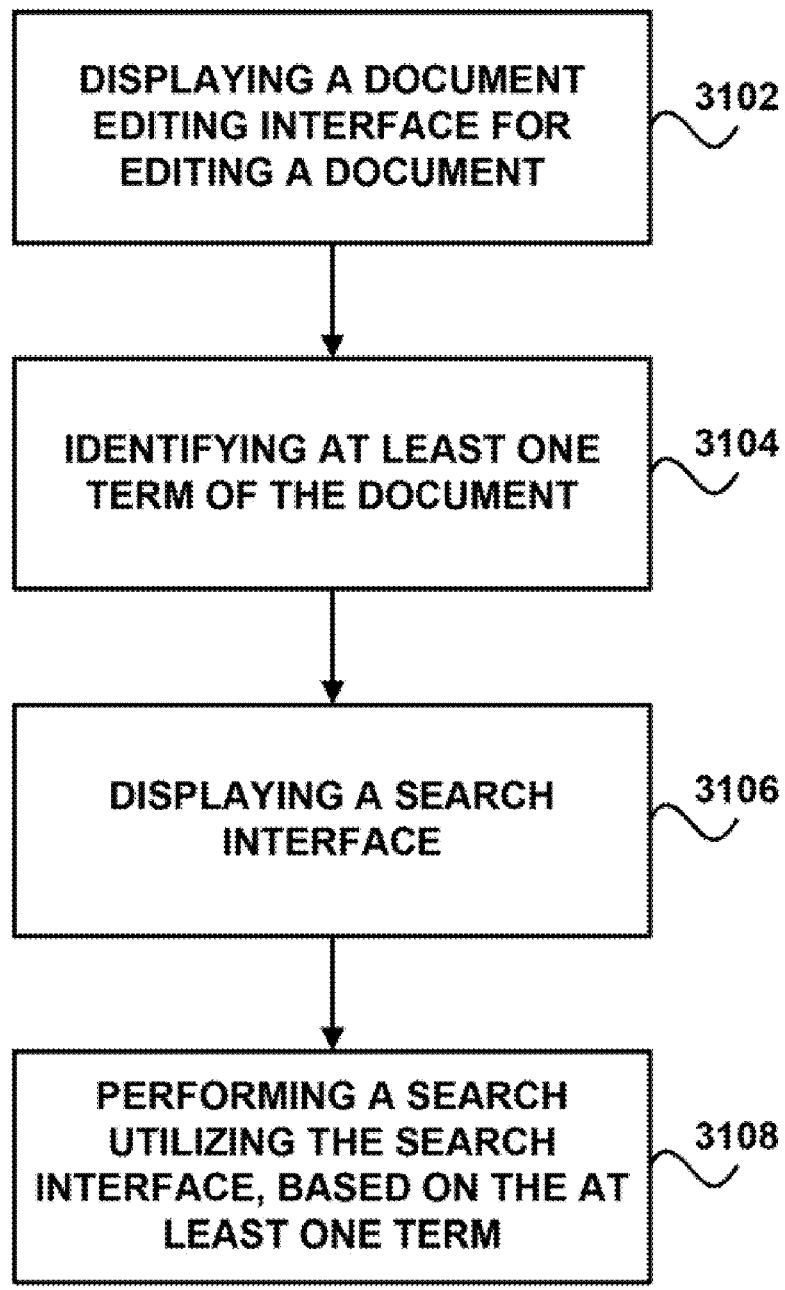
FIG. 31 shows a method for performing a search in conjunction with use of an online application, in accordance with one embodiment.

FIG. 31 shows a method 3100 for performing a search in conjunction with use of an online application, in accordance with one embodiment. As an option, the present method 3100 may be implemented in the context of the functionality and architecture of FIGS. 1-30. Of course, however, the method 3100 may be carried out in any desired environment. It should also be noted that the aforementioned definitions may apply during the present description.

In operation, a document editing interface is displayed for editing a document. See operation 3102. Additionally, at least one term of the document is identified. See operation 3104.

In the context of the present description, a term refers to any character or number, or sequence of characters or numbers. For example, in various embodiments, term may include, but is not limited to, a key word, a phrase, a date, an amount, and/or any other term that meets the above definition.

Further, a search interface is displayed. See operation 3106. Still yet, a search is performed utilizing the search interface, based on the at least one term. See operation 3108.

Figure 32:
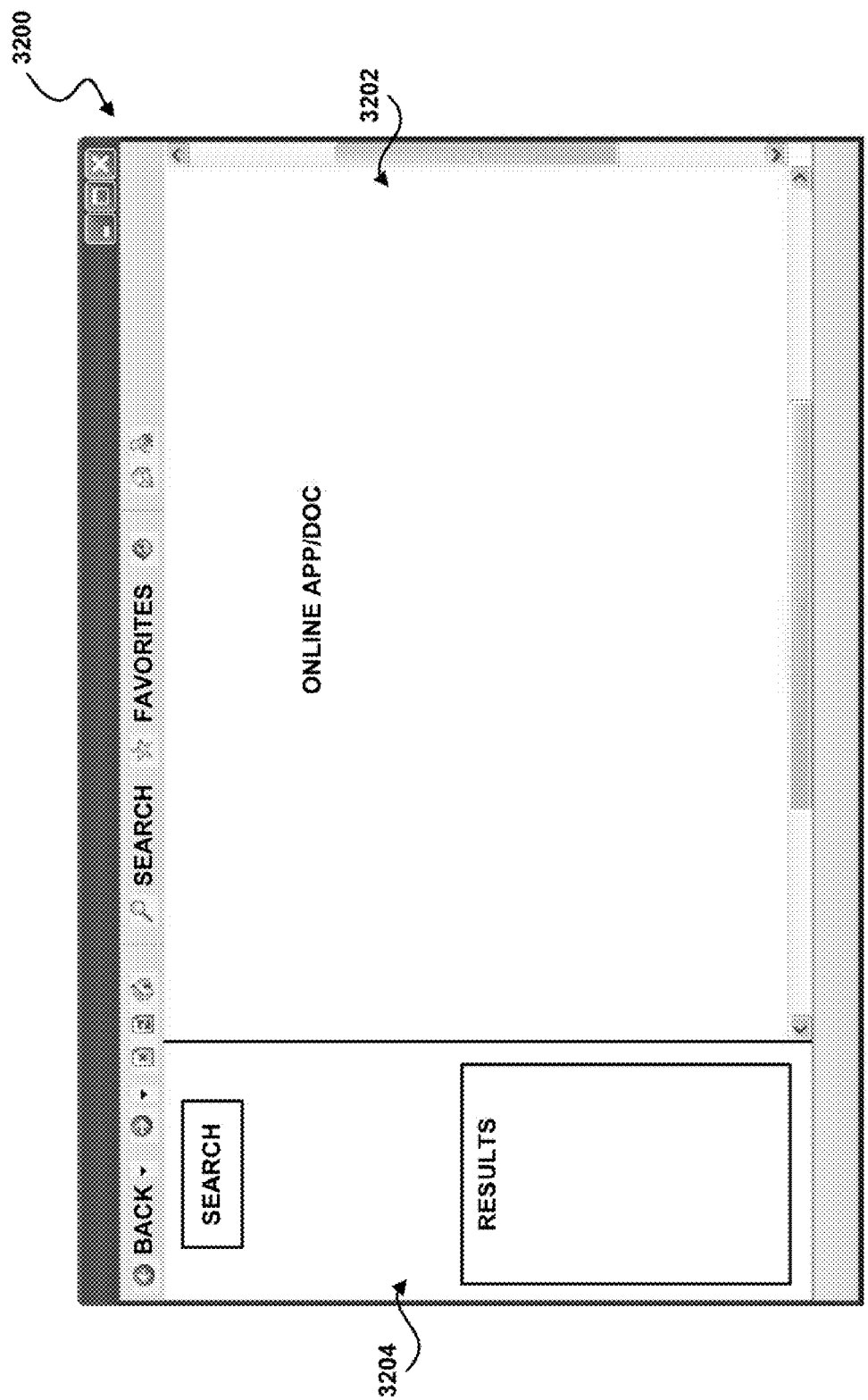
FIG. 32 shows an interface for performing a search in conjunction with use of an online application, in accordance with one embodiment.

FIG. 32 shows an interface 3200 for performing a search in conjunction with use of an online application, in accordance with one embodiment. As an option, the interface 3200 may be implemented in the context of the functionality and architecture of FIGS. 1-32. Of course, however, the interface 3200 may be implemented in any desired environment. It should also be noted that the aforementioned definitions may apply during the present description.

In operation, a document editing interface 3202 is displayed for editing a document. Additionally, at least one term of the document is identified. Further, a search interface 3204 is displayed. Still yet, a search is performed utilizing the search interface 3204, based on the at least one term. In various embodiments, may include a word processor document, a spreadsheet document, and/or a presentation document.

In one embodiment, the at least one term may be identified automatically. For example, the term may be identified by parsing words in the document. In this case, the parsing may include parsing nouns and/or verbs in the document. In one embodiment, the term may be identified by a frequency of use. In another embodiment, the term may be identified based on the same criteria used to automatically identify a tag for a document, as described above.

As an option, the at least one term may be identified manually. In this case, the term may be identified manually by highlighting the at least one term. In another embodiment, the term may be identified by typing the term in an interface search bar. As an option, the search may be performed by performing a right click operation.

As another option, a search term may be automatically suggested. In this case, a plurality of possible terms may be presented in a list. Thus, at least one of the terms in the list may be selected and searched. Further, this may be accomplished in conjunction with a manual or automatic search.

In one embodiment, the term may include includes a plurality of tags. In this case the tags may be determined automatically by parsing words in the document. In various embodiments, nouns, verbs, and/or repeated words in the document may be determined to be tags.

As shown further in FIG. 32, results of the search may be displayed simultaneously with the document. For example, the results may be positioned in a window associated with the interface 3200. In one embodiment, the results may be displayed in a separate window from the document or on a tabbed page of interface 3200.

In one case, the search results may include at least one additional document. In this case, the additional document may be associated with an online application corresponding to the document being displayed currently or another online application. Still yet, at least one additional term of the results may be identified (e.g. manually or automatically). Further, an additional search may be performed utilizing the search interface 3204, based on the at least one additional term. In this way, the search may be focused to better improve search results.

Figure 33:
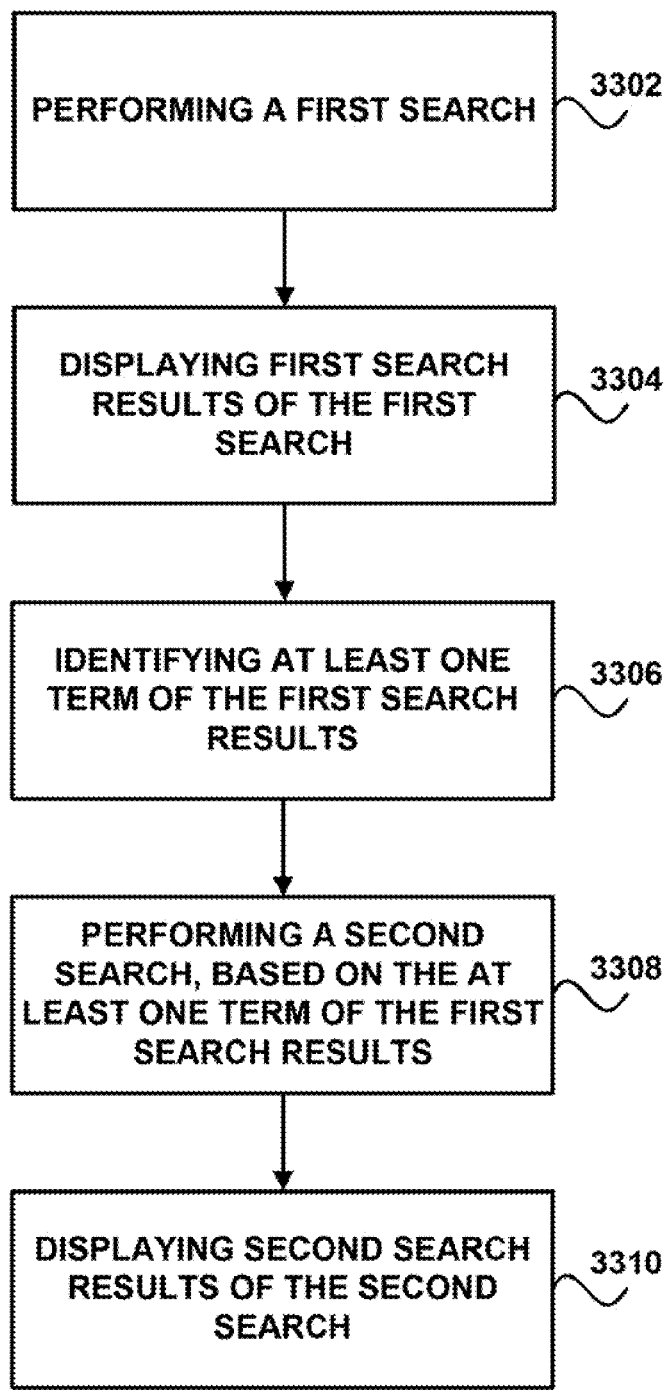
FIG. 33 shows a method for focusing a search, in accordance with one embodiment.

FIG. 33 shows a method 3300 for focusing a search, in accordance with one embodiment. As an option, the present method 3300 may be implemented in the context of the functionality and architecture of FIGS. 1-32. Of course, however, the method 3300 may be carried out in any desired environment. It should also be noted that the aforementioned definitions may apply during the present description.

As shown, a first search is performed. See operation 3302. Additionally, first search results of the first search are displayed. See operation 3304. Further, at least one term of the first search results is identified. See operation 3306.

Still yet, a second search is performed, based on the at least one term of the first search results. See operation 3308. In addition, second search results of the second search are displayed. See operation 3310.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 34:
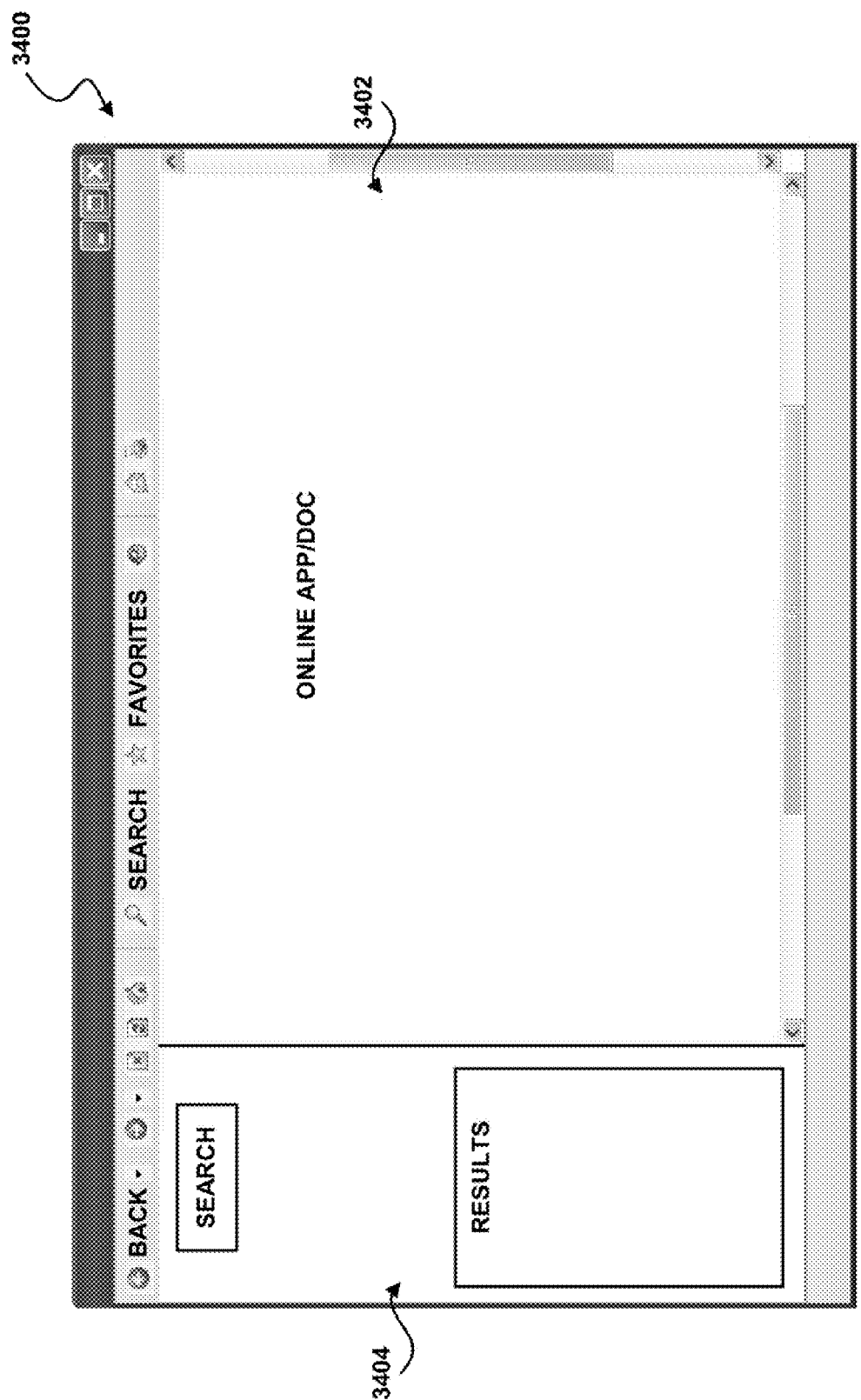
FIG. 34 shows an interface for focusing a search, in accordance with one embodiment.

FIG. 34 shows an interface 3400 for focusing a search, in accordance with one embodiment. As an option, the interface 3400 may be implemented in the context of the functionality and architecture of FIGS. 1-33. Of course, however, the interface 3400 may be implemented in any desired environment. It should also be noted that the aforementioned definitions may apply during the present description.

In operation, a first search is performed using a search interface 3404. Additionally, first search results of the first search are displayed. In one embodiment, the search results may be displayed in a search results window, in conjunction with displaying a document access by an online application.

Further, at least one term of the first search results is identified. A second search is then performed using the search interface 3404, based on the at least one term of the first search results. In addition, second search results of the second search are displayed (e.g. in a search results window).

As an option, the terms may be identified manually. In one case, term may be identified manually by highlighting the at least one term. In this case, the second search may performed by performing a right click operation.

As another option, the terms may be identified automatically. For example, the may be identified automatically by parsing the first search results. In one case, nouns in the first search results may be identified as the at least one term. Additionally, verbs in the first search results may be identified as the at least one term. Still yet, repeated words in the first search results may be identified as the at least one term.

Further, as an option, at least one term may include a plurality of tags. As another option, the at least one term may be selected from a list of a plurality of suggested terms. In this case, the suggested terms may be generated automatically. Furthermore, in various embodiments, the suggested terms may be hierarchically ranked in order of a relevance value, a frequency of occurrence, alphabetically ranked, etc. As an additional option, the term may be selected by highlighting at least one of the suggested terms.

Furthermore, selecting the term may include selecting a term associated with a file corresponding to one or more online applications. In one case, exploration with this file may include opening or executing the online application. In various embodiments, this may be accomplished using any number of devices.

Figure 35:
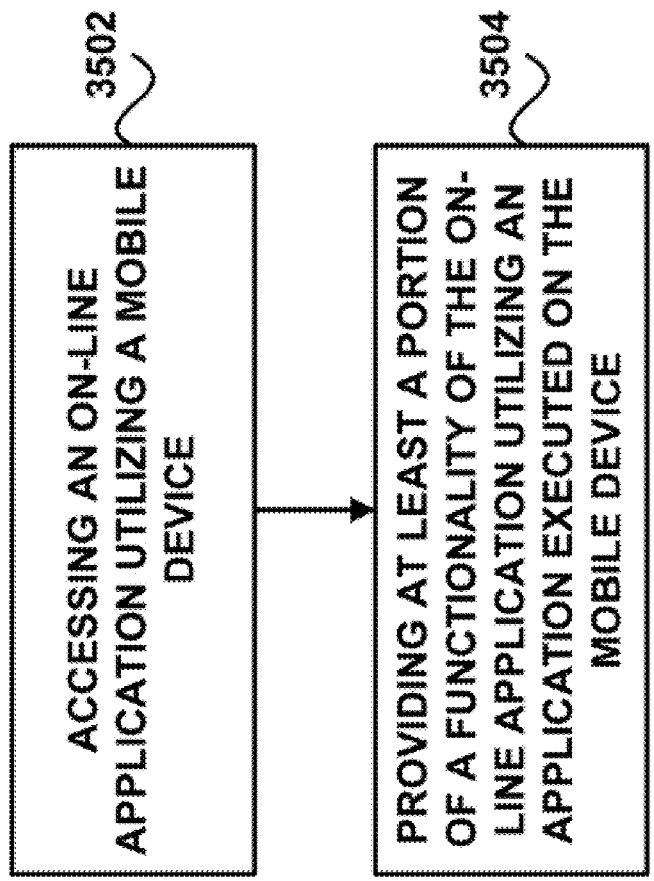
FIG. 35 shows a method for executing an online application on a mobile device, in accordance with one embodiment.

FIG. 35 shows a method 3500 for executing an online application on a mobile device, in accordance with one embodiment. As an option, the present method 3500 may be implemented in the context of the functionality and architecture of FIGS. 1-34. Of course, however, the method 3500 may be carried out in any desired environment. It should also be noted that the aforementioned definitions may apply during the present description.

As shown, an online application is accessed utilizing a mobile device. See operation 3502. Additionally, at least a portion of a functionality of the online application utilizing an application executed on the mobile device. See operation 3504.

In the context of the present description, a mobile device refers to any device which may be utilized in a mobile fashion. For example, in various embodiments, the mobile device may include, but is not limited to, a mobile phone, a PDA, a handheld computer, a laptop, and/or any other mobile device that meets the above definition.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 36:
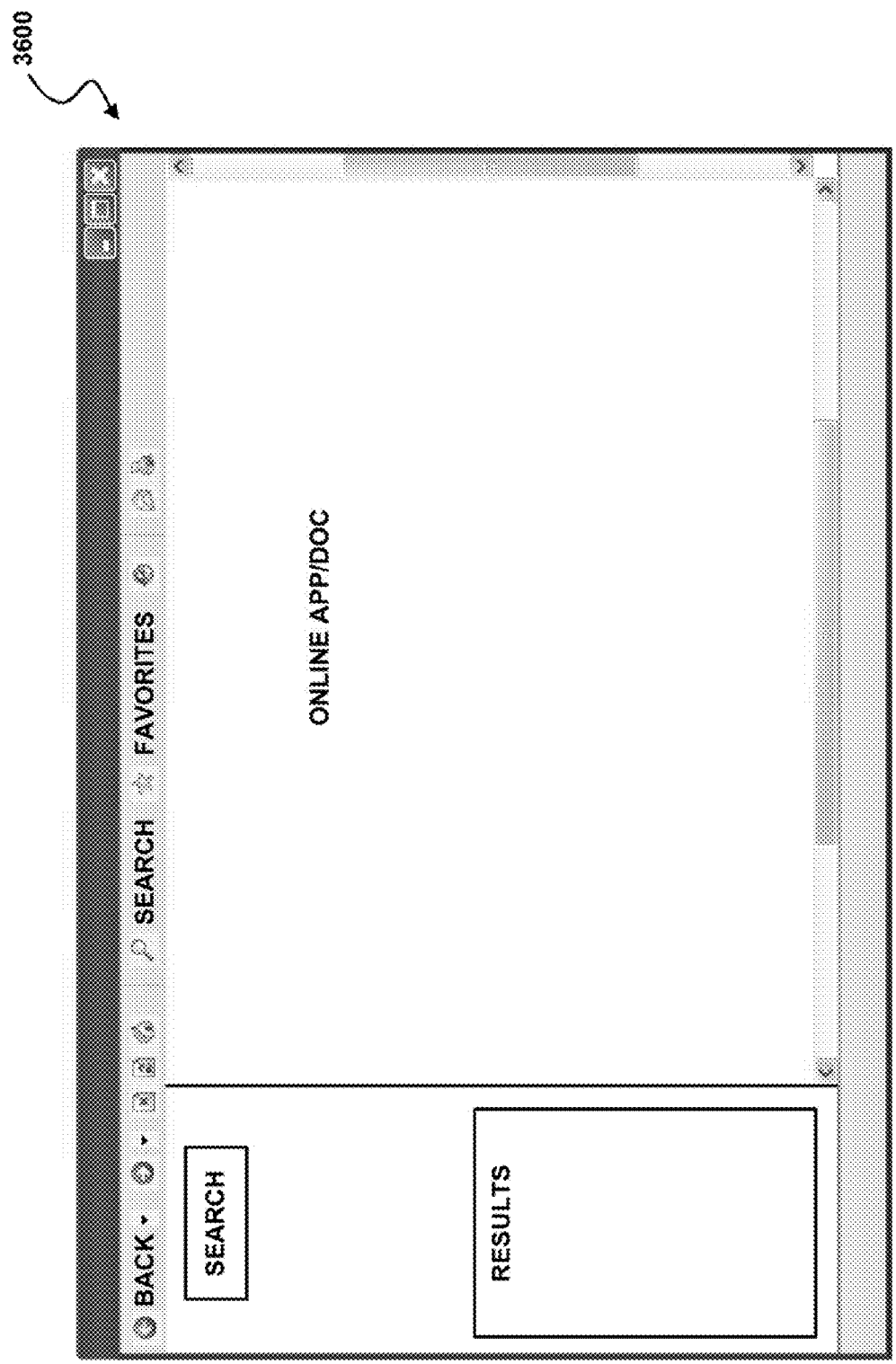
FIG. 36 shows an interface for executing an online application on a mobile device, in accordance with one embodiment.

FIG. 36 shows an interface 3600 for executing an online application on a mobile device, in accordance with one embodiment. As an option, the interface 3600 may be implemented in the context of the functionality and architecture of FIGS. 1-35. Of course, however, the interface 3600 may be implemented in any desired environment. It should also be noted that the aforementioned definitions may apply during the present description.

In operation, an online application is accessed utilizing a mobile device 3602. Additionally, at least a portion of a functionality of the online application utilizing an application executed on the mobile device 3602. In one embodiment, the functionality may be performed by a client application separate from a network browser. As an option, the portion of the functionality may be performed by a network browser plug-in installed on the mobile device 3602.

The functionality of the online application may include any functionality capable of being executed on the mobile device 3602. For example, the portion of the functionality of the online application may include formatting functionality (e.g. text formatting, paragraph formatting, etc.).

Further, in one case, the portion of the functionality may include functionality that would otherwise be provided by a server that serves the online application. For example, the portion of the functionality may include responding to requests that would otherwise be provided by a server that serves the online application. As another example, the portion of the functionality of the online application may be provided by buffering requests of a user, and delaying sending the requests to a server that serves the online application.

In one embodiment, an online application utilizing may be accessed utilizing the mobile device 3602 and a request of a user to the online application may be buffered. Additionally, sending the requests to a server that serves the online application may be delayed. Still yet, a client application separate from the network browser may react to the request.

In this case, the reaction may be performed by a client application separate from the network browser. For example, in one case the reaction may be performed by a network browser plug-in installed on the mobile device 3602. As an option, the reaction may simulate sending the request to a server that serves the online application.

It should be noted that all of the aforementioned functionality may be implemented on the mobile device 3602. For example, the mobile device 3602 may be utilized to perform searches. Furthermore, various other commands may be implemented using the mobile device 3602 (e.g. cutting, pasting, etc.).

Figure 37:
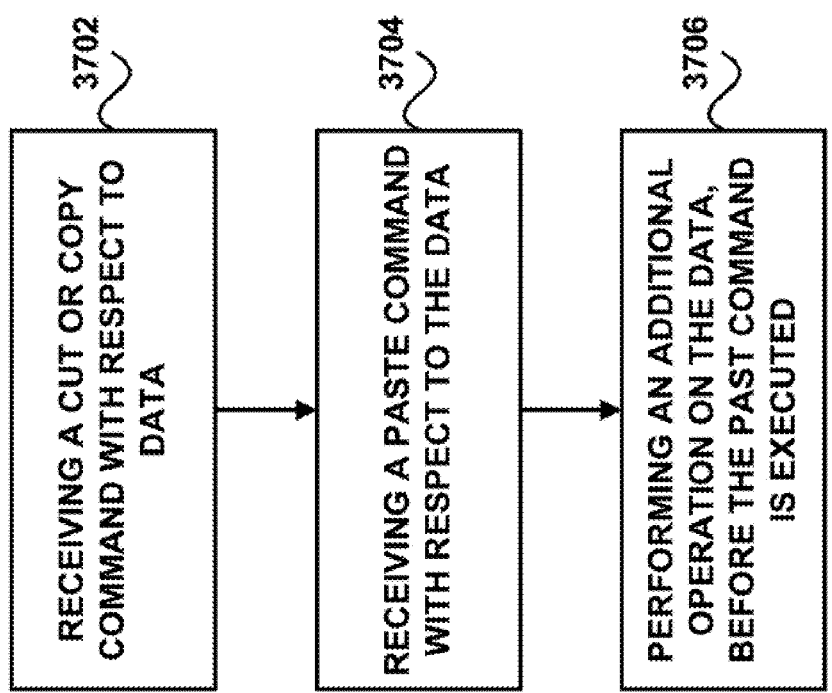
FIG. 37 shows a method for intelligent cutting and pasting, in accordance with one embodiment.

FIG. 37 shows a method 3700 for intelligent cutting and pasting, in accordance with one embodiment. As an option, the present method 3700 may be implemented in the context of the functionality and architecture of FIGS. 1-36. Of course, however, the method 3700 may be carried out in any desired environment. It should also be noted that the aforementioned definitions may apply during the present description.

As shown, a cut or copy command with respect to data is received. See operation 3702. In this case the data may be any data capable of being cut or copied. For example, in various embodiments, the data may include text, objects, symbols, pictures, and/or any other data as defined above.

Additionally, a paste command with respect to the data is received. See operation 3704. Further, an additional operation is performed on the data, before the past command is executed. See operation 3702.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

FIG. 38 shows an interface 3800 for intelligent cutting and pasting, in accordance with one embodiment. As an option, the interface 3800 may be implemented in the context of the functionality and architecture of FIGS. 1-37. Of course, however, the interface 3800 may be implemented in any desired environment. It should also be noted that the aforementioned definitions may apply during the present description.

In operation, a cut or copy command with respect to data is received from the interface 3800. Additionally, a paste command with respect to the data is received from the interface 3800. Further, an additional operation is performed on the data, before the past command is executed.

In one embodiment, the additional operation may add or remove formatting to the data. In this case, the formatting may include text formatting, paragraph formatting, object formatting, picture formatting, and/or any other type of formatting. As an option, the additional operation may include converting a first formatting of the data to a second formatting.

In one embodiment, the second formatting may include a formatting of a destination associated with the paste command. In another embodiment, the additional operation may include performing an optical character recognition (OCR) on the data. In this case, the additional operation may include performing the optical character recognition on the data, such that the paste command results in parsed text being pasted into a document.

In one embodiment, the additional operation may be conditionally performed, based on a user instruction. In this case, the user instruction may include a right-click operation. In one case, a standard paste command may be distinguished from an intelligent paste command. Thus, it may be determined whether the paste command is an intelligent paste command.

In one embodiment, the additional operation may be performed if it is determined that the paste command is an intelligent paste command. In this case, it may be determined whether the paste command is an intelligent paste command, based on user input.

In one embodiment, the user may have an option to use a standard paste command or an intelligent paste command. In this case, the intelligent paste may be an optional preference under a settings menu. Thus, the user may select to apply the intelligent paste command indefinitely throughout a user session.

In another embodiment, the intelligent paste command may include spell check functionality. In this case, incorrect spelling of words copied may be remedied automatically upon invoking the paste command. As another option, the intelligent past command may include an option to paste using bullets. In this case, a user may paste copied text in a bullet format. The bullets may be divided in a variety of ways. For example, the bullets may be divided by carriage return, key word, periods, commas, or any other punctuation, etc. In one case, options for bullet division may be offered in a preferences or settings menu.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

registering a global unique user login information configured to allow access to a plurality of different online applications in association with an online application system, the different online applications including a first online application that provides access to a first one or more files stored at one or more servers associated with the first online application, a second online application that provides access to a second one or more files stored at one or more servers associated with the second online application, a third online application that provides access to a third one or more files stored at one or more servers associated with the third online application, and a fourth online application that provides access to a fourth one or more files stored at one or more servers associated with the fourth online application;

receiving the global unique user login information in connection with a user logging in;

identifying at least one first online application identifier associated with the first online application for registration purposes;

identifying at least one second online application identifier associated with the second online application for registration purposes;

identifying at least one third online application identifier associated with the third online application for registration purposes;

identifying at least one fourth online application identifier associated with the fourth online application for registration purposes;

receiving an indication to add access to the first online application for registration purposes;
receiving an indication to add access to the second online application for registration purposes;
receiving an indication to add access to the third online application for registration purposes;
receiving an indication to add access to the fourth online application for registration purposes;
in connection with the at least one first online application identifier associated with the first online application, allowing registration of the first online application by:
  utilizing data required for the first online application, and
  receiving preference information associated with the first online application;
in connection with the at least one second online application identifier associated with the second online application, allowing registration of the second online application
  utilizing data required for the second online application, and
  receiving preference information associated with the second online application;
in connection with the at least one third online application identifier associated with the third online application, allowing registration of the third online application by:
  utilizing data required for the third online application, and
  receiving preference information associated with the third online application;
in connection with the at least one fourth online application identifier associated with the fourth online application, allowing registration of the fourth online application by:
  utilizing data required for the fourth online application, and
  receiving preference information associated with the fourth online application;
displaying the at least one first online application identifier associated with the first online application for access purposes;
displaying the at least one second online application identifier associated with the second online application for access purposes;
displaying the at least one third online application identifier associated with the third online application for access purposes;
displaying the at least one fourth online application identifier associated with the fourth online application for access purposes;
receiving a selection of the at least one first online application identifier associated with the first online application for access purposes;
receiving a selection of the at least one second online application identifier associated with the second online application for access purposes;
receiving a selection of the at least one third online application identifier associated with the third online application for access purposes;
receiving a selection of the at least one fourth online application identifier associated with the fourth online application for access purposes;
in response to the selection of the at least one first online application identifier associated with the first online application for access purposes, allowing access to the first online application, utilizing the data required for the first online application;
in response to the selection of the at least one second online application identifier associated with the second online application for access purposes, allowing access to the second online application, utilizing the data required for the second online application;
in response to the selection of the at least one third online application identifier associated with the third online application for access purposes, allowing access to the third online application, utilizing the data required for the third online application;
in response to the selection of the at least one fourth online application identifier associated with the fourth online application for access purposes, allowing access to the fourth online application, utilizing the data required for the fourth online application;
identifying a document in association with the online application system;
receiving a request from a logged-in user;
in response to the request, displaying an interface for receiving an indication of one or more tags, the interface including:
  at least one text box for receiving manually inserted tags, and
  a list of potential tags;
utilizing the interface, receiving the indication of the one or more tags; and
correlating the one or more tags with the document.

2. A computer program product embodied on a non-transitory computer-readable medium, comprising:
code for registering a global unique user login information configured to allow access to a plurality of different online applications in association with an online application system, the different online applications including a first online application that provides access to a first one or more files stored at one or more servers associated with the first online application, a second online application that provides access to a second one or more files stored at one or more servers associated with the second online application, a third online application that provides access to a third one or more files stored at one or more servers associated with the third online application, and a fourth online application that provides access to a fourth one or more files stored at one or more servers associated with the fourth online application;
code for receiving the global unique user login information in connection with a user logging in;
code for identifying at least one first online application identifier associated with the first online application for registration purposes;
code for identifying at least one second online application identifier associated with the second online application for registration purposes;
code for identifying at least one third online application identifier associated with the third online application for registration purposes;
code for identifying at least one fourth online application identifier associated with the fourth online application for registration purposes;
code for receiving an indication to add access to the first online application for registration purposes;
code for receiving an indication to add access to the second online application for registration purposes;
code for receiving an indication to add access to the third online application for registration purposes;
code for receiving an indication to add access to the fourth online application for registration purposes;

code for, in connection with the at least one first online application identifier associated with the first online application, allowing registration of the first online application by:
  utilizing data required for the first online application, and
  receiving preference information associated with the first online application;
code for, in connection with the at least one second online application identifier associated with the second online application, allowing registration of the second online application by:
  utilizing data required for the second online application, and
  receiving preference information associated with the second online application;
code for, in connection with the at least one third online application identifier associated with the third online application, allowing registration of the third online application by:
  utilizing data required for the third online application, and
  receiving preference information associated with the third online application;
code for, in connection with the at least one fourth online application identifier associated with the fourth online application, allowing registration of the fourth online application by:
  utilizing data required for the fourth online application, and
  receiving preference information associated with the fourth online application;
code for displaying the at least one first online application identifier associated with the first online application for access purposes;
code for displaying the at least one second online application identifier associated with the second online application for access purposes;
code for displaying the at least one third online application identifier associated with the third online application for access purposes;
code for displaying the at least one fourth online application identifier associated with the fourth online application for access purposes;
code for receiving a selection of the at least one first online application identifier associated with the first online application for access purposes;
code for receiving a selection of the at least one second online application identifier associated with the second online application for access purposes;
code for receiving a selection of the at least one third online application identifier associated with the third online application for access purposes;
code for receiving a selection of the at least one fourth online application identifier associated with the fourth online application for access purposes;
code for, in response to the selection of the at least one first online application identifier associated with the first online application for access purposes, allowing access to the first online application, utilizing the data required for the first online application;
code for, in response to the selection of the at least one second online application identifier associated with the second online application for access purposes, allowing access to the second online application, utilizing the data required for the second online application;
code for, in response to the selection of the at least one third online application identifier associated with the third online application for access purposes, allowing access to the third online application, utilizing the data required for the third online application;
code for, in response to the selection of the at least one fourth online application identifier associated with the fourth online application for access purposes, allowing access to the fourth online application, utilizing the data required for the fourth online application;
code for identifying a document in association with the online application system;
code for receiving a request from a logged-in user;
code for, in response to the request, displaying an interface for receiving an indication of one or more tags, the interface including:
  at least one text box for receiving manually inserted tags, and
  a list of potential tags;
code for, utilizing the interface, receiving the indication of the one or more tags; and
code for correlating the one or more tags with the document.

3. A system, comprising:
a processor;
logic for registering a global unique user login information configured to allow access to a plurality of different online applications in association with an online application system, the different online applications including a first online application that provides access to a first one or more files stored at one or more servers associated with the first online application, a second online application that provides access to a second one or more files stored at one or more servers associated with the second online application, a third online application that provides access to a third one or more files stored at one or more servers associated with the third online application, and a fourth online application that provides access to a fourth one or more files stored at one or more servers associated with the fourth online application;
logic for receiving the global unique user login information in connection with a user logging in;
logic for identifying at least one first online application identifier associated with the first online application for registration purposes;
logic for identifying at least one second online application identifier associated with the second online application for registration purposes;
logic for identifying at least one third online application identifier associated with the third online application for registration purposes;
logic for identifying at least one fourth online application identifier associated with the fourth online application for registration purposes;
logic for receiving an indication to add access to the first online application for registration purposes;
logic for receiving an indication to add access to the second online application for registration purposes;
logic for receiving an indication to add access to the third online application for registration purposes;
logic for receiving an indication to add access to the fourth online application for registration purposes;
logic for, in connection with the at least one first online application identifier associated with the first online application, allowing registration of the first online application by:

utilizing data required for the first online application, and receiving preference information associated with the first online application;

logic for, in connection with the at least one second online application identifier associated with the second online application, allowing registration of the second online application by:

utilizing data required for the second online application, and receiving preference information associated with the second online application; 'logic for, in connection with the at least one third online application identifier associated with the third online application, allowing registration of the third online application by:

utilizing data required for the third online application, and receiving preference information associated with the third online application;

logic for, in connection with the at least one fourth online application identifier associated with the fourth online application, allowing registration of the fourth online application by:

utilizing data required for the fourth online application, and receiving preference information associated with the fourth online application;

logic for displaying the at least one first online application identifier associated with the first online application for access purposes;

logic for displaying the at least one second online application identifier associated with the second online application for access purposes;

logic for displaying the at least one third online application identifier associated with the third online application for access purposes;

logic for displaying the at least one fourth online application identifier associated with the fourth online application for access purposes;

logic for receiving a selection of the at least one first online application identifier associated with the first online application for access purposes;

logic for receiving a selection of the at least one second online application identifier associated with the second online application for access purposes;

logic for receiving a selection of the at least one third online application identifier associated with the third online application for access purposes;

logic for receiving a selection of the at least one fourth online application identifier associated with the fourth online application for access purposes;

logic for, in response to the selection of the at least one first online application identifier associated with the first online application for access purposes, allowing access to the first online application, utilizing the data required for the first online application;

logic for, in response to the selection of the at least one second online application identifier associated with the second online application for access purposes, allowing access to the second online application, utilizing the data required for the second online application;

logic for, in response to the selection of the at least one third online application identifier associated with the third online application for access purposes, allowing access to the third online application, utilizing the data required for the third online application;

logic for, in response to the selection of the at least one fourth online application identifier associated with the fourth online application for access purposes, allowing access to the fourth online application, utilizing the data required for the fourth online application;

logic for identifying a document in association with the online application system;

logic for receiving a request from a logged-in user;

logic for, in response to the request, displaying an interface for receiving an indication of one or more tags, the interface including:

at least one text box for receiving manually inserted tags, and a list of potential tags;

logic for, utilizing the interface, receiving the indication of the one or more tags; and logic for correlating the one or more tags with the document.

4. The computer program product of claim 2, wherein the code is all provided by a server.

5. The computer program product of claim 2, wherein the document includes a picture.

6. The computer program product of claim 2, wherein the computer program product is configured to cooperate with at least one mobile application configured to access at least one of the different online applications utilizing a mobile device, the computer program product further configured to allow the at least one mobile application to provide at least a portion of a functionality of the at least one of the different online applications.

7. The computer program product of claim 6, wherein the computer program product is configured such that the portion of the functionality is performed by a client application separate from a network browser.

8. The computer program product of claim 6, wherein the computer program product is configured such that the portion of the functionality is performed by a network browser plug-in installed on the mobile device.

9. The computer program product of claim 6, wherein the computer program product is configured such that the portion of the functionality includes that which would otherwise be provided by a server that serves the online application.

10. The computer program product of claim 6, wherein the computer program product is configured such that the portion of the functionality includes responding to requests that would otherwise be provided by a server that serves the at least one of the different online applications.

11. The computer program product of claim 2, wherein the list of potential tags includes previously existing tags.

12. The computer program product of claim 2, wherein the list of potential tags includes recommended tags.

13. The computer program product of claim 2, wherein the data is different from the global unique user login information.

14. The computer program product of claim 2, wherein the data associated with the first online application is different from the data associated with the second online application.

15. The computer program product of claim 2, wherein the computer program product is configured such that the first online application identifier, the second online application identifier, the third online application identifier, and the fourth online application identifier are organized utilizing tabs.

16. The computer program product of claim 2, wherein the computer program product is configured such that the preference information is derived based on internet browsing of the user.

17. The computer program product of claim 2, wherein the computer program product is configured such that the preference information is derived based on searches completed by the user.

18. The computer program product of claim 2, wherein the computer program product is configured such that the interface is displayed in response to selection of a tag icon.

19. The computer program product of claim 2, wherein the computer program product is configured such that access to the different online applications is provided without requiring the user to enter separate login information for each of the plurality of different online applications.

20. The computer program product of claim 2, wherein the potential tags include suggested tags.

21. The computer program product of claim 2, and further comprising:
    code for receiving a request to access a digital entity associated with at least one of the different online applications;
    code for identifying at least one profile in association with the request to access the digital entity, the at least one profile including:
        at least one user profile of an accessing user that initiated the request to access the digital entity, the at least one user profile including:
            registration information determined when the accessing user registered, and
            automatically determined information that is determined automatically based on user selections of the accessing user; and
        at least one group profile; and
    code for presenting an advertisement in conjunction with the access to the digital entity, based on the registration information and the automatically determined information of the at least one user profile, and the at least one group profile.

22. The computer program product of claim 21, wherein the at least one profile is associated with the digital entity.

23. The computer program product of claim 21, wherein the digital entity includes a file.

24. The computer program product of claim 21, wherein the at least one profile includes an aggregate of multiple profiles.

25. The computer program product of claim 21, wherein the digital entity includes a page.

26. The computer program product of claim 21, wherein the computer program product is configured such that the automatically determined information is determined automatically during registration.

27. The computer program product of claim 21, wherein the computer program product is configured such that the automatically determined information is determined automatically after registration.

28. The computer program product of claim 21, wherein the computer program product is configured such that the preference information is derived based on internet browsing of the user.

29. The computer program product of claim 21, wherein the computer program product is configured such that the preference information is derived based on searches completed by the user.

30. The computer program product of claim 2, wherein the computer program product is configured such that the preference information is derived based on at least one page generated by the user.

31. The computer program product of claim 2, wherein the preference information is derived based on tags selected by the user.

32. The computer program product of claim 21, wherein the computer program product is configured to cooperate with at least one mobile application for accessing at least one of the different online applications utilizing a mobile device, the computer program product further configured to allow the at least one mobile application to provide at least a portion of a functionality of the at least one of the different online applications.

33. The computer program product of claim 32, wherein the computer program product is configured such that the portion of the functionality is performed by a client application separate from a network browser.

34. The computer program product of claim 32, wherein the computer program product is configured such that the portion of the functionality is performed by a network browser plug-in installed on the mobile device.

35. The computer program product of claim 32, wherein the computer program product is configured such that the portion of the functionality includes that which would otherwise be provided by a particular server that serves a corresponding online application.

36. The computer program product of claim 32, wherein the computer program product is configured such that the portion of the functionality includes responding to requests that would otherwise be provided by a particular server that serves a corresponding online application.

37. The computer program product of claim 32, wherein the computer program product is configured such that the portion of the functionality of the online application is provided by buffering requests of the user, and delaying sending the requests to a particular server that serves a corresponding online application.

38. The computer program product of claim 32, wherein the computer program product is configured such that the portion of the functionality includes buffering.

39. The computer program product of claim 32, wherein the computer program product is configured such that the portion of the functionality includes searching functionality.

40. The computer program product of claim 32, wherein the computer program product is configured such that the portion of the functionality includes user interface-related functionality.

41. The computer program product of claim 21, wherein the computer program product is configured such that the digital entity includes the document.

42. The computer program product of claim 21, wherein the computer program product is configured such that the digital entity includes a file associated with an e-mail.

43. The computer program product of claim 21, wherein the logged-in user is the accessing user.

44. The computer program product of claim 2, wherein the data required for the first online application is different from the data required for the second online application.

45. The computer program product of claim 2, wherein the document is a picture that is generated with an editor.

46. The computer program product of claim 2, wherein the computer program product is configured such that the first online application identifier, the second online application identifier, the third online application identifier, and the fourth online application identifier are organized utilizing tabs.

47. The computer program product of claim 2, wherein the computer program product is configured such that the first online application identifier, the second online application identifier, the third online application identifier, and the fourth online application identifier are displayed utilizing a network browser.

48. The computer program product of claim 2, wherein the computer program product is configured such that the first online application identifier, the second online application identifier, the third online application identifier, and the fourth online application identifier are displayed utilizing a plug-in.

49. The computer program product of claim 2, wherein the computer program product is configured such that the first online application identifier, the second online application identifier, the third online application identifier, and the fourth online application identifier are organized in a vertically oriented manner.

50. The computer program product of claim 2, wherein the computer program product is configured such that the first online application identifier, the second online application identifier, the third online application identifier, and the fourth online application identifier are organized in horizontally oriented tabs.

51. The computer program product of claim 2, wherein the data required for the first online application includes first online application login information.

52. The computer program product of claim 2, wherein the data required for the first online application includes the global unique user login information.

53. The computer program product of claim 2, wherein the computer program product is configured such that the data required for the first online application is stored on one or more servers.

54. The computer program product of claim 2, wherein the computer program product is configured such that the data required for the first online application is utilized by being received.

55. The computer program product of claim 2, wherein the computer program product is configured such that the data required for the first online application is utilized by being stored.

56. The computer program product of claim 2, wherein the computer program product is configured such that the at least one first online application identifier is identified by the user.

57. The computer program product of claim 2, wherein the computer program product is configured such that the at least one first online application identifier is identified by being displayed.

58. The computer program product of claim 2, wherein the computer program product is configured such that the at least one first online application identifier is identified by a provider other than the user.

59. The computer program product of claim 2, wherein the files include at least one of a word processor file type, a text file type, a PDF file type, a drawing file type, a spreadsheet file type, or a presentation file type.

60. The computer program product of claim 2, wherein the computer program product is configured such that the indication to add access to the first online application indicates that the at least one first online application identifier should be displayed at a predetermined location.

61. The computer program product of claim 60, wherein the predetermined location includes a desktop image.

62. The computer program product of claim 2, wherein the computer program product is configured such that the indication to add access to the first online application results in the at least one first online application identifier being displayed at a predetermined location.

63. The computer program product of claim 62, wherein the predetermined location includes a desktop image.

64. The computer program product of claim 2, wherein the computer program product is configured such that the interface is displayed in response to selection of a tag icon.

65. The computer program product of claim 2, wherein the computer program product is configured such that the global unique user login information is stored on a device of the user.

66. The computer program product of claim 2, wherein the global unique user login information includes a user identifier and a password.

67. The computer program product of claim 2, wherein the computer program product is configured such that the potential tags are generated based on previously existing tags associated with other documents.

68. The computer program product of claim 2, wherein the computer program product is configured such that the computer program product is configured to cooperate with at least one mobile application for accessing at least one of the plurality of different online applications utilizing a mobile device.

69. The computer program product of claim 68, wherein the computer program product is configured such that the computer program product is configured to allow the at least one mobile application to provide at least a portion of a functionality of the at least one of the plurality of different online applications.

70. The computer program product of claim 69, wherein the computer program product is configured such that the portion of the functionality is performed by a client application separate from a network browser.

71. The computer program product of claim 69, wherein the computer program product is configured such that the portion of the functionality is performed by a network browser plug-in installed on the mobile device.

72. The computer program product of claim 69, wherein the computer program product is configured such that the portion of the functionality is that which would otherwise be provided by a server that serves a corresponding online application.

73. The computer program product of claim 69, wherein the computer program product is configured such that the portion of the functionality includes responding to requests that would otherwise be handled by a server that serves a corresponding online application.

74. The computer program product of claim 2, and further comprising:
  code for receiving a request to access a page associated with at least one of the different online applications, the page including the document which is a picture;
  code for identifying at least one profile in association with the request to access the page, the at least one profile including:
    at least one user profile of an accessing user that initiated the request, the at least one user profile including:
      registration information determined when the accessing user registered, and
      automatically determined information that is determined automatically based on user selections of the accessing user; and
    at least one group profile; and
  code for presenting an advertisement in conjunction with the access to the page, based on the registration information and the automatically determined information of the at least one user profile, and the at least one group profile.

75. The computer program product of claim 2, and further comprising:

code for displaying a search interface in connection with the online application system;
code for performing a first search in connection with the online application system utilizing the search interface;
code for displaying first search results associated with the first search;
code for identifying at least one additional term by automatically suggesting a plurality of possible terms that are presented in a list;
code for performing a second search in connection with the first search results, based on the at least one additional term; and
code for displaying second search results of the second search.

76. The computer program product of claim 2, and further comprising:
code for receiving a request to access a page associated with at least one of the different online applications, the page including the document which is a picture;
code for identifying at least one profile in association with the request to access the page, the at least one profile including:
at least one user profile of an accessing user that initiated the request to access the page, the at least one user profile including:
registration information determined when the accessing user registered, and
automatically determined information that is determined automatically based on user selections of the accessing user; and
at least one group profile;
code for displaying a search interface in connection with the online application system, the search interface being displayed simultaneously with an advertisement that is selected based on the registration information and the automatically determined information of the at least one user profile, and the at least one group profile;
code for performing a first search in connection with the online application system utilizing the search interface;
code for displaying first search results associated with the first search;
code for identifying at least one additional term by automatically suggesting a plurality of possible terms that are presented in a list;
code for performing a second search, based on the at least one additional term; and
code for displaying second search results of the second search.

77. The computer program product of claim 2, wherein the computer program product is configured such that the potential tags are generated based on previously existing tags associated with the document.

78. The computer program product of claim 2, wherein the computer program product is configured such that the potential tags are generated based on a content of the document, and one or more previously existing tags associated with one or more other documents.

79. The computer program product of claim 2, wherein the computer program product is configured such that the potential tags are listed in an order that is a function of the document.

80. The computer program product of claim 2, wherein the computer program product is configured such that the potential tags are listed in an order that is a function of a relevancy to the document.

81. The computer program product of claim 2, wherein the potential tags include suggested tags.

82. The computer program product of claim 2, wherein the computer program product is configured such that the correlated one or more tags are utilized in connection with a search for documents.

83. The computer program product of claim 2, wherein the computer program product is configured such that the correlated one or more tags are utilized in connection with a search for the document.

84. The computer program product of claim 2, wherein the computer program product is configured such that the correlated one or more tags are utilized in connection with a search, in association with a plurality of the different online applications.

85. The computer program product of claim 2, wherein the computer program product is configured such that multiple of the different online applications have associated login information for use in accessing user-specific information stored utilizing the multiple different online applications.

86. The computer program product of claim 85, wherein the user-specific information includes tags.

87. The computer program product of claim 85, wherein the user-specific information includes profile information.

88. The computer program product of claim 2, wherein the tags are listed in a drop down menu.

89. The computer program product of claim 2, wherein the first online application includes an online editor.

90. The computer program product of claim 2, wherein the at least one first online application identifier, the at least one second online application identifier, the at least one third online application identifier, and the at least one fourth online application identifier are displayed simultaneously during access of at least one of the first online application, the second online application, the third online application, or the fourth online application.

91. The computer program product of claim 2, wherein the computer program product is configured such that first information associated with the first online application is subject of a commenting function of the second online application.

92. The computer program product of claim 2, wherein the computer program product is configured such that the document is associated with the first online application and is subject of a publishing function of the second online application.

93. The computer program product of claim 2, wherein the computer program product is configured such that the document is associated with the first online application and is subject of a commenting function of the second online application.

94. The computer program product of claim 2, wherein the computer program product is configured such that a picture associated with the first online application is subject of a publishing function of the second online application.

95. The computer program product of claim 2, wherein the computer program product is configured such that additional application identifiers are added.

96. The computer program product of claim 74, wherein the advertisement is displayed utilizing a web page.

97. The computer program product of claim 2, wherein the computer program product is configured such that the at least one first online application identifier, the at least one second online application identifier, the at least one third online application identifier, and the at least one fourth online application identifier are displayed simultaneously for access via an online application menu that is user-manipulated by adding and removing online application identifiers; wherein the computer program product is configured to cooperate with at least one mobile application configured to access at least one of the plurality of different online applications utilizing a mobile device, and allow the at least one mobile application to provide at least a portion of a functionality of the at least one of the plurality of different online applications; wherein the computer program product is configured such that the potential tags are generated based on previously existing tags; and the correlated one or more tags are utilized in connection with a search; wherein the computer program product is configured such that at least one of the different online applications accesses stored user-specific information including profile information; wherein the computer program product is configured such that first information associated with the first online application is subject of a commenting or publishing function of the second online application.

98. The computer program product of claim 2, wherein the computer program product is configured such that the at least one first online application identifier, the at least one second online application identifier, the at least one third online application identifier, and the at least one fourth online application identifier are displayed simultaneously for access via an online application menu that is user-manipulated by adding and removing online application identifiers.

99. The computer program product of claim 2, wherein the computer program product is configured such that a first document associated with the first online application which includes a word processor with tagging capabilities is subject of a commenting function of the second online application.

100. The computer program product of claim 2, wherein the computer program product is configured such that a first document associated with the first online application which includes a word processor with tagging capabilities is subject of a publishing function of the second online application.

101. The computer program product of claim 2, wherein the computer program product is configured such that a first document associated with the first online application is subject of a publishing function of the second online application while displaying the first document using the first online application, by selecting indicia representative of the publishing function of the second online application.

102. The computer program product of claim 2, wherein the computer program product is configured such that a first document associated with the first online application is subject of a publishing function of the second online application while displaying the first document using the first online application, by selecting indicia representative of the publishing function of the second online application, such that the publishing function is applied without sending data via a client.

103. The computer program product of claim 74, wherein the group profile includes a profile of a user group.

104. The computer program product of claim 74, wherein the group profile includes a profile of a user group associated with the file.

105. The computer program product of claim 74, wherein the group profile includes a profile of a user group having a commonality.

106. The computer program product of claim 74, wherein the computer program product is configured such that the registration information is determined when the accessing user registered for a corresponding one of the different online applications, such that the advertisement is displayed with the corresponding one of the different online applications.

107. The computer program product of claim 2, wherein the computer program product is configured such that the preference information associated with the first online application is entered via a registration interface dedicated to the first online application.

108. The computer program product of claim 2, wherein the computer program product is configured such that: the preference information associated with the first online application is entered via a first registration interface corresponding to the first online application; the preference information associated with the second online application is entered via a second registration interface corresponding to the second online application; the preference information associated with the third online application is entered via a third registration interface corresponding to the third online application; and the preference information associated with the fourth online application is entered via a fourth registration interface corresponding to the fourth online application.

109. The computer program product of claim 2, wherein the computer program product is configured such that the at least one first online application identifier, the at least one second online application identifier, the at least one third online application identifier, and the at least one fourth online application identifier are displayed simultaneously for access thereto while viewing content associated with one of the different online applications.

110. The computer program product of claim 2, wherein the computer program product is configured such that the at least one first online application identifier, the at least one second online application identifier, the at least one third online application identifier, and the at least one fourth online application identifier are displayed simultaneously while viewing content associated with one of the different online applications, for access via an online application menu that is user-manipulated by moving, adding, and removing different online application identifiers.

111. The computer program product of claim 2, and further comprising:
  code for receiving a request to access a digital entity associated with at least one of the different online applications;
  code for identifying at least one profile in association with the request to access the digital entity, the at least one profile including:
    at least one user profile of an accessing user that initiated the request to access the digital entity, the at least one user profile including:
      automatically determined information that is determined automatically based on browsing activity of the accessing user; and
  code for presenting an advertisement in conjunction with the access to the digital entity, based on the browsing activity of the accessing user.

112. The computer program product of claim 2, and further comprising:
  code for receiving a request to access the document;
  code for identifying at least one profile in association with the request to access the document, the at least one profile including automatically determined information that is determined automatically based on browsing activity of an accessing user; and
  code for presenting an advertisement in conjunction with the access to the document, based on the browsing activity of the accessing user.

113. The computer program product of claim 2, and further comprising:
  code for receiving a request to access a page associated with at least one of the different online applications, the page including a search interface and the document which is a picture;

code for identifying at least one profile in association with the request to access the page, the at least one profile including:
at least one user profile of an accessing user that initiated the request to access the page, the at least one user profile including:
registration information determined when the accessing user registered, and
automatically determined information that is determined automatically based on user selections of the accessing user during Internet browsing; and
at least one group profile;
code for presenting an advertisement in conjunction with the access to the page, based on the registration information and the automatically determined information of the at least one user profile, and the at least one group profile;
code for performing a first search in connection with the online application system utilizing the search interface;
code for displaying first search results associated with the first search;
code for identifying at least one additional input in connection with the first search results;
code for focusing the first search, based on the at least one additional input; and
code for displaying second search results of the focusing;
wherein the computer program product is configured such that the at least one first online application identifier, the at least one second online application identifier, the at least one third online application identifier, and the at least one fourth online application identifier are displayed simultaneously for access via an online application menu that is user-manipulated by adding and removing online application identifiers; wherein the computer program product is configured to cooperate with at least one mobile application configured to access at least one of the plurality of different online applications utilizing a mobile device, and allow the at least one mobile application to provide at least a portion of a functionality of the at least one of the plurality of different online applications; wherein the computer program product is configured such that the potential tags are generated based on previously existing tags; and the correlated one or more tags are utilized in connection with the first search; wherein the computer program product is configured such that the different online applications are configured to store user-specific information including profile information; wherein the computer program product is configured such that first information associated with the first online application is subject of a publishing function of the second online application.

114. The computer program product of claim 2, wherein the computer program product is configured such that a picture associated with the first online application is subject of a commenting function of the second online application that is unavailable utilizing the first online application, while displaying the first information using the first online application, in response to a selection of indicia representative of the commenting function of the second online application, such that the commenting function is applied without sending data via a client, by passing an identifier associated with the first information to the second online application.

115. The computer program product of claim 2, wherein the computer program product is configured such that a picture associated with the first online application is subject of a publishing function of the second online application that is unavailable utilizing the first online application, while displaying the first information using the first online application, in response to a selection of indicia representative of the publishing function of the second online application, such that the publishing function is applied without sending data via a client, by passing an identifier associated with the first information to the second online application.

116. The computer program product of claim 21, wherein the logged-in user is the user logging in, after the user logging in completes a login operation.

117. The computer program product of claim 2, and further comprising:
code for receiving a request to access a page associated with at least one of the different online applications, the page including the document which is a picture;
code for identifying at least one profile in association with the request to access the page, the at least one profile including:
at least one user profile of an accessing user that initiated the request to access the page, the at least one user profile including:
registration information determined when the accessing user registered, and
automatically determined information that is determined automatically based on user selections of the accessing user; and
at least one group profile; and
code for presenting an advertisement in conjunction with the access to the page, based on the registration information and the automatically determined information of the at least one user profile, and the at least one group profile;
wherein the computer program product is configured such that the at least one first online application identifier, the at least one second online application identifier, the at least one third online application identifier, and the at least one fourth online application identifier are displayed simultaneously for access via an online application menu that is user-manipulated by adding and removing online application identifiers;
wherein the computer program product is configured such that the computer program product is configured to cooperate with at least one mobile application configured for accessing at least one of the plurality of different online applications utilizing a mobile device, and allow the at least one mobile application to provide at least a portion of a functionality of the at least one of the plurality of different online applications; wherein the computer program product is configured such that the potential tags are generated based on previously existing tags; and the correlated one or more tags are utilized in connection with a document search; wherein the computer program product is configured such that at least one of the different online applications is configured to store user-specific information including profile information; wherein the computer program product is configured to handle e-mails, text messages, and instant messages; wherein the computer program product is configured such that first information associated with the first online application is subject of a publishing function of the second online application.

\* \* \* \* \*